US012247685B2

(12) United States Patent
Marquis et al.

(10) Patent No.: US 12,247,685 B2
(45) Date of Patent: Mar. 11, 2025

(54) SELF-CENTERING BLIND MATE FLUID COUPLING

(71) Applicant: Parker-Hannifin Corporation, Cleveland, OH (US)

(72) Inventors: Timothy Marquis, Otsego, MN (US); Andrew Holst, Plymouth, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 76 days.

(21) Appl. No.: 18/167,299

(22) Filed: Feb. 10, 2023

(65) Prior Publication Data

US 2023/0184363 A1 Jun. 15, 2023

Related U.S. Application Data

(63) Continuation-in-part of application No. 17/995,193, filed as application No. PCT/US2021/044656 on Aug. 5, 2021.

(Continued)

(51) Int. Cl.
  *F16L 37/30* (2006.01)
  *F16L 37/22* (2006.01)
  (Continued)

(52) U.S. Cl.
  CPC ............. *F16L 37/52* (2013.01); *F16L 37/22* (2013.01); *F16L 37/30* (2013.01); *F16L 37/505* (2013.01)

(58) Field of Classification Search
  CPC ......... F16L 27/04; F16L 37/52; F16L 37/367; F16L 37/30; F16L 37/505; F16L 37/04; F16L 37/35
  See application file for complete search history.

(56) References Cited

U.S. PATENT DOCUMENTS 2,424,897 A * 7/1947 Orshansky, Jr. ........ F16L 27/04
                                                                285/266
4,506,862 A   3/1985 Spinosa et al.
(Continued)

FOREIGN PATENT DOCUMENTS

CN    203500725 U    3/2014
DE    4323758 A1    4/1994
(Continued)

OTHER PUBLICATIONS

International Search Report and Written Opinion of the International Searching Authority for corresponding International Patent Application No. PCT/US2021/044656, mailed Dec. 21, 2021.

(Continued)

*Primary Examiner* — Zachary T Dragicevich
*Assistant Examiner* — James A Linford
(74) *Attorney, Agent, or Firm* — Renner, Otto, Boisselle & Sklar, LLP

(57) ABSTRACT

A coupling member for a blind mate fluid coupling includes a housing and a valve body that is self-centering and alignable relative to the housing. The valve body may include at least two radial shoulder portions or abutments that are configured to engage at least two corresponding radial abutments of the housing to improve self-centering when in a decoupled state. A biasing member may urge the valve body abutments against the corresponding housing abutments to compensate for misalignment and/or provide self-centering in both a decoupled and mated state.

20 Claims, 38 Drawing Sheets

Related U.S. Application Data

(60) Provisional application No. 63/196,454, filed on Jun. 3, 2021, provisional application No. 63/061,863, filed on Aug. 6, 2020.

(51) Int. Cl.
  *F16L 37/50* (2006.01)
  *F16L 37/52* (2006.01)

(56) References Cited

U.S. PATENT DOCUMENTS

| | | | |
|---|---|---|---|
| 4,768,538 A | 9/1988 | Mintz et al. | |
| 5,370,153 A * | 12/1994 | Galle | F16L 29/04 251/149.6 |
| 5,975,490 A | 11/1999 | Essman | |
| 6,056,329 A | 5/2000 | Kitani et al. | |
| 7,178,553 B2 | 2/2007 | Peric et al. | |
| 7,275,563 B2 | 10/2007 | Tiberghien et al. | |
| 8,028,718 B2 | 10/2011 | Tiberghien et al. | |
| 2022/0412496 A1 * | 12/2022 | Nick | F16L 37/52 |
| 2024/0125418 A1 | 4/2024 | Shende | |
| 2024/0175531 A1 * | 5/2024 | Marquis | F16L 37/35 |

FOREIGN PATENT DOCUMENTS

| | | | |
|---|---|---|---|
| DE | 10261164 A1 * | 7/2007 | F16L 29/04 |
| EP | 3822532 A1 * | 7/2004 | F16L 37/23 |
| JP | 2013002502 A * | 1/2013 | |
| WO | 2022180569 A1 | 9/2022 | |

OTHER PUBLICATIONS

Second Written Opinion of the International Preliminary Examining Authority for corresponding International Patent Application No. PCT/US2021/044656, mailed Jul. 13, 2022.

"Thermal Management—Quick Connect Solutions for Tempering and Cooling," Parker Hannifin HPCE Catalog, Mar. 2019.

* cited by examiner

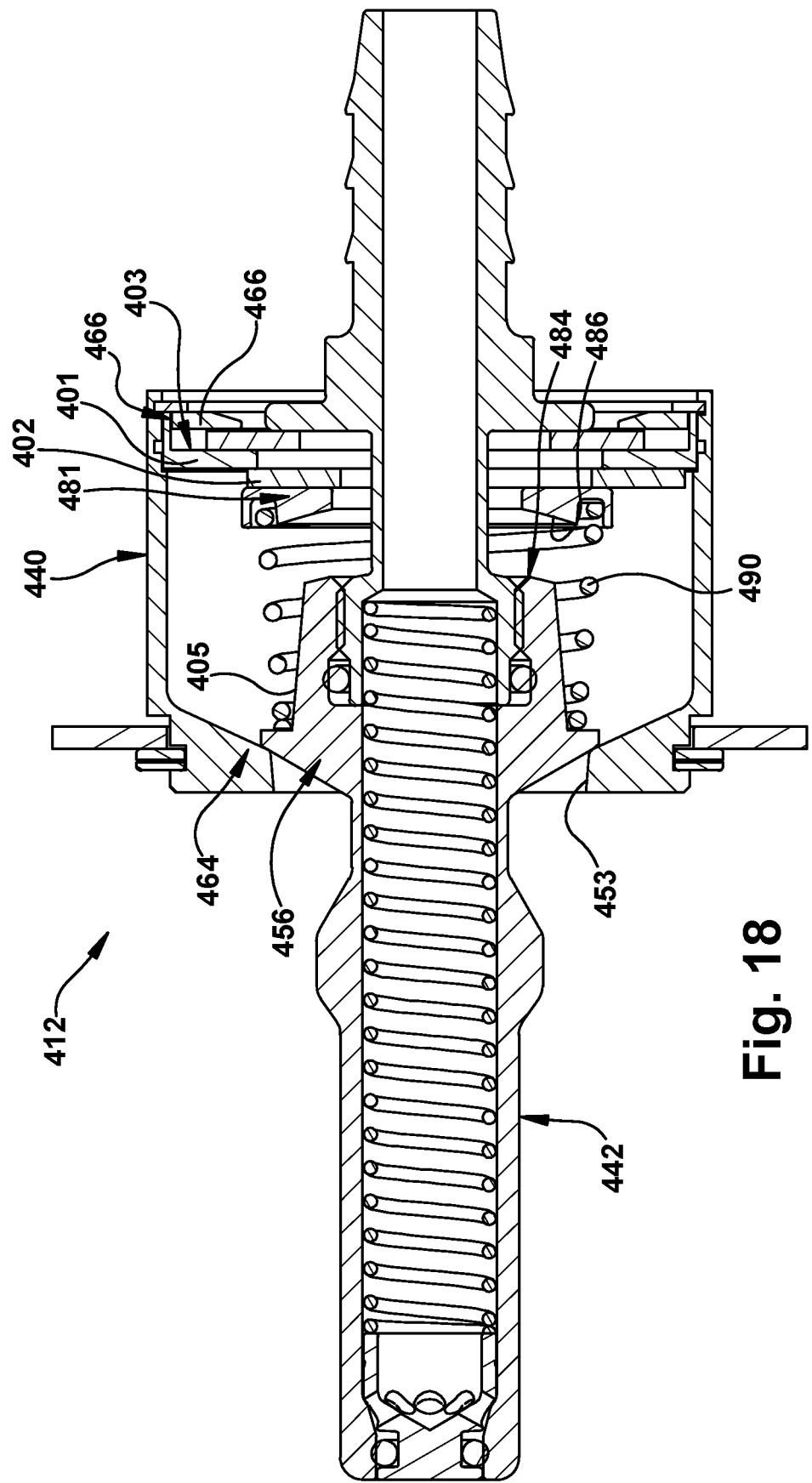

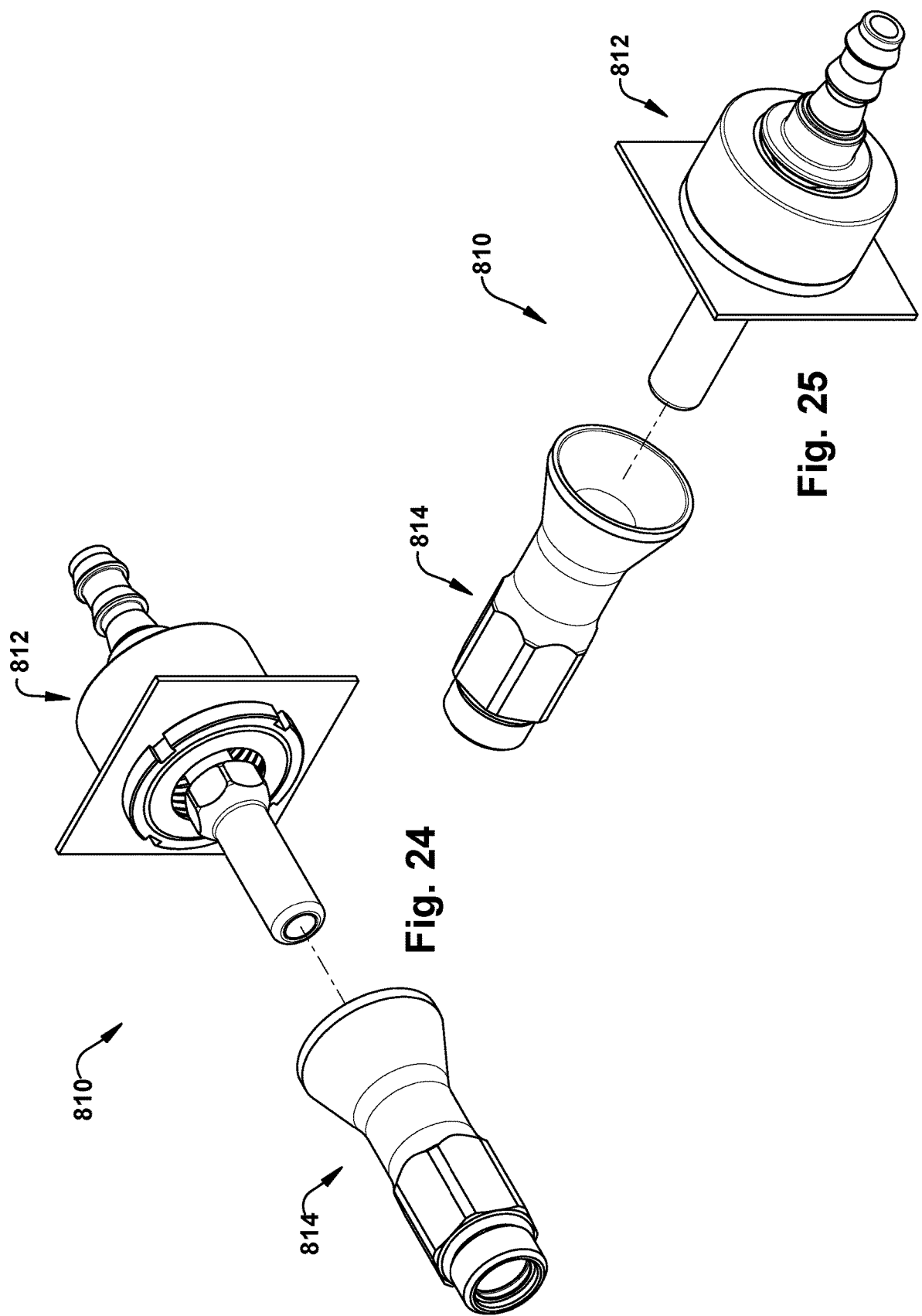

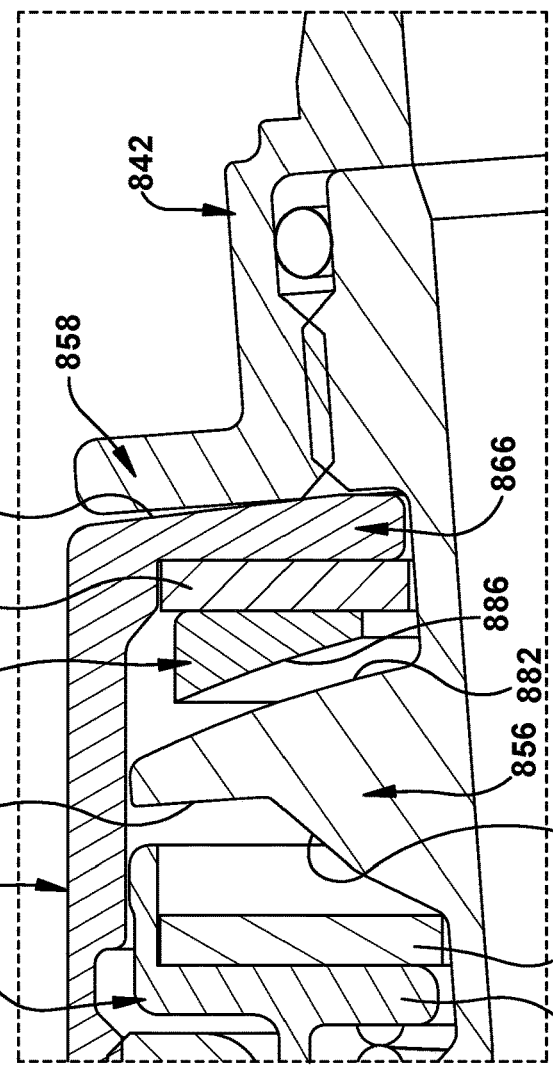
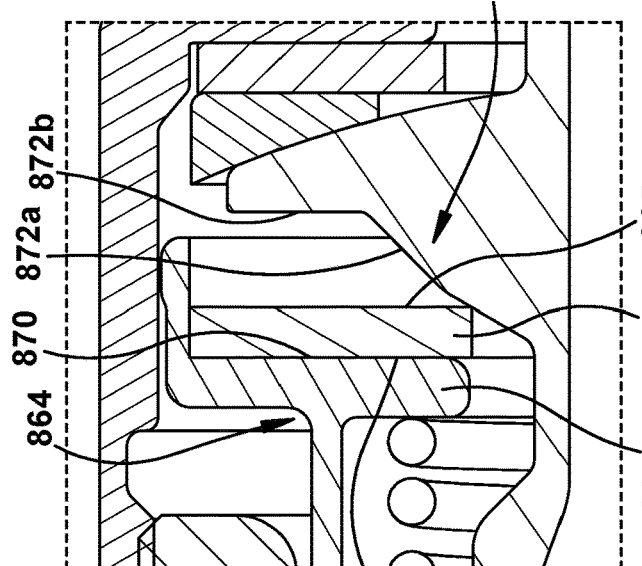
Fig. 35
Fig. 34

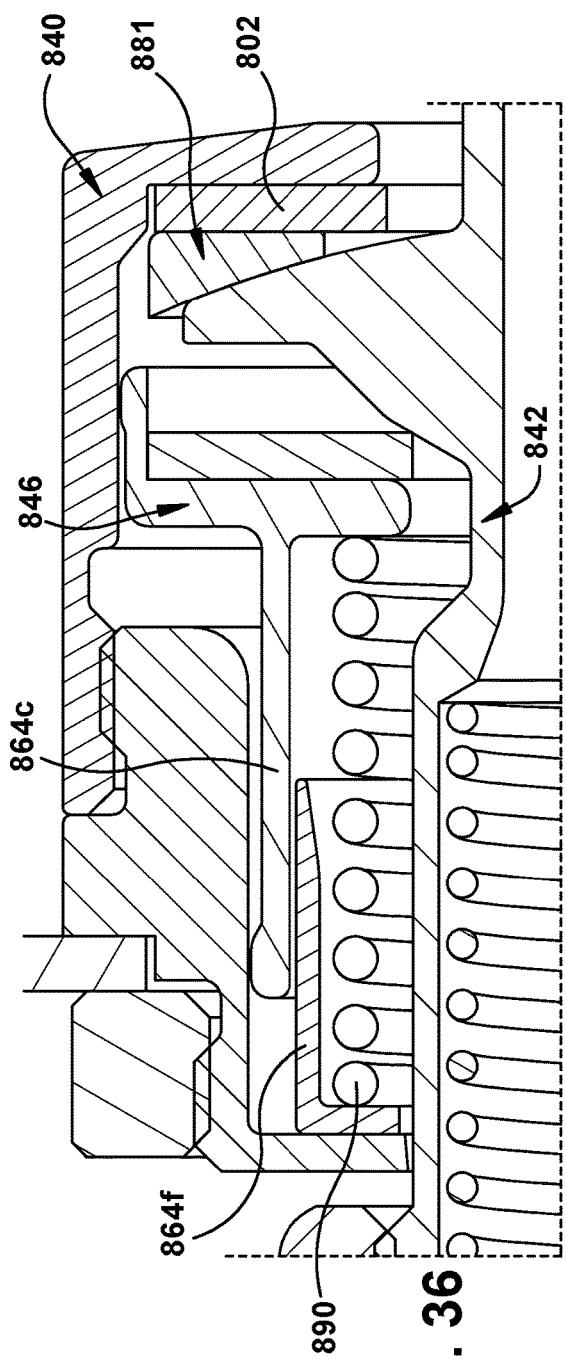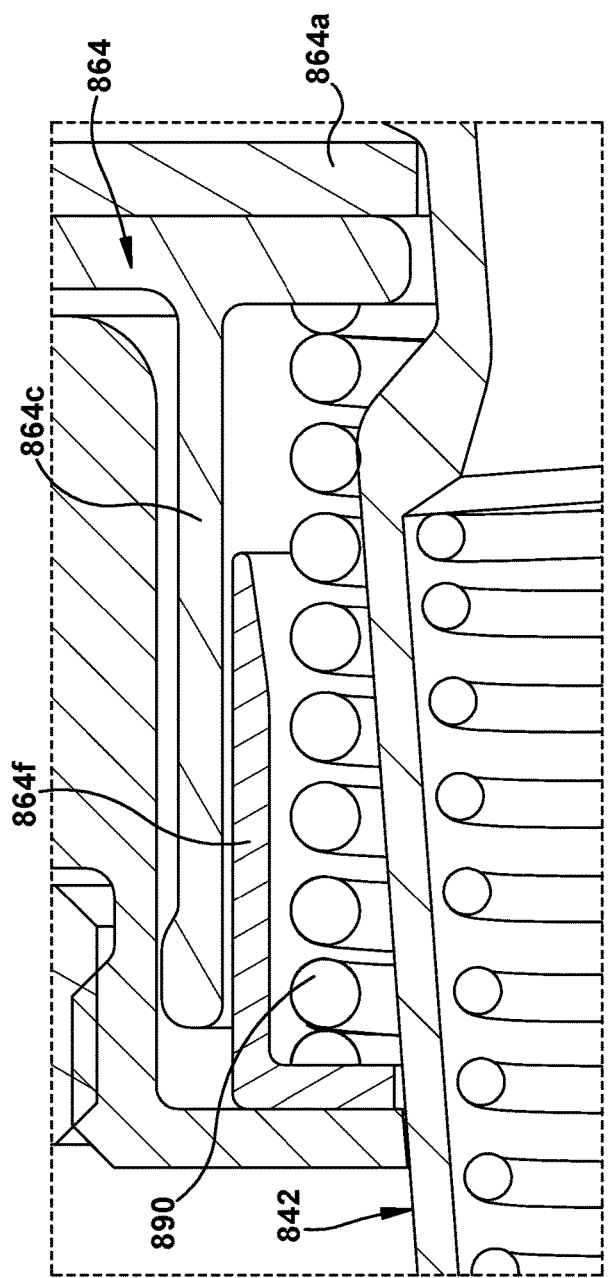

SELF-CENTERING BLIND MATE FLUID COUPLING

RELATED APPLICATIONS

This application is a continuation-in-part of U.S. application Ser. No. 17/995,193 filed Sep. 30, 2022, which is a national phase of International Application No. PCT/US2021/044656 filed Aug. 5, 2021, which claims the benefit of U.S. Provisional Application No. 63/061,863 filed Aug. 6, 2020, and U.S. Provisional Application No. 63/196,454 filed Jun. 3, 2021, all of which are hereby incorporated herein by reference in their entireties.

TECHNICAL FIELD

The present invention relates generally to couplings, and more particularly to a self-centering blind mate fluid coupling.

BACKGROUND

Fluid couplings are commonly used to connect fluid lines in a variety of applications. Often these couplings include a male member and a female member that are mated together for fluid connection between fluid lines of a system. The male member generally includes a projecting portion at one end for insertion into a receiving end of the female member. When the projecting portion of the male member is inserted into the receiving end of the female member, fluid flow may be established through flow passages in each of the coupling members. Typically, one or both of the coupling members include a valve member that is opened to permit fluid flow when the coupling members are fully-mated together, and that is closed to terminate fluid flow when the coupling members are disconnected.

One type of fluid coupling that is often used in the electronics industry for thermal management applications, for example, is a blind mate fluid coupling. Conventionally, each coupling member of a blind mate coupling is mounted on a plate or manifold, such as with one coupling member mounted in an electrical cabinet and the other coupling member mounted on a modularly removable rack or blade carrying electronics. The mating action between the coupling members of the blind mate coupling occurs via a sliding motion between the plate and manifold (e.g., cabinet and rack/blade) which can be accomplished without tools and without visually seeing the connection sequence. Typically, such blind mate couplings have minor self-aligning features which allows a small amount of misalignment between the coupling members when mating them together.

SUMMARY

One issue with conventional blind mate coupling designs is that the amount of misalignment allowed when mating the coupling members together may be insufficient for many applications. For example, a conventional blind mate coupling may allow up to only 1 mm of maximum radial misalignment and essentially zero angular misalignment between the coupling members. When trying to expand the use of such blind mate couplings into more broadly accepted applications, such as electronic data centers, the tolerances of the enclosures for these applications may not be as tightly controlled as more conventional or sophisticated applications. Therefore, more misalignment tolerance is needed in the mating between coupling members to maintain the current proven and economical manufacturing processes for such applications.

An aspect of the present disclosure provides a blind mate coupling or coupling member that enhances the self-centering and/or misalignment compensating capabilities of the design.

More particularly, according to an aspect, the exemplary blind mate coupling includes a valve body having axially spaced apart and radially protruding abutments that operatively engage corresponding axially spaced apart abutments of a housing to facilitate or provide alignment and/or centering of the valve body.

Alternatively or additionally, according to an aspect, the exemplary blind mate coupling includes an alignment mechanism having one or more of an axially forward part, an intermediate part, and/or an axially rearward part that cooperate with the valve body of the coupling to provide alignment and/or centering of the valve body.

According to an aspect, a coupling member for a blind mate fluid coupling includes: a valve body having an axially extending internal fluid passage, a radially outwardly protruding forward abutment, and a radially outwardly protruding rearward abutment that is axially spaced apart rearwardly from the forward abutment; a valve member at least partially disposed in the internal fluid passage, the valve member being movable relative to the valve body to open and close the internal fluid passage; and a housing surrounding at least a portion of the valve body, the housing including a radially inwardly extending forward engagement surface and a radially inwardly extending rearward engagement surface that is axially spaced apart rearwardly from the first engagement surface; wherein the rearward abutment of the valve body includes a radially outwardly and axially rearwardly extending convex contact surface; and wherein, the coupling member is configured such that, at least when in a decoupled state, the forward abutment of the valve body operatively interacts with the forward engagement surface of the housing, and the convex contact surface of the rearward abutment of the valve body operatively interacts with the rearward engagement surface of the housing, thereby enhancing the alignment and/or centering of the valve body relative to the housing at least in the decoupled state.

According to an aspect, a coupling member for a blind mate fluid coupling, includes: a housing; a valve body at least partially extending through the housing, the valve body having an axially extending internal fluid passage; a valve member at least partially disposed in the internal fluid passage, the valve member being movable relative to the valve body to open and close the internal fluid passage; and an alignment mechanism including a movable engagement part that is radially movable relative to the housing and cooperates with the valve body to facilitate alignment and/or centering of the valve body.

In exemplary embodiments, the engagement part cooperates with the valve body via a concave interface to facilitate alignment and/or centering.

According to another aspect, a coupling member for a blind mate fluid coupling, includes: a housing; a valve body at least partially extending through the housing, the valve body having an axially extending internal fluid passage; a valve member at least partially disposed in the internal fluid passage, the valve member being movable relative to the valve body to open and close the internal fluid passage; and an alignment mechanism including a movable engagement part that is axially movable relative to the housing and cooperates with the valve body to facilitate alignment and/or centering of the valve body.

In exemplary embodiments, the engagement part is a forward engagement part configured to engage a forwardly facing shoulder surface of the valve body.

According to another aspect, a coupling member for a blind mate fluid coupling, includes: a housing; a valve body at least partially extending through the housing, the valve body having an axially extending internal fluid passage; a valve member at least partially disposed in the internal fluid passage, the valve member being movable relative to the valve body to open and close the internal fluid passage; and an alignment mechanism including a rearward engagement part that forms a fixed stop having a radially inwardly and axially rearwardly extending surface that cooperates with the valve body to facilitate alignment and/or centering of the valve body.

According to another aspect, a coupling member for a blind mate fluid coupling, includes: a housing; a valve body at least partially extending through the housing, the valve body having an axially extending internal fluid passage; a valve member at least partially disposed in the internal fluid passage, the valve member being movable relative to the valve body to open and close the internal fluid passage; and an alignment mechanism including an engagement part that cooperates with a forwardly facing shoulder surface of the valve body to facilitate alignment and/or centering of the valve body; wherein the forwardly facing shoulder surface includes an inclined portion that extends radially outwardly and axially rearwardly relative to a longitudinal axis of the valve body.

In exemplary embodiments, the forwardly facing shoulder surface further includes a vertical portion that is perpendicular to the longitudinal axis of the valve body, the vertical portion being radially outward of the inclined portion.

According to another aspect, a coupling member for a blind mate fluid coupling, includes: a housing; a valve body at least partially extending through the housing, the valve body having an axially extending internal fluid passage; a valve member at least partially disposed in the internal fluid passage, the valve member being movable relative to the valve body to open and close the internal fluid passage; and an alignment mechanism including a biasing member that is configured to urge the valve body rearwardly.

In exemplary embodiments, the biasing member is part of a forward alignment assembly that biases a forward movable part in a rearward direction to engage a forwardly facing shoulder surface of the valve body.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 18 shows another exemplary male coupling member according to an embodiment.

FIGS. 24-37 show another exemplary embodiment of a blind mate fluid coupling including another exemplary male coupling member.

FIG. 24 is a front perspective view of the blind mate coupling, and FIG. 25 is a rear perspective view thereof.

FIG. 26 is a cross-sectional side view showing the male coupling member in an exemplary centered and uncoupled state.

FIG. 27 is a cross-sectional side view of the male coupling member in a connecting state at full radial offset.

FIG. 28 is a cross-sectional side view of the male coupling member in a disconnecting state at full radial offset.

FIG. 29 is a cross-sectional side view of the male coupling member in a connecting state at full radial offset and at a full offset angle.

FIG. 30 is a cross-sectional side view of the male coupling member in a disconnecting state at full radial offset and at a full offset angle.

FIG. 31 is cross-sectional side view of the male coupling member illustrating exemplary radial offset limits for centering.

FIG. 32 is a cross-sectional side view of the male coupling member illustrating a maximum amount the valve body can be pulled off-center.

FIG. 33 is a rear view illustrating the state in FIG. 32.

FIG. 34 is an enlarged cross-sectional side view of an exemplary shoulder portion of the valve body of the male coupling member.

FIG. 35 is an enlarged cross-sectional side view of an exemplary rear engagement part of the male coupling member.

FIG. 36 is an enlarged cross-sectional side view of an exemplary centering mechanism of the male coupling member in a connecting state, and FIG. 37 is an enlarged cross-sectional side view of the centering mechanism in a disconnecting state.

DETAILED DESCRIPTION

Figure 1:
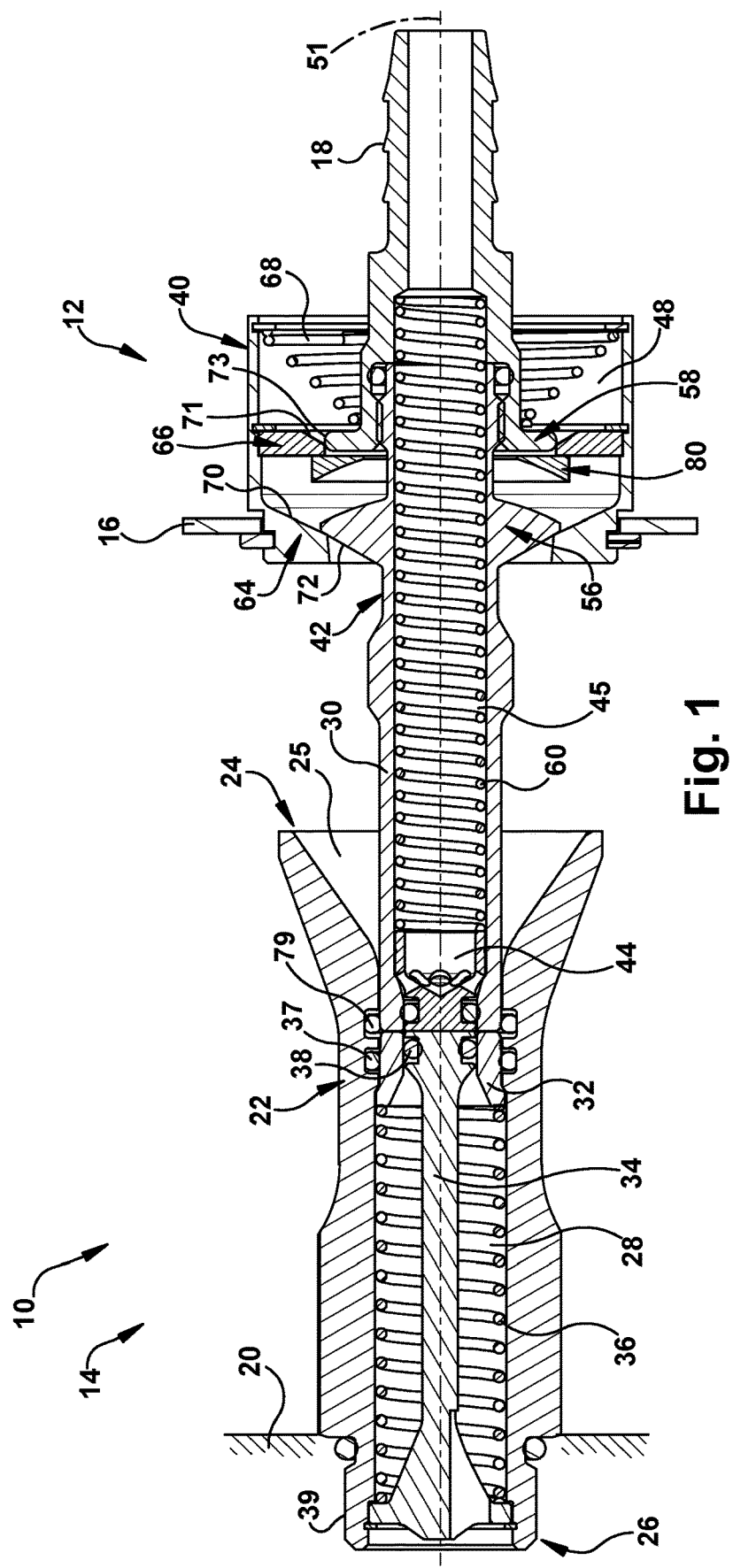
FIG. 1 is a cross-sectional side view of an exemplary blind mate fluid coupling including an exemplary male coupling member according to an embodiment of the present disclosure, in which the blind mate coupling is shown in an exemplary initial mating and closed state.

The principles and aspects according to the present disclosure have particular application to blind mate fluid couplings, also referred to as blind mate quick couplings, such as for fluid flow control and thermal management in electronics applications, and thus will be described below chiefly in this context. It is understood, however, that the principles and aspects according to the present disclosure may be applicable to other types of couplings for other applications, including non-fluid applications where desirable, as would be understood by those having ordinary skill in the art. For example, the exemplary blind mate couplings may be used for electrical, acoustic, or optical applications, which may be applicable to the aerospace, automotive, manufacturing, or energy industry, or any other suitable industry for any suitable application.

The following description and annexed drawings set forth certain exemplary embodiments that illustrate one or more aspects according to the present disclosure. As shown and described below, a general aspect of the present disclosure provides a blind mate coupling or coupling member that enhances the self-centering and/or misalignment compensating capabilities of the design. More particularly according to an aspect, the exemplary blind mate coupling provides an alignment mechanism including one or more of an axially forward part, an intermediate part, and/or an axially rearward part that cooperate with the valve body of the coupling to provide alignment and/or centering of the valve body.

In exemplary embodiments, as described in further detail below, the forward part may include a movable engagement part that is axially movable relative to a housing of the coupling and which interfaces against a shoulder surface of the valve body to enhance alignment and/or centering. Such a movable forward engagement part (or member) generally may be referred to as a movable stop. In alternative exemplary embodiments, the forward part may be a fixed engagement part that serves as a fixed stop and which interfaces against a corresponding shoulder surface of the valve body to facilitate alignment and/or centering. The forward part may be a single part or may be a combination of cooperating parts such as an assembly.

In exemplary embodiments, the intermediate part may include a movable engagement part that is radially movable relative to the housing and which cooperates with the valve body to facilitate alignment and/or centering. The intermediate part may include a concave interface, such as a spherical interface, which provides such cooperation with the valve body. For example, a shoulder surface of the valve body may be interface against the intermediate part and form a complimentary surface to the concave interface with the intermediate part. In alternative embodiments, the intermediate part may have a spring seat part and a radially movable part that interface with each other via the concave interface to provide centering and/or alignment. Such a movable intermediate engagement part (or member) generally may be referred to as a movable stop. In alternative embodiments, the intermediate part may be a fixed part that serves as a fixed stop that cooperates with the valve body. The intermediate part may be a single part or may be a combination of cooperating parts such as an assembly.

In exemplary embodiments, the rearward part may include an engagement part that is fixed relative to the housing and which forms a fixed stop that cooperates with the valve body to facilitate alignment and/or centering. In exemplary embodiments, the rearward part includes an inclined surface that interfaces against a shoulder surface of the valve body to provide such alignment and/or centering. For example, the inclined surface of the rearward part may be a radially inwardly and axially rearwardly extending surface which may form a part of the housing or which may be coupled to the housing. In alternative embodiments, the rearward part may be a movable engagement part (or movable stop). The rearward part may be a single part or may be a combination of cooperating parts such as an assembly.

Other aspects will become apparent from the following detailed description when considered in conjunction with the drawings.

Referring initially to FIG. 1, an exemplary blind mate fluid coupling 10 is shown. As shown, the blind mate coupling 10 generally includes two coupling members, including a male coupling member 12 (also referred to as a male member or male nipple) and a female coupling member 14 (also referred to as a female member or female coupler). As is well-understood in the art, such quick connect coupling members 12, 14 may be mated together for fluid connection between fluid lines of a system to establish fluid flow through the system, or may be disconnected from each other to terminate flow through the coupling members.

In exemplary embodiments, the blind mate fluid coupling 10 is used for thermal management applications to establish fluid flow between a heat exchanger (e.g., cold plate) and a fixed manifold to allow for quick removal and replacement of the components of the thermal management system. The fluid in such applications may be a liquid, such as water or a water-based liquid, or may include glycol, or may be a gas, or may be a two-phase liquid-gas such as a refrigerant, or may be any other suitable fluid (e.g., liquid and/or gas) for the thermal management application, as would be understood by those having ordinary skill in the art.

In the illustrated embodiment, for example, the male member 12 may be mounted to a plate 16, drawer, rack, blade, or other suitable removable platform or substrate carrying electronic components to be cooled via fluid flow established via connection of the male member. Such removable modular components may be used for PCIe expansion or other expansion interfaces carrying electronics (e.g., processors, memory storage devices, communications interfaces, etc.) that may be added to or removed from a computer environment, for example. Such fluid flow may be established via suitable conduits and/or heat exchanger equipment (e.g., cold plates) in thermal communication with the electronics. The conduits and/or heat exchanger equipment may be connected at a rearward connector 18 of the male member 12, for example. As shown, the rearward connector may be barbed connector that is configured to connect with a flexible hose.

As shown, the female member 14 may be mounted on a manifold 20, such as on an electrical cabinet or other enclosure within which the expansion unit (e.g., drawer, rack, blades, etc.) carrying the modular expansion electronics are inserted or removed. The female member 14 generally includes a valve body 22 having a forward inlet portion 24, a rearward outlet portion 26, and an internal fluid flow passage 28 fluidly connecting the inlet and outlet portions 24, 26. As shown, the inlet portion 24 includes a receptacle 25 for receiving a corresponding forward projecting portion, or nose 30, of the male member.

A valve member 32 is disposed within the internal fluid passage 28 of the female member 14, and is configured to move relative to the female valve body 22 for opening and closing the internal fluid passage 28 when the male member 12 is fully coupled or decoupled, respectively, from the female member 14. In the illustrated embodiment, the valve member 32 is formed as a valve sleeve that surrounds a fixed valve stem portion 34. A biasing member 36 surrounds the stem portion 34 and biases the valve member 32 toward closed where the valve member 32 sealingly engages against one or more sealing surfaces, such as one or more seals 37, 38. The outlet portion 26 includes a connector 39, such as suitable threads, barbs, or the like, which enable connection to the manifold 20, or a suitable fluid conduit, which may be coupled to a source of the fluid (e.g., liquid), or to other thermal management equipment in the system fluid circuit, for example.

As shown in the illustrated embodiment, the female member 14 may be rigidly mounted to the manifold 20. To provide suitable connection with the male member 12 when the plate or other structure carrying the male member is inserted relative to the female member 14, the male member may have self-centering and misalignment compensating functionality to account for misalignments between the coupling members 12, 14. Such misalignment between the coupling members 12, 14 may be caused by misalignments and/or tolerance issues (e.g., stack-up) between the structures 16, 20 holding the coupling members 12, 14, for example.

As discussed above, one issue with conventional blind mate coupling designs is that the amount of misalignment allowed when mating the coupling members may be insufficient for many applications. For example, a conventional blind mate coupling may allow up to only 1 mm of maximum radial misalignment and essentially zero angular misalignment between the coupling members. When trying to expand the use of such blind mate couplings into more broadly accepted applications, such as electronic data centers, the tolerances of the enclosures for these applications may not be as tightly controlled as more conventional or sophisticated applications. Therefore, more misalignment tolerance is needed in the mating between coupling members to maintain the current proven and economical manufacturing processes for such applications.

An aspect of the present disclosure provides the exemplary blind mate coupling 12, and more particularly one or more of the exemplary coupling members 12 and/or 14 with one or more features that enhance the self-centering and/or misalignment compensating capabilities of the device. In the illustrated embodiment, for example, such self-centering and misalignment compensating features are embodied in the male member 12. It is understood, however, that the features described herein could also be applied to the female member 14, as will become apparent in view of the following description.

Figure 2:
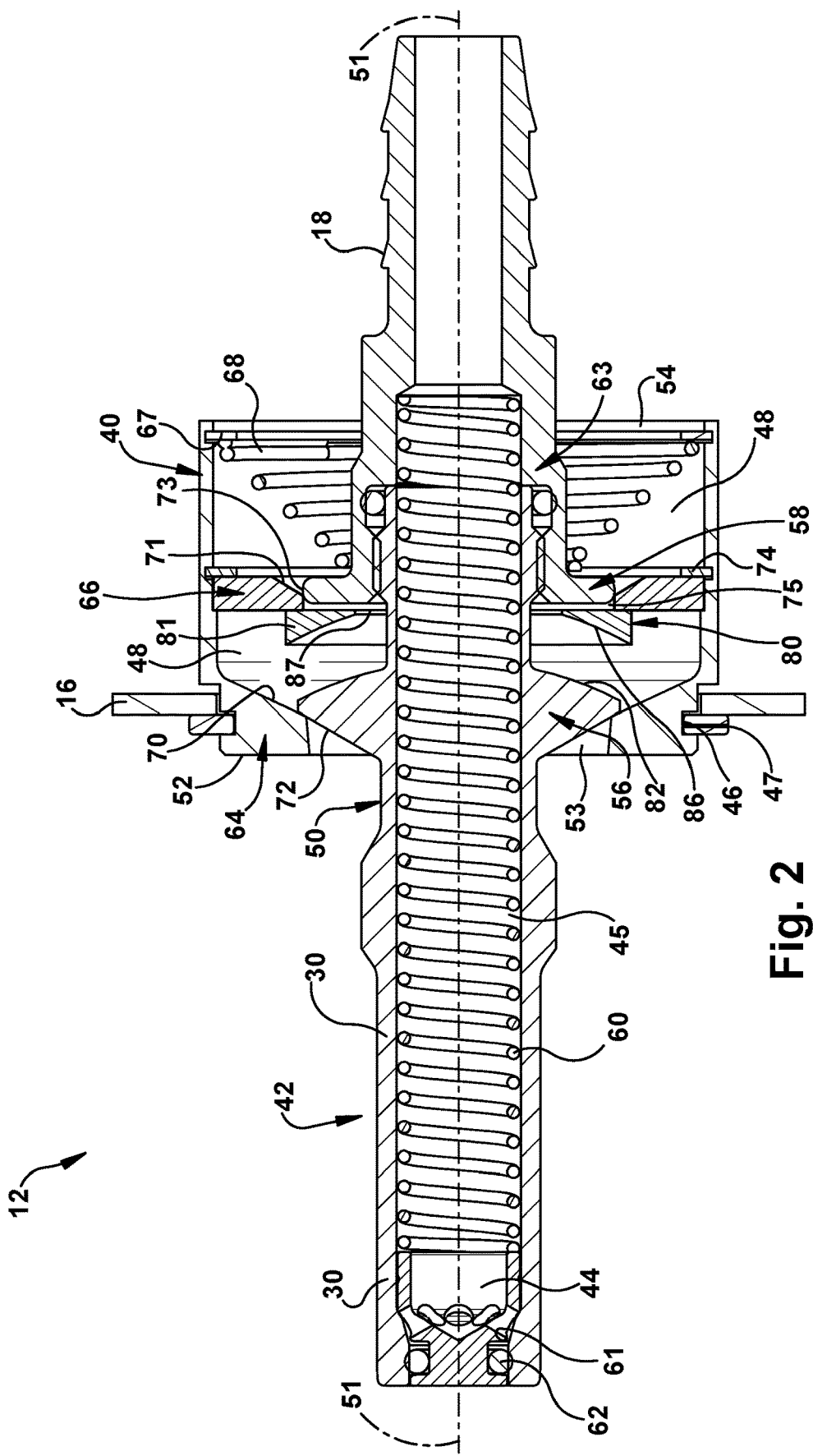
FIG. 2 is a cross-sectional side view of the male coupling member in FIG. 1 shown in an exemplary decoupled state.

Turning now to FIG. 2, with reference still to FIG. 1, the exemplary male coupling member 12 is shown alone. The male member 12 generally includes a housing 40, a valve body 42 at least partially extending through the housing 40, and a valve member 44 within an internal fluid passage 45 of the valve body 42 for opening and closing the fluid passage 45.

The housing 40 may be any suitable structure for operatively mounting the valve body 42 on the mounting plate 16. In the illustrated embodiment, the housing 40 has a generally cylindrical outer body with one or more fastening receivers 46, such as recesses or grooves, for receiving one or more fasteners 47, such as retaining ring(s), threads, coupling nuts, screws, or the like that mount the male member 12 to the mounting plate 16. The housing also may have any suitable configuration for enabling one or more of the self-centering and misalignment compensating features of the valve body 42 relative to the housing 12. In the illustrated embodiment, for example, the housing 40 forms an internal chamber 48 that contains at least a portion of the valve body 42 as well as other component(s) that enable such self-centering and misalignment compensating functionality, as described in further detail below.

The valve body 42 includes a main body portion 50 extending along a longitudinal axis 51 and which forms the internal fluid passage 45. The valve body 42 may have any suitable shape or form as may be desired for the particular application. In the illustrated embodiment, the main body portion 50 has forward nose portion 30 with a generally cylindrical outer surface that extends along the longitudinal axis 51 and projects forwardly of a forward face 52 of the housing 40 for insertion into the receptacle 25 of the female member 14. As shown, the valve body 42 extends through a forward opening 53 in the housing 40 and into the internal chamber 48. The valve body 42 also may extend through a rearward opening 54 in the housing 40 to project rearwardly of the housing 40. The rearward portion of the valve body 42 includes connector 18, such as threads, barbs, or the like, for connecting to a suitable fluid conduit, for example.

In exemplary embodiments, the valve body 40 includes one or more radially protruding shoulder portions 56, 58, or abutments, having corresponding shoulder surfaces that extend radially outwardly from the main body portion 50 for providing self-centering and misalignment compensating functionality by interacting with portions of the housing 40, as will be described in further detail below. The one or more shoulder portions 56, 58 may be contained within the internal chamber 48 of the housing 40 to interact with respective internal housing surfaces (described below). In the illustrated embodiment, the valve body 42 includes first (e.g., forward) shoulder portion 56 and second (e.g., rearward) shoulder portion 58 that is axially spaced from the first shoulder portion 56. As shown, one or more of the shoulder portions 56, 58 may be unitary with the main body portion 50; however, it is understood that one or more or all of the shoulder portions 56, 58 may be attached to the main body portion 50 in any suitable manner.

The male valve member 44 may have any suitable shape or form for opening or closing the internal fluid passage 45 of the valve body 42. In the illustrated embodiment, the valve member 44 is slidably disposed within the valve body 42 to move between open and closed positions. As shown, a biasing member 60 is disposed within the valve body 42 (e.g., within the fluid passage 45) and biases the valve member 44 forward toward the closed position where the valve member 44 sealingly engages against a sealing surface 61, such as a valve seat, with a suitable seal 62 (e.g., O-ring seal). The biasing member 60 may be any suitable member for biasing the valve member 44, such as a spring, for example a coil spring. The biasing member 60 may engage an internal spring seat, or internal abutment, inside the fluid passage 45 that is formed by a rearward portion 63 of the valve body 42. As shown in the illustrated embodiment, the rearward portion 63 of the valve body 42 may be a separate piece that is connected (e.g., threaded) to an intermediate portion or the forward nose portion 30 of the valve body 42.

FIG. 2 shows the exemplary male member 12 is in its decoupled and self-centered state. In the illustrated state, the male member 12 also is in a closed state in which the valve member 44 is in its closed position sealingly engaged against the valve seat 61.

As shown in the illustrated embodiment, the alignment mechanism of the coupling includes a forward engagement part and a rearward engagement part in the form of respective first and second radially inwardly extending abutments 64, 66 of the housing 40. The abutments 64, 66 serve as centering engagement structures that interface with the respective first and second radially outwardly protruding shoulder portions 56, 58 of the valve body 42. As shown, a biasing member 68, such as a centering spring 68, is configured to urge the valve body shoulder portions 56 and 58 against the respective housing abutments 64 and 66. In exemplary embodiments, the centering spring 68 is a conical spring, which also urges the valve body 42 toward the center line of the spring along the longitudinal axis 51. The conical centering spring 68 surrounds the longitudinal axis 51 and engages a rearward internal surface 67 (e.g., retaining ring) at one end of the spring 68, and exerts forward biasing force against a rearward and inward surface of the second shoulder portion 58 to urge the valve body 42 forward and toward center.

In the illustrated decoupled state, the first valve body shoulder portion 56 engages the first housing abutment 64, and the second valve body shoulder portion 58 engages the second housing abutment 66 to provide centering of the valve body 42 relative to the housing 40 (e.g., along longitudinal axis 51). The biasing member 68 provides sufficient biasing force to lock the valve body 42 in the centered position relative to the housing 40 until sufficient force is applied to overcome the biasing force. Because the respective first and second housing abutments 64, 66 restrict further forward movement of the valve body 42, the first and second housing abutments 64, 55 also serve as respective stop members of the housing 40.

To further facilitate centering of the valve body 42 with respect to the housing 40, one or more respective engagement surfaces of the housing abutments 64, 66 and/or one or more respective engagement surfaces of the valve body shoulder portions 56, 58 may include radially inwardly tapered surfaces in the forward direction. Such radially inward tapering of the engagement surfaces urges the engagement between the respective valve body shoulder portions 56, 58 and housing abutments 64, 66 toward the center position along the longitudinal axis 51.

In the illustrated embodiment, for example, both of the rearward surfaces of the first and second housing abutments 64, 66 include respective tapered engagement surfaces 70, 71 that taper radially inwardly in the forward direction. By virtue of the cylindrical shape of the housing 40, the respective tapered engagement surfaces 70, 71 form respective progressive conical surfaces in the illustrated embodiment.

Also as shown in the illustrated embodiment, one or more of the respective forward surfaces of the valve body shoulder portions 56, 58 may include radially inwardly tapered engagement surfaces in the forward direction which may be configured to provide a complementary interface against the tapered engagement surfaces 70, 71 of the housing abutments 64, 66. In the illustrated embodiment, only the first (e.g., forward) shoulder portion 56 has a tapered engagement surface 72. The second (e.g., rearward) shoulder portion 58 has a perpendicular surface relative to the axis 51, and includes a curved radially outer end portion 73 for engaging the second housing abutment 66, as described in further detail below.

The first (e.g., forward) housing abutment 64 may have any suitable form for serving as a stop and/or facilitating centering of the valve body 42. In the illustrated embodiment, the first housing abutment 64 is unitary with the outer housing body and extends radially inwardly to form a portion of the through opening 53 in the front face 52 of the housing 40. It is understood, however, that the first housing abutment 64 may be attached to the housing body in any suitable fashion. As shown, the tapered engagement surface 70 of the first housing abutment 64 may be at an angle in the range from about 30-degrees to about 80 degrees relative to the longitudinal axis 51, such as about 60-degrees, for example. To provide a complementary interfacial engagement, the tapered engagement surface 72 of the first valve body shoulder portion 56 may have the same angle relative to the longitudinal axis 51.

The second (e.g., rearward) housing abutment 66 may have any suitable form for serving as a stop and/or facilitating centering of the valve body. In the illustrated embodiment, the second housing abutment 66 is formed as a circular plate, or ring, that is attached to the outer housing body inside the chamber 48 via a suitable fastener 74, such as a retaining ring. It is understood, however, that the second housing abutment 66 may be formed integrally and or be unitary with the housing body in any suitable fashion. As shown, the tapered engagement surface 71 of the second housing abutment 66 may be at an angle in the range from about 30-degrees to about 80 degrees relative to the longitudinal axis 51, such as about 60-degrees, for example. The conical spring 68 may help push the rear of the valve body 42 toward center such that the taper on the second housing abutment 68 can be smaller.

In exemplary embodiments, the second (e.g., rearward) shoulder portion 58 of the valve body 42 may be configured to provide point engagement with the second (e.g., rearward) housing abutment 66 to facilitate the self-centering functionality. As discussed above, in the illustrated embodiment, the radially outer surface 73 of the second shoulder portion 58 may be a continuously curved surface to facilitate such point engagement. It is understood, however, that the interface between the second shoulder portion 58 and the second housing abutment 66 could be two diameters that guide each other, or could be two conical surfaces that guide each other together. Generally, this second contact interface (e.g., shoulder portion 58 and abutment 66) that is rearward of the forward interface (e.g., shoulder portion 56 and abutment 64), alternatively or additionally in combination with the conical spring 68, helps to better center the male valve body 42 with the female member 14. Such feature(s) also help to prevent the male valve body 42 from being moved off center by a force that is radial to the male nose portion 30.

Also as shown, an internal size of opening 75 through the second housing abutment 66 may be about the same as, or essentially the same as, the outer size of the valve body shoulder portion 58. For example, the radially inner diameter provided by the opening 75 in the second housing abutment 66 may be the same size as (or only slightly larger than) the radially outer diameter provided by the curved surface 73 of the second valve body shoulder portion 58. In this manner, the second valve body shoulder portion 58 is too large to pass through the opening 75 formed by the second housing abutment 66, but is small enough such that the second valve body shoulder portion 58 may engage a radially inner edge forming the opening 75. Such engagement of the second valve body shoulder portion 58 may provide point-to-point contact between the second valve body shoulder portion 58 and the second housing abutment 66 to further facilitate centering of the valve body 42 relative to the housing 40. Although shown in this manner, it understood that the features of the first (forward) interface (e.g., shoulder portion 56 and abutment 64) and the second (rearward) interface (e.g., shoulder portion 58 and abutment 66) could be reversed, with the conical stop feature integrated into the second shoulder portion 58 and the first (forward) interface with a clearance diameter. Alternatively, both first (forward) interface (e.g., shoulder portion 56 and abutment 64) and the second (rearward) interface (e.g., shoulder portion 58 and abutment 66) could have conical interfaces with complementary interfacing surfaces and stop at the same time as well The respective first and second housing abutments 64, 66 and the respective first and second valve body shoulder portions 56, 58 are configured to cooperate with each other to provide suitable operation and self-centering of the male coupling member 12. For example, the axial spacing between the engagement surfaces 70, 71 of the first and second housing abutments 64, 66 is the same as the axial spacing between the engagement surfaces 72, 73 of the first and second valve body shoulder portions 56, 58. In this manner, the respective shoulder portions 56, 58 will engage the respective abutments 64, 66 at the same time when centered in the illustrated decoupled state. The angle of the respective tapered surfaces 70, 71 of the housing abutments 64, 66 also are the same in the illustrated embodiment to help guide the forward and rearward portions of the valve body 42 toward center. As shown, the radially inner extent (e.g., inner diameter) of the openings 53, 75 formed by the respective housing abutments 64, 66 also may be the same. In the illustrated embodiment, however, the radially outer extent (e.g., outer diameter) of the first (forward) shoulder portion 56 is larger than that of the second (rearward) shoulder portion 58 to better ensure a stop of the valve body 42 forwardly; however it is understood that these features could be reverse or could be the same as discussed above.

Referring now to FIGS. 1 and 3-6, an exemplary connection sequence of the blind mate coupling 10 will now be described in further detail. Reference still may be had to FIG. 2 for showing certain features of the male member 12 in further detail.

Turning back to FIG. 1, the blind mate coupling 10 is shown in an initial mating state in which the nose portion 30 of the male member 12 has been inserted into the receptacle 25 of the female member 14, however sufficient mating engagement has not yet been made to transition the male member 12 from its decoupled state (as shown in FIG. 2). In the illustrated state, each of the coupling members 12, 14 still are still in their respective closed states and fluid communication is not established between the coupling members 12, 14.

As shown, the female member may have a relatively large cone-shaped receptacle 25 that tapers radially inwardly in the rearward direction to guide the male member 12 toward center. The radially outer surface of the nose portion 30 may sealingly engage a forward seal 79 in the female member 14. The male valve member 44 may abut the stem portion 34 of the female member 14, and the female valve member 32 may abut the nose portion 30 of the male member 12. At this stage during mating, however, insufficient axial closing force has been applied to the coupling members 12, 14 to cause the biasing member 68 (e.g., centering spring) to compress, and insufficient axial closing force has been applied to open the respective valve members 32, 44 via compression of the respective biasing members 36, 60.

Figure 3:
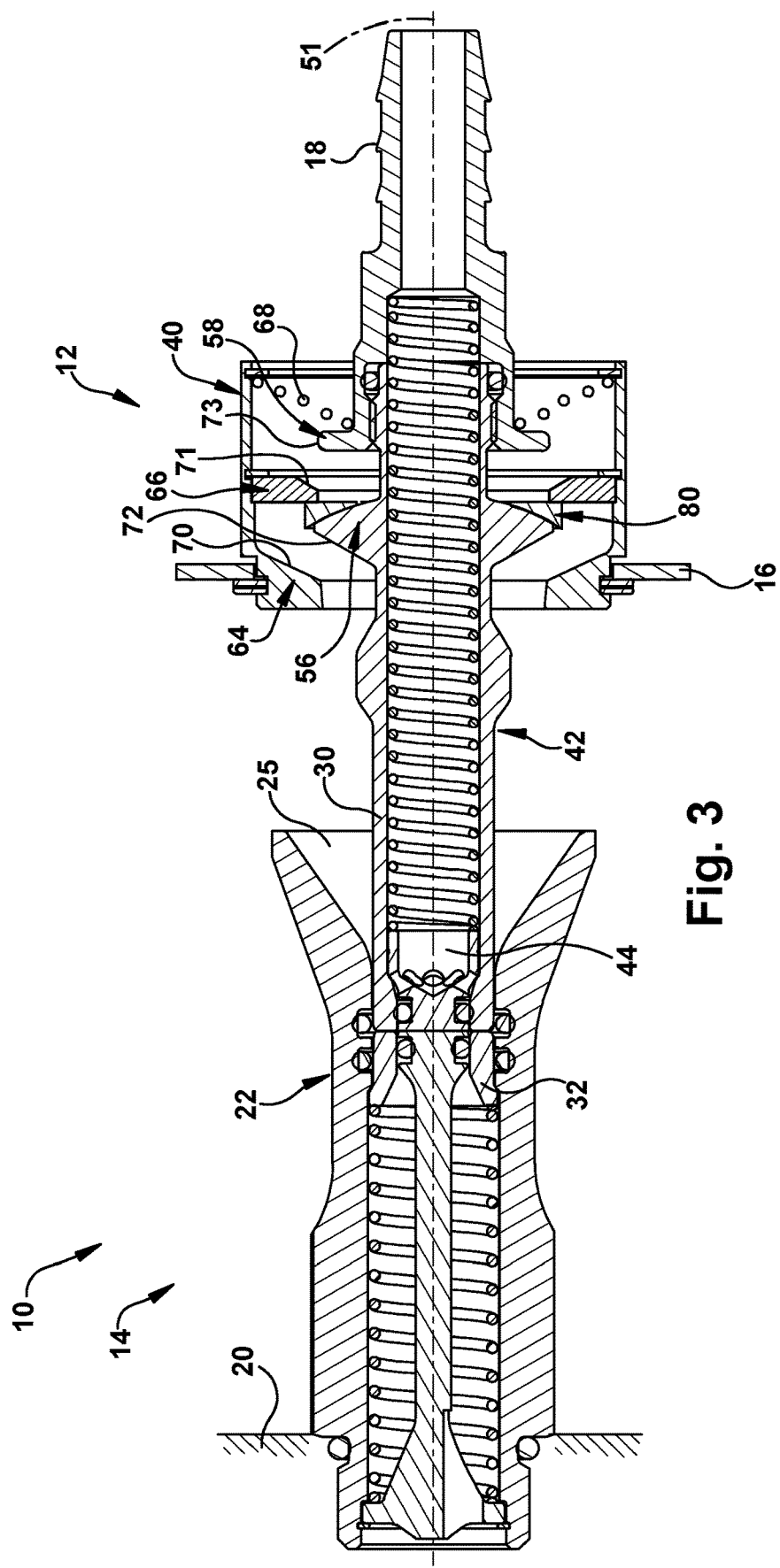
FIG. 3 is a cross-sectional side view of the blind mate coupling in FIG. 1 shown in an exemplary partially-mated, unlocked and closed state.

Turning to FIG. 3, the male member 12 is shown in a partially mated state with the female member 14, in which the biasing member 68 (e.g., centering spring) has been compressed to unlock the self-centering features provided by engagement of the housing abutments 64, 66 with the valve body shoulder portions 56, 58 discussed above. The illustrated state also is referred to as an unlocked state of the male member 12, which corresponds to activation of the misalignment compensating features of male member 12. In the state illustrated in FIG. 1, however, there is no misalignment of the valve body 42 relative to the housing 40; nor misalignment of the male member 12 relative to the female member 14.

Figure 4:
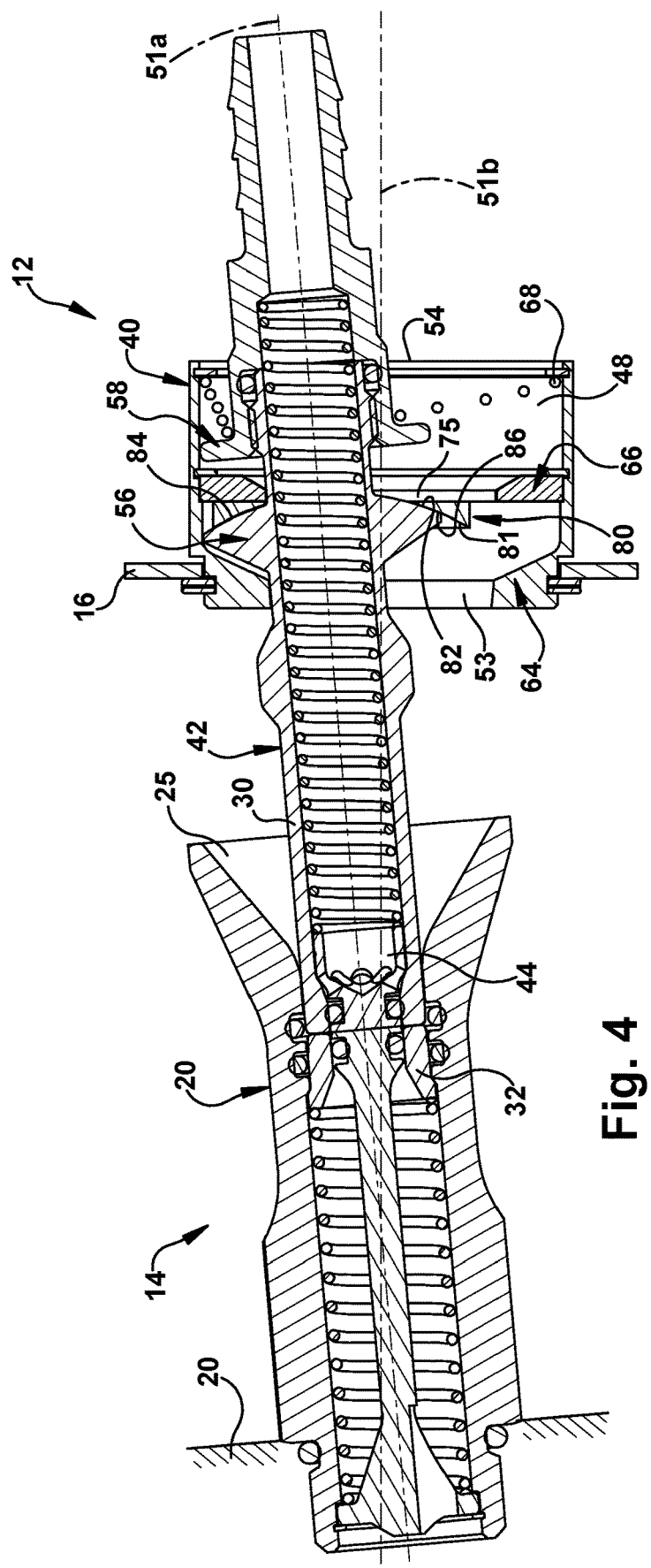
FIG. 4 is a cross-sectional side view of the blind mate coupling in FIG. 1 in an exemplary partially-mated, unlocked and closed state with the male member angularly misaligned.
Figure 5:
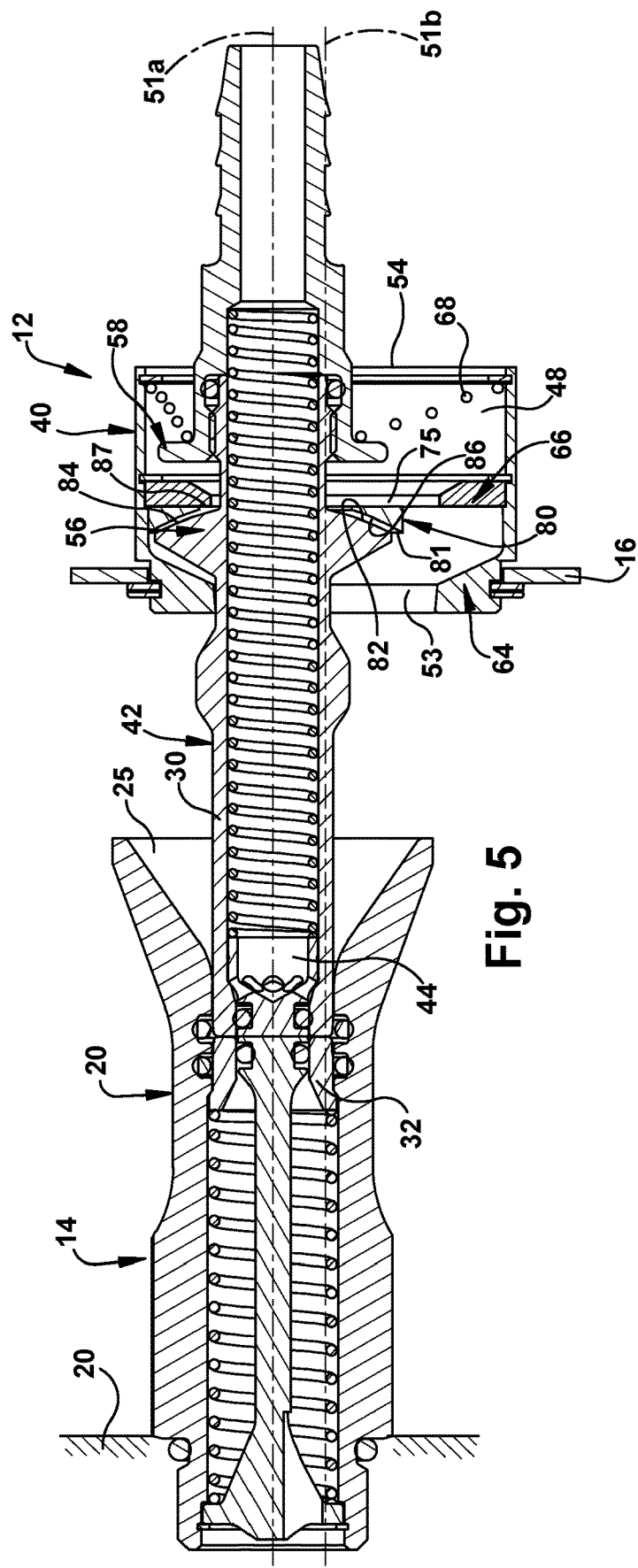
FIG. 5 is a cross-sectional side view of the blind mate coupling in FIG. 1 in an exemplary partially-mated, unlocked and closed state with the male member radially misaligned.

Referring to FIGS. 4 and 5, two possible misalignment orientations of the valve body 42 relative to the housing 40 are shown. In FIG. 4, the valve body 42 is angularly misaligned relative to the housing 40, which may be caused by angular misalignment between the male member 12 and female member 14. In FIG. 5, the valve body 42 is radially misaligned relative to the housing 40, which may be caused by radial misalignment between the male member 12 and female member 14. The illustrated misalignments are not intended to be limiting, and other possible misalignments are possible between the male member 12 and female member 14, as would understood by those having ordinary skill in the art. Reference still may be had to FIG. 2 for showing certain features of the male member 12 described below in further detail.

As shown, in exemplary embodiments, the male member 12 includes an intermediate part of the alignment mechanism in the form of a compensator 80 that is configured to help compensate for misalignment between the coupling members 12, 14 during mating engagement with each other. The compensator 80 may include any suitable structure or device for achieving such function, including, for example, a biasing device (such as a spring) that cooperates with one or more parts having suitable structures and which may be movable relative to the housing and/or valve body. Generally, the compensator 80 may be configured to avoid the angular misalignment of the two coupling halves from creating an axial displacement of the nose portion 30 that would otherwise add to the amount of axial misalignment tolerance that is needed.

For example, in the illustrated embodiment, the compensator 80 (intermediate part) includes an engagement member 81 that is axially rearward of the first (e.g., forward) shoulder portion 56 of the valve body 42 and which is adapted to engage a rearward engagement surface 82 of the first shoulder portion 56. As shown, the engagement member 81 may be located within the internal chamber 48 between the first (e.g., forward) housing abutment 64 and the second (e.g., rearward) housing abutment 66. The engagement member 81 generally may be a movable member relative to the housing 40 and/or the valve body 42; and/or the engagement member 81 may have other features that compensate for angular and/or radial misalignment when the valve body 42 is engaged with the engagement member 81. As shown, the engagement member 81 cooperates with the housing or other part to generally serve as an axial stop to movement of the valve body 42, and more particularly a stop to axially rearward movement of the valve body. Generally, the engagement member 81 may have any suitable structure for engaging the valve body 42 and compensating for misalignment between the coupling members 12, 14.

In exemplary embodiments, the engagement member 81 is configured to engage with the rearward surface 82 of the first shoulder portion 56 via a concave interface 84. The concave interface 84 may have any suitable concave shape, including an angled, curved or spherical shape. In the illustrated embodiment, the concave interface 84 curves radially inwardly and may have an apex of curvature at the centerline of the engagement member 81. As shown in FIG. 4, for example, the concave interface 84 between the first shoulder portion 56 and the engagement member 81 provides the ability to compensate for angular misalignment of the valve body 42 relative to the housing 40. In exemplary embodiments, the concave interface 84 is a partially spherical interface formed by respective surfaces between the engagement member 81 and first valve body shoulder portion 56. This permits rotation of the valve body 42 relative to the engagement member 81 at the partially spherical interface without changing the distance to the forward end of the valve body 42. In other words, such a concave, curved or spherical surface enables the valve body to move angularly without moving axially, which enables avoidance of the angular misalignment of the two coupling halves from creating an axial displacement of the nose portion 30 that would otherwise add to the amount of axial misalignment tolerance that is needed. The configuration also enables the alignment mechanism to have a more even force distribution that may contribute to the smoothness of the alignment functionality. It is of course understood, however, that the concave interface 84 may take other suitable shapes or forms, such as an elliptical interface formed by respective surfaces, for example.

In the illustrated embodiment, the engagement member 81 has a concave surface 86 which opens forwardly toward the first valve body shoulder portion 56. Accordingly, the rearward engagement surface 82 of the first shoulder portion 56 is a complementary convex surface 82 that interfaces with the concave surface 86 of the engagement member 81. In this manner, the engagement member 81 serves as a socket having the concave surface 86 (e.g., cup-like depression) which receives and enables pivoting and/or rotation of the ball-like convex surface 82 of the first shoulder portion 56, thereby providing a ball-and-socket-like joint. As shown, the concave surface 86 (also referred to as a bearing surface) extends continuously from the radially outer edge of the engagement member 81 to an opening 87 in a center thereof. The convex surface 82 (also referred to as a mating surface) extends continuously from the radially outer edge of the first shoulder portion 56 to the main body portion 50 of the valve body 42 which extends through the opening 87 in the engagement member 81. In the illustrated embodiment, the arcuate lengths of the concave surface 86 and the convex surface 82 are essentially the same to provide fuller contact between the valve body 42 and engagement member 81.

In exemplary embodiments, the engagement member 81 is movable relative to the housing 40 and the valve body 42 to facilitate the misalignment compensating functionality. More particularly, in the illustrated embodiment, the engagement member 81 (e.g., socket) is free to move or float radially relative to the housing 40 to enhance the radial and/or angular misalignment capability, as shown with exemplary reference to FIGS. 4 and 5, respectively. In exemplary embodiments, the floating engagement member 81 (e.g., floating socket) is formed as disc, block, plate, or other bearing member that is discrete with respect to the valve body 42 and the housing 40. As shown, the engagement member 81 may be formed as a ring, such as a washer with a cupped spherical surface having central opening 87 through which the valve body 42 extends.

The engagement member 81 may be configured to enable radial floating to an extent of the outer diameter of the engagement member 81 relative to the inner diameter of the housing 40 and/or to an extent of the inner diameter of the engagement member opening 87 relative to the valve body 42. The engagement member 81 may be operatively coupled to a structure in the housing 40 to enable radial floating, or the engagement member 81 may be loosely arranged in the housing 40 to enable the radial floating. In the illustrated embodiment, the engagement member 81 is loosely arranged in the housing. In exemplary embodiments, the engagement member 81 may be axially constrained or may be restricted from tipping while permitting such radial floating, as described in further detail below with exemplary reference to FIG. 7.

As is apparent in the illustrated embodiment(s), other structures of the housing 40 and valve body 42 also are configured to enable the radial and/or angular misalignment functionality of the coupling member 12. For example, the opening 53 through the first housing abutment 64, the opening 75 through the second housing abutment 66, and the opening 54 through the rear of the housing 40 may be sized to permit a desired amount of radial and angular misalignment relative to the radially outer surface of the main body portion 50 of the valve body 42. The outer diameter of the engagement member 81 and the inner diameter of the opening 87 through the engagement member 81 also may be sized to provide the desired amount of radial and angular misalignment. In addition, the outer diameter of the respective first and second valve body shoulder portions 56, 58 may be sized to permit the desired amount of radial and angular misalignment.

In exemplary embodiments, the amount of angular misalignment of the longitudinal axis 51*a* of the valve body relative 42 to a longitudinal axis 51*b* of the housing 40 may be about 1-degree or greater, more particularly about 5-degrees or greater, such as in the range from about 1-degree to about 15-degrees (e.g., 1, 2, 4, 6, 8, 10, 12, 14 or 15-degrees, including all ranges and subranges between the stated values), for example. In the illustrated embodiment, the maximum angular misalignment is 5-degrees. In exemplary embodiments, the amount of radial misalignment of the longitudinal axis 51a of the valve body 42 relative to the longitudinal axis 51b of the housing 40 may be about 1 mm or greater, more particularly about 5 mm or greater, such as in the range from about 1 mm to about 15 mm (e.g., 1 mm, 5 mm, 10 mm, 12 mm, or 15 mm, including all ranges and subranges between the stated values), for example. In the illustrated embodiment, the maximum radial misalignment is 5 mm. This amount of angular and/or radial misalignment of the valve body 42 relative to the housing 40 may greatly expand the available applications for the coupling member 12 and blind mate coupling 10.

Figure 7:
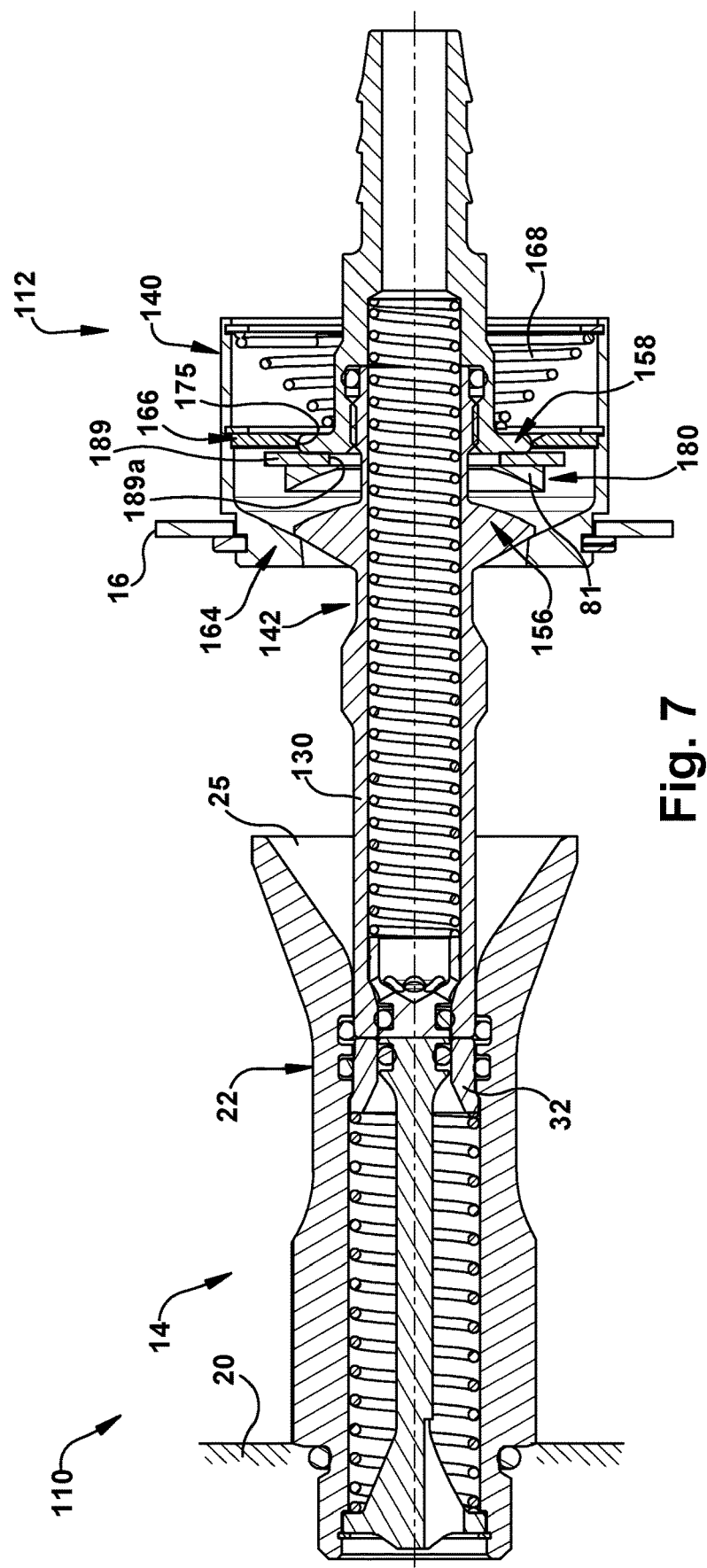
FIG. 7 is a cross-sectional side view of another exemplary blind mate fluid coupling including another exemplary male coupling member according to an embodiment of the present disclosure, which is shown in an exemplary initial mating and closed state.

Referring briefly to FIG. 7, another exemplary embodiment of a blind mate coupling 110, including another exemplary embodiment of a male member 112 and the female member 14 is shown. The blind mate coupling 110 is substantially the same as the above-referenced blind mate coupling 10, and consequently the same reference numerals but indexed by 100 Are used to denote structures corresponding to the same or similar structures in the couplings 10, 110. In addition, the foregoing description of the blind mate coupling 10, and in particular the male member 12, is equally applicable to the coupling 110 and male member 112, except as noted below. It is also understood that aspects of the coupling members 12, 112 may be substituted for one another or used in conjunction with one another where applicable.

The coupling member 112 is essentially the same as the coupling member 12, except that the intermediate part of the alignment mechanism is an assembly that includes an additional support member 189, or ring (e.g., washer or disc), in addition to the engagement member 181 (e.g., socket), which the support member 189 enables better support of the engagement member 181 during its radial travel. For example, with exemplary reference again to FIG. 2, to accommodate enough radial float in the coupling member 12, the opening 75 or hole through the second housing abutment 66 should be fairly large. Therefore, if the engagement member 81 (e.g., floating socket) is moved radially too far, it may not be supported enough around the full perimeter and may tend to tip into the opening 75.

The intermediate part of the coupling member 112 includes the additional support member 189 (e.g., plate, ring, disc or washer) between the engagement member 181 (e.g., floating socket) and the second housing abutment 166 to accommodate more radial travel while still keeping the edges of the engagement member 181 and the support member 189 fully supported around the perimeter. In exemplary embodiments, the support member 189 has an opening 189a that is smaller in diameter than the opening 175 of the second housing abutment 166 to assist in such additional support. In the illustrated embodiment, both the support member 189 and the engagement member 181 are loosely arranged in the housing 140 (e.g., not attached to another structure), although it is understood that one or more of these members 181, 189 may be operatively coupled to each other or to other structure(s) in the housing 140, as would be understood by those having ordinary skill in the art.

Turning back to FIG. 6, the blind mate coupling 10 is shown in an exemplary fully-mated state in which both coupling members 12, 14 are in their open state to permit fluid communication between the coupling members 12, 14. As shown, in the open position, an axial closing force between the coupling members 12, 14 is sufficient to overcome the biasing force of the male biasing member 60 and the biasing force of the female biasing member 36. As such, the female valve member 32 (e.g., sleeve) is unseated from the sealing surface(s) (e.g., seals 37 and 38) via force applied by the nose portion 30. Likewise, the male valve member 44 is unseated from its sealing surface (e.g., seat 61) via force applied by the female stem portion 34 to open the respective internal flow passages 28 and 45. The radially outer surface of the nose portion 30 seals against the radially outer seals 37, 79 in the female valve body 22.

Figure 6:
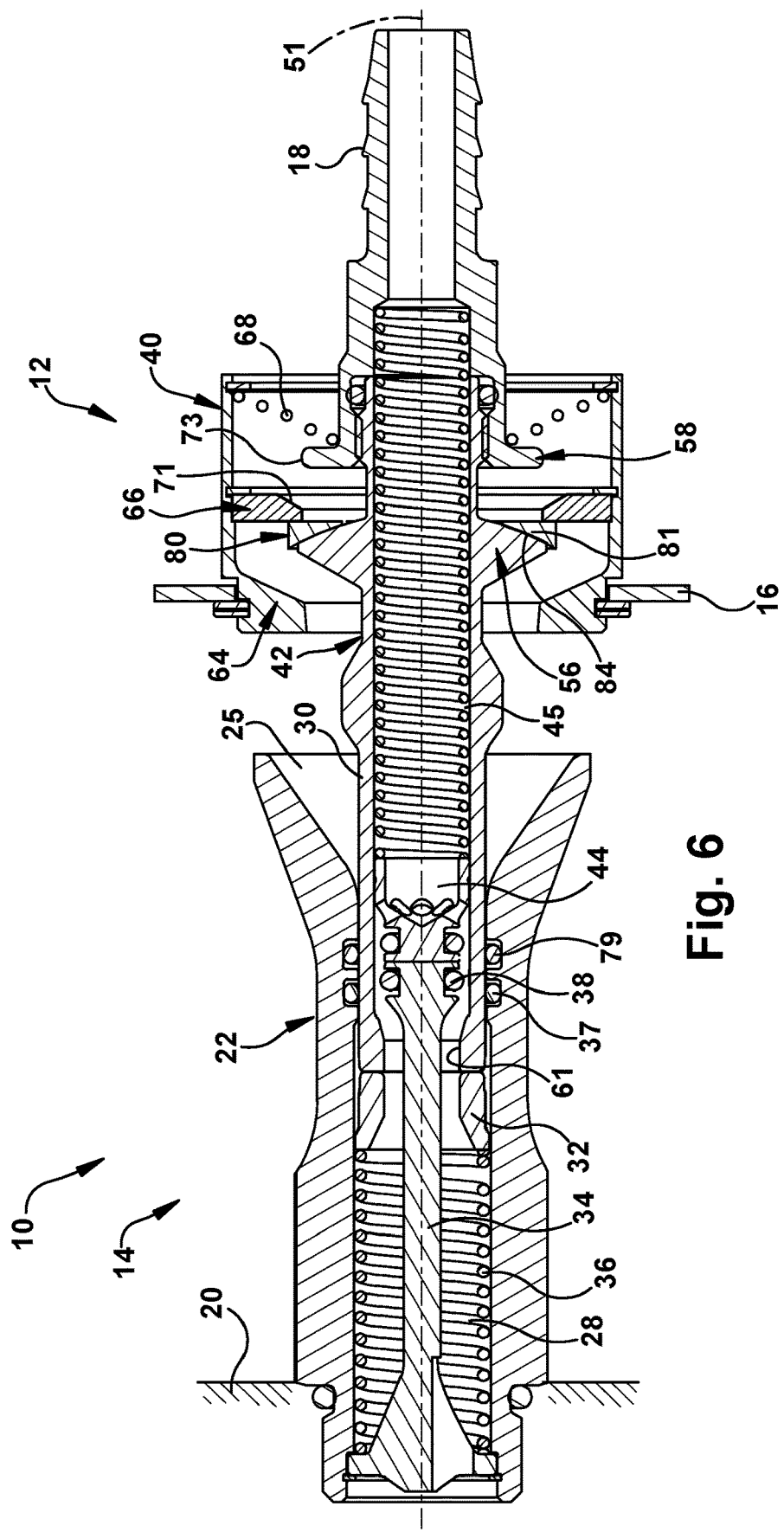
FIG. 6 is a cross-sectional side view of the blind mate coupling in FIG. 1 in an exemplary fully-mated and open state.

Comparing FIG. 6 to FIG. 4 or 5, when the nose portion 30 of the male member 12 is guided into the conical receptacle 25 of the female member 14, the valve body 42 of the male member 12 is urged toward an aligned position with the female member 14. In addition, the centering spring 68 will tend to urge the valve body 42 toward its centerline position. It is understood that because the female member 14 may be fixed in position relative to the manifold 20, the male member 12 (e.g., valve body 42 and/or housing 40) may be radially and/or angularly misaligned (offset) relative to the female member 14 in the fully-mated state.

When the female coupling member 14 and male coupling member 12 are decoupled from each other, each coupling member 12, 14 returns to its decoupled (closed) state with the respective valve members 32, 44 moved to closed. As discussed above, the centering spring 68 and/or other self-centering features of the male member 12 enable the male member to automatically move back and lock into its centered position in the decoupled state (as shown in FIG. 2).

Figure 8:
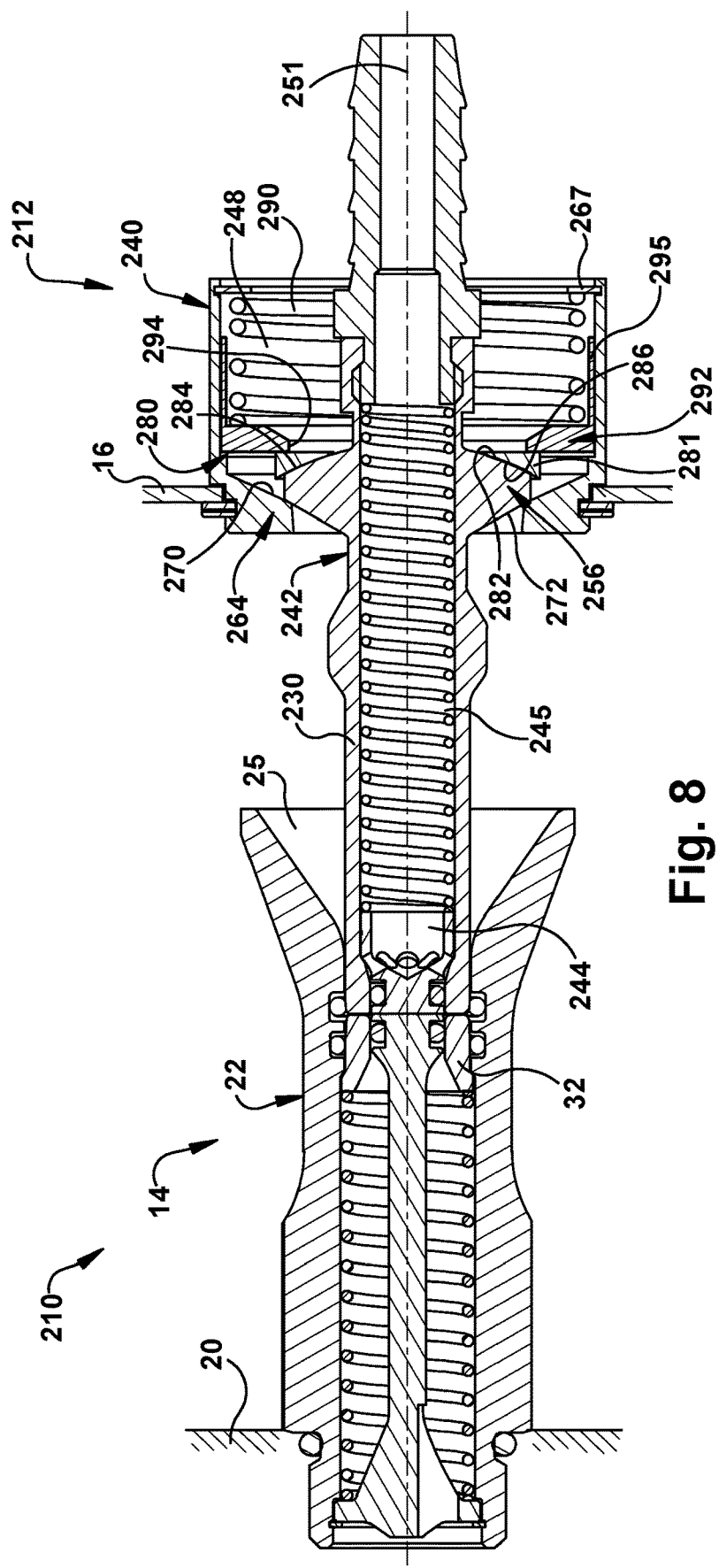
FIG. 8 is a cross-sectional side view of another exemplary blind mate fluid coupling including another exemplary male coupling member according to an embodiment of the present disclosure, which is shown in an exemplary initial mating and closed state.

Turning to FIG. 8, another exemplary embodiment of a blind mate coupling 210, including an exemplary male member 212 and female member 214 is shown. The blind mate coupling 210 is substantially similar to the above-referenced blind mate coupling 10 and consequently the same reference numerals but indexed by 200 are used to denote structures corresponding to the same or similar structures in the couplings 10, 210. In addition, the foregoing description of the blind mate couplings 10, 110, in particular the male member 12, 112, is equally applicable to the coupling 210 and male member 212, except as noted below. It is also understood that aspects of the coupling members 12, 112, 212 may be substituted for one another or used in conjunction with one another where applicable.

Similarly to the male coupling member 12, the male coupling member 212 generally includes a housing 240, a valve body 242 at least partially extending through the housing 240, and a valve member 244 within an internal fluid passage 245 of the valve body 242 for opening and closing the fluid passage 245. As shown, the valve body 242 includes at least one radially outward shoulder portion 256 with a tapered forward shoulder surface 272 that cooperates with a forward part of the alignment mechanism which is in the form of at least one radially inward abutment 264 of the housing 240, which has a tapered rearward surface 270 for engaging the tapered surface 272.

As shown, the alignment mechanism of the coupling member 212 includes an intermediate part within the housing 240 in the form of a compensator 280 that is configured to compensate for misalignment of the valve body 242 relative to the housing 240 and/or to provide self-centering functionality. As described above, the compensator 280 generally may be configured to avoid the angular misalignment of the two coupling halves from creating an axial displacement of the nose portion that would otherwise add to the amount of axial misalignment tolerance that is needed. The configuration of the compensator 280 also may enable the coupling to have a more even force distribution that may contribute to the smoothness of its alignment functionality.

In exemplary embodiments, the compensator 280 serves as a mover, such as a pusher or puller, that interfaces with the valve body 242 to provide such function(s). In the illustrated embodiment, for example, the intermediate part of the alignment mechanism (e.g., compensator 280) includes a biasing member 290 and an engagement member 281 that is configured to interface with the radial shoulder portion 256 of the valve body 242. As shown, the biasing member 290 is configured to operatively push the engagement member 281 against a rearward surface 282 of the shoulder portion 256 to provide misalignment compensation and/or self-centering, as described in further detail below.

In exemplary embodiments, the engagement member 281 is configured to engage with the rearward surface 282 of the shoulder portion 256 via a concave interface 284. In the illustrated embodiment, the engagement member 281 is configured the same as the engagement member 81 shown and described with exemplary reference to the coupling member 12. As such, the engagement member 281 has a concave surface 286 in the illustrated embodiment, which may serve as a socket for receiving and guiding the valve body shoulder portion 256. Likewise, in the illustrated embodiment, the rearward engagement surface 282 of the shoulder portion 256 is configured the same as, or substantially the same as, the first valve body shoulder portion 56 described above. As such, the rearward engagement surface 282 of the shoulder portion 256 has a complementary convex surface 282 that interfaces with the concave surface 286 of the engagement member 281. As discussed above, the concave interface 284 between the valve body shoulder portion 256 and the engagement member 281 provides the ability to compensate for misalignment of the valve body 242 relative to the housing 240.

Also as discussed above with respect to the engagement member 81, the engagement member 281 (e.g., socket) is free to float radially relative to the housing 240 to enhance the radial and/or angular misalignment capability of the coupling member 212. Although not shown with respect to the coupling member 212, it is understood that the coupling member 212 may have the same misalignment compensating functionality described above with respect to the coupling member 12 and shown with exemplary reference to FIGS. 4 and 5. As such, the floating engagement member 281 (e.g., floating socket) may be formed as a disc, block, plate or other bearing member that is discrete with respect to the valve body 242 and the housing 240, such as a ring or washer with a cupped spherical surface through which the valve body 242 extends.

To facilitate radial floating and/or support of the engagement member 281, the compensator 280 (intermediate part or intermediate assembly) also may include a push plate 292, or piston, between the biasing member 290 and the engagement member 281. As shown, the push plate 292 and engagement member 281 are discrete with respect to each other such that the engagement member 281 (e.g., socket) is radially movable relative to the push plate 292. By virtue of the pushing by the biasing member 290, the push plate 292 and the engagement member 281 may move axially together.

The push plate 292 may have any suitable form and does not necessarily need to be a thin, flat piece. In the illustrated embodiment, for example, the push plate 292 includes a flat front side with a central opening 294 through which the valve body 242 extends, and includes an axially extending cylindrical portion 295 that forms a recess for receiving a front portion of the biasing member 290. Similarly to the second housing abutment 66 described above, the push plate 292 may serve as a stop to axial movement of the valve body 242, but in the illustrated embodiment the push plate 292 is axially moveable relative to the housing 240 and is operative to apply force to the shoulder portion 256 of the valve body 242 via the biasing member 290 and engagement member 281. As shown in the illustrated embodiment, the push plate 292 may be slidably disposed in the internal chamber 248 of the housing 240.

Although not shown in the illustrated embodiment, it is understood that the coupling member 212 may have additional components such as those described above. For example, the coupling member 212 may include the support member 189 (e.g., plate, ring, disc or washer) between the engagement member 281 (e.g., floating socket) and the push plate 292 to accommodate more radial travel while still keeping the edges of the engagement member 281 and the support member 189 fully supported around the perimeter.

The biasing member 290 may be any suitable device that biases the engagement member 281 against the valve body 242. In the illustrated embodiment, the biasing member 290 is a coil spring that encompasses the longitudinal axis 251. As shown, the spring 281 may be received in the recess formed by the axial portion 295 of the push plate 292 and may abut a rearward surface or retaining ring 267 of the housing 240.

As is apparent in the illustrated embodiment, the biasing member 290 is operative to maintain engagement of the engagement member 281 (e.g., socket) with the radial shoulder portion 256 of the valve body 242 via pushing with the push plate 292 irrespective of the mating state of the blind mate coupling 210.

For example, in the illustrated state, the blind mate coupling 210 is in an exemplary initial mating state in which the biasing member 290 is uncompressed. The illustrated state thus also corresponds with the exemplary decoupled state of the male member 212. The biasing member 290 pushes the push plate 292 against the engagement member 281 which engages and pushes the valve body shoulder portion 256 to urge the valve body 242 forwardly. In the illustrated state, the valve body 242 is stopped by the forward housing abutment 264. By virtue of the tapered surface 270 of the forward housing abutment 264 and the tapered surface 272 of the shoulder portion 256, the compensator 280 is operative to self-center the valve body 242 along the longitudinal axis 251 of the housing 240. The concave interface 284 between the engagement member 281 and the rearward side of shoulder portion 256 also may facilitate such self-centering. When the axial closing force between the coupling members 14, 212 is sufficient to compress the biasing spring 290 of the compensator 280, the male coupling member 212 is able to compensate for misalignments between the valve body 242 and housing 240, which may be caused by misalignments between the male member 212 and female member 14, as described above. Such misalignments may be in the partially mated state as would be apparent with exemplary reference to FIGS. 4 and 5 described above, for example.

When the coupling members 14, 212 are fully-mated, the biasing member 290 may further compress until the rearward end of the push plate 292 abuts the rearward end or retaining ring 267 of the housing 240. The conical receptacle 25 of the female member 14 may guide the valve body 242 toward center, and fluid communication is established between the coupling members 14, 212, as is apparent with exemplary reference to FIG. 6 described above, for example.

Turning to FIGS. 9-17B, another exemplary embodiment of a blind mate coupling 310, including an exemplary male member 312 and female member 314 is shown. The blind mate coupling 310 is substantially similar to the above-referenced blind mate couplings 10, 110, 210 and consequently the same reference numerals but in the 300-series are used to denote structures corresponding to the same or similar structures in the couplings 10, 110, 210. In addition, the foregoing description of the blind mate couplings 10, 110, 210 in particular the male member 12, 112, 212, is equally applicable to the coupling 310 and male member 312, except as noted below. It is also understood that aspects of the coupling members 12, 112, 212, 312 may be substituted for one another or used in conjunction with one another where applicable.

Figure 9:
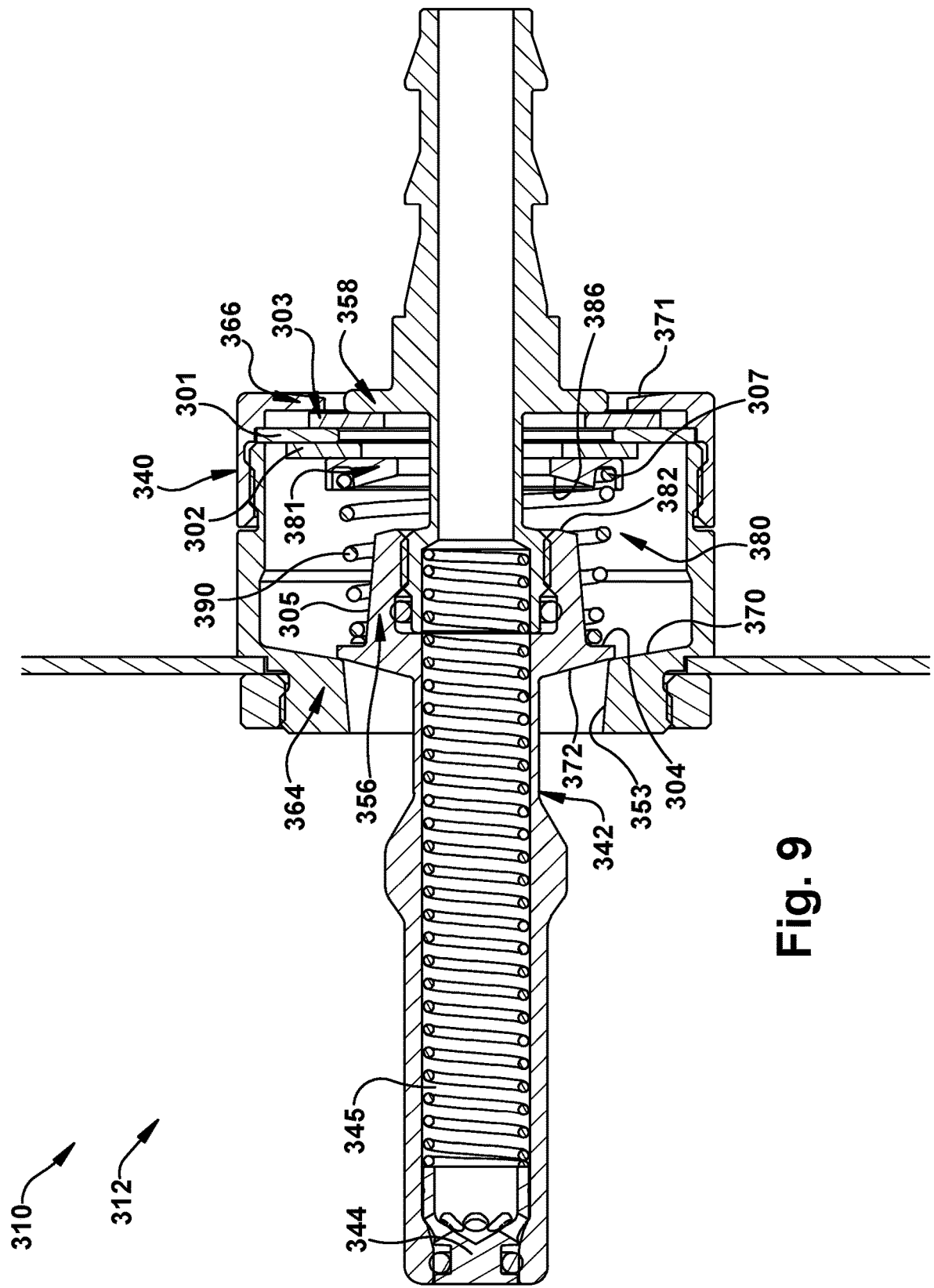
FIG. 9 shows an exemplary male coupling member according to another embodiment in a centered (aligned) and decoupled state.
Figure 10:
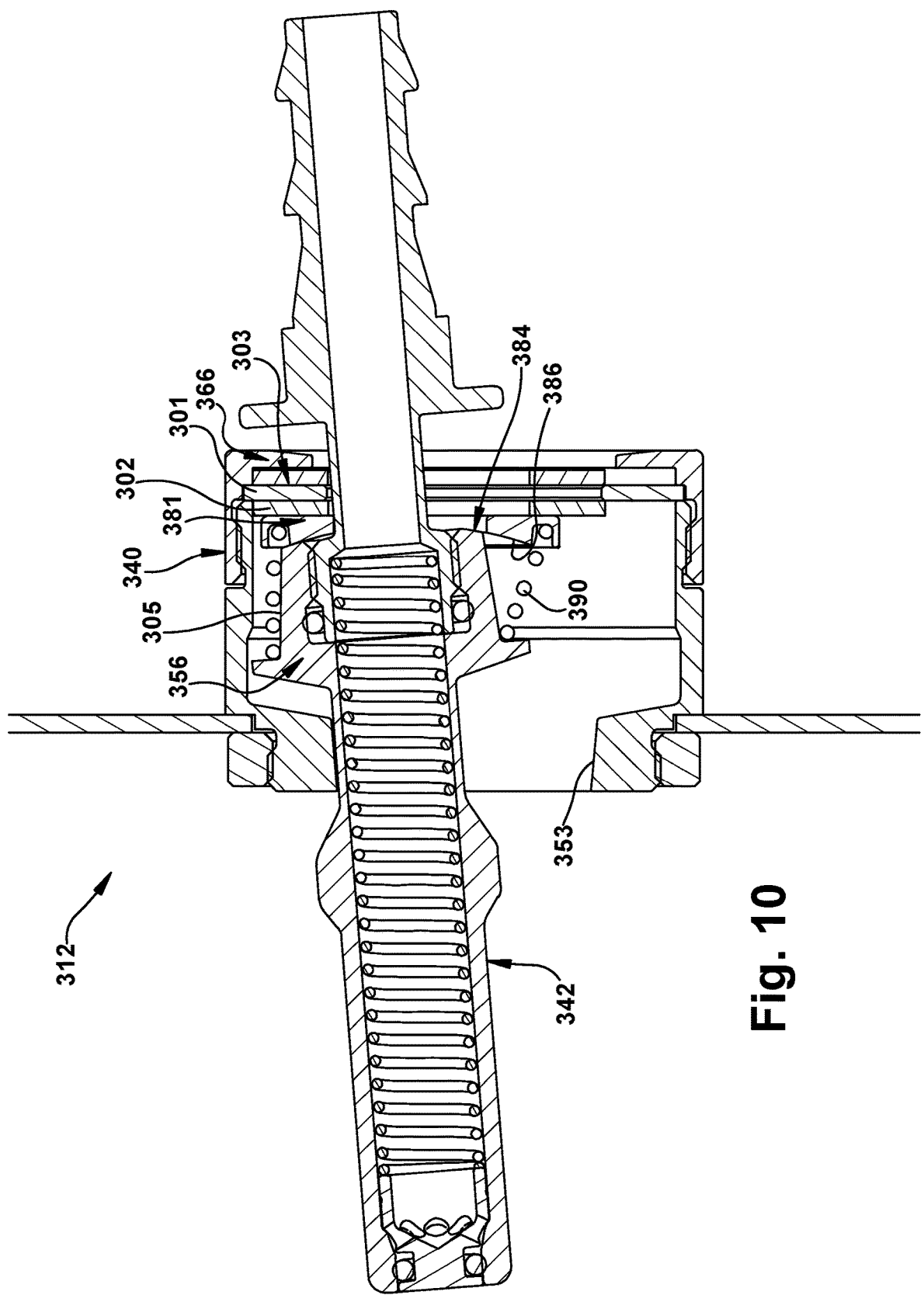
FIG. 10 shows the male coupling member in FIG. 9 in coupled state at full offset angle.
Figure 11:
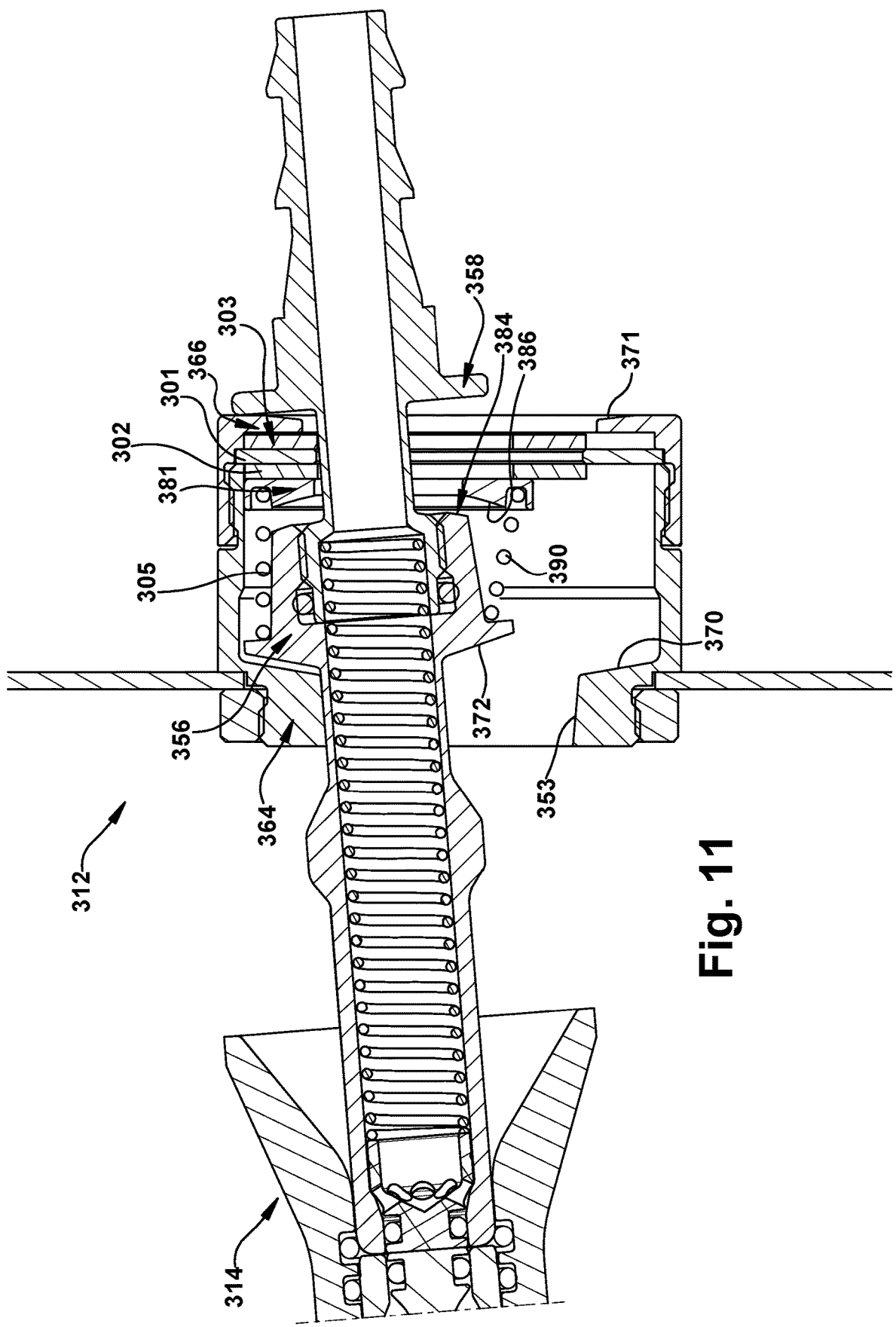
FIG. 11 shows the male coupling member in FIG. 9 during a disconnecting state at an angle.
Figure 12:
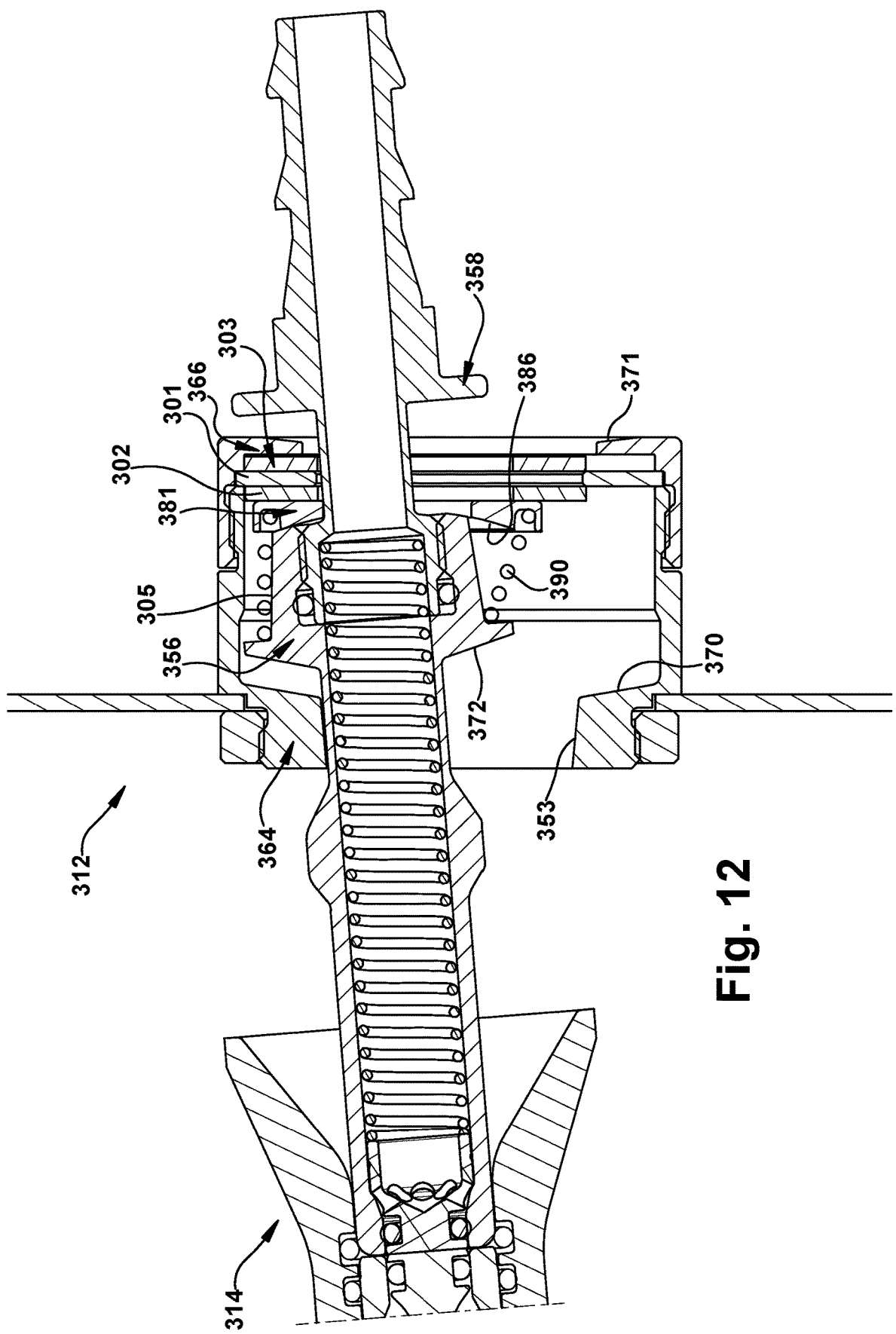
FIG. 12 shows the male coupling member in FIG. 9 in a connected state at full radial offset.
Figure 13:
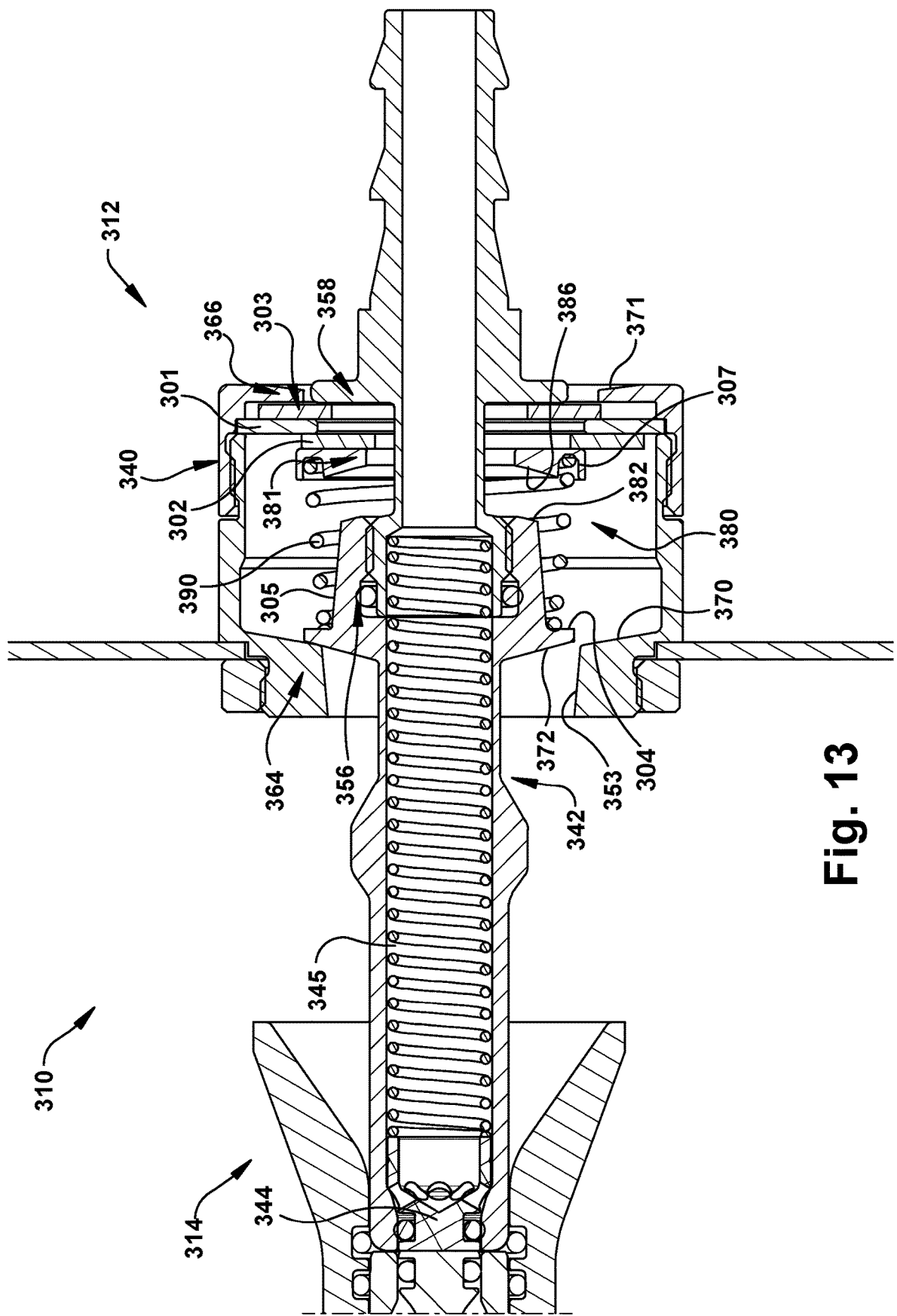
FIG. 13 shows disconnection of the male coupling member in FIG. 9 at full radial offset.
Figure 14:
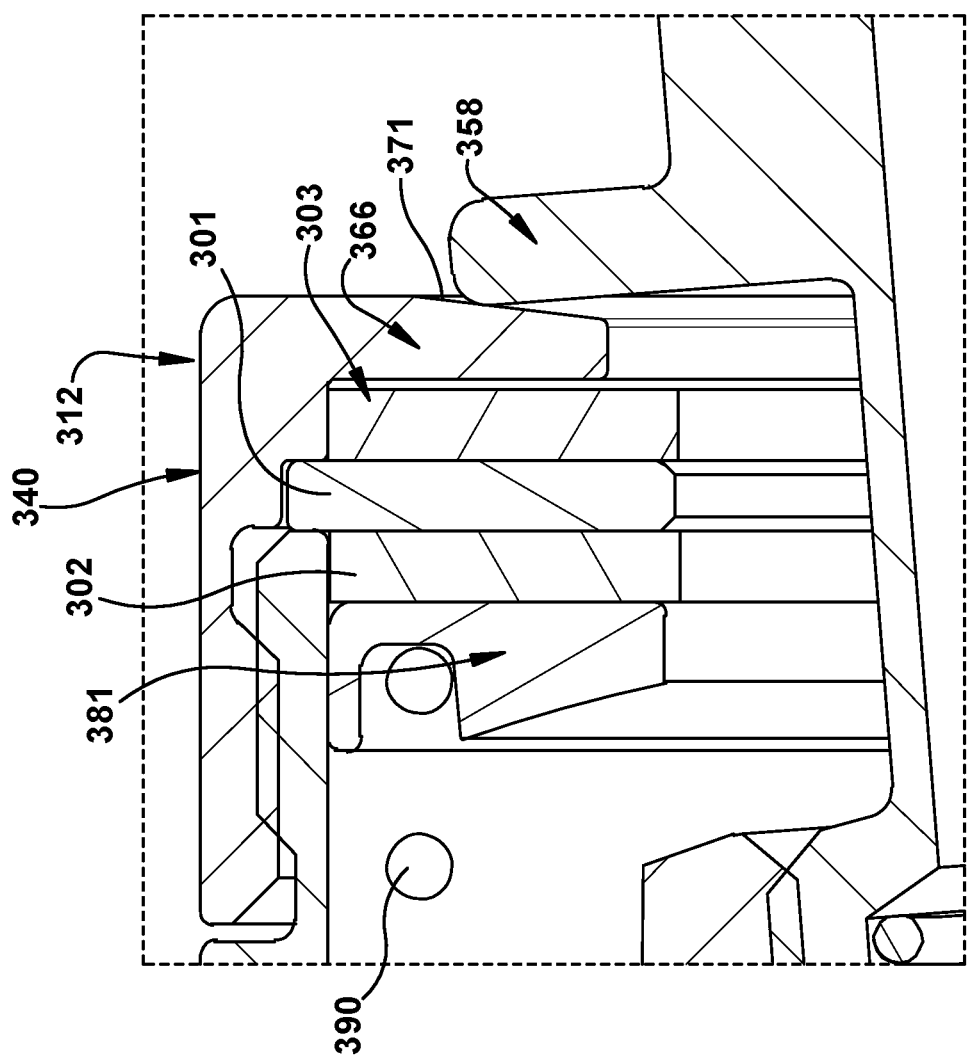
FIG. 14 is an enlarged view of a rear portion of the male member in FIG. 9 illustrating centering functionality.
Figure 15:
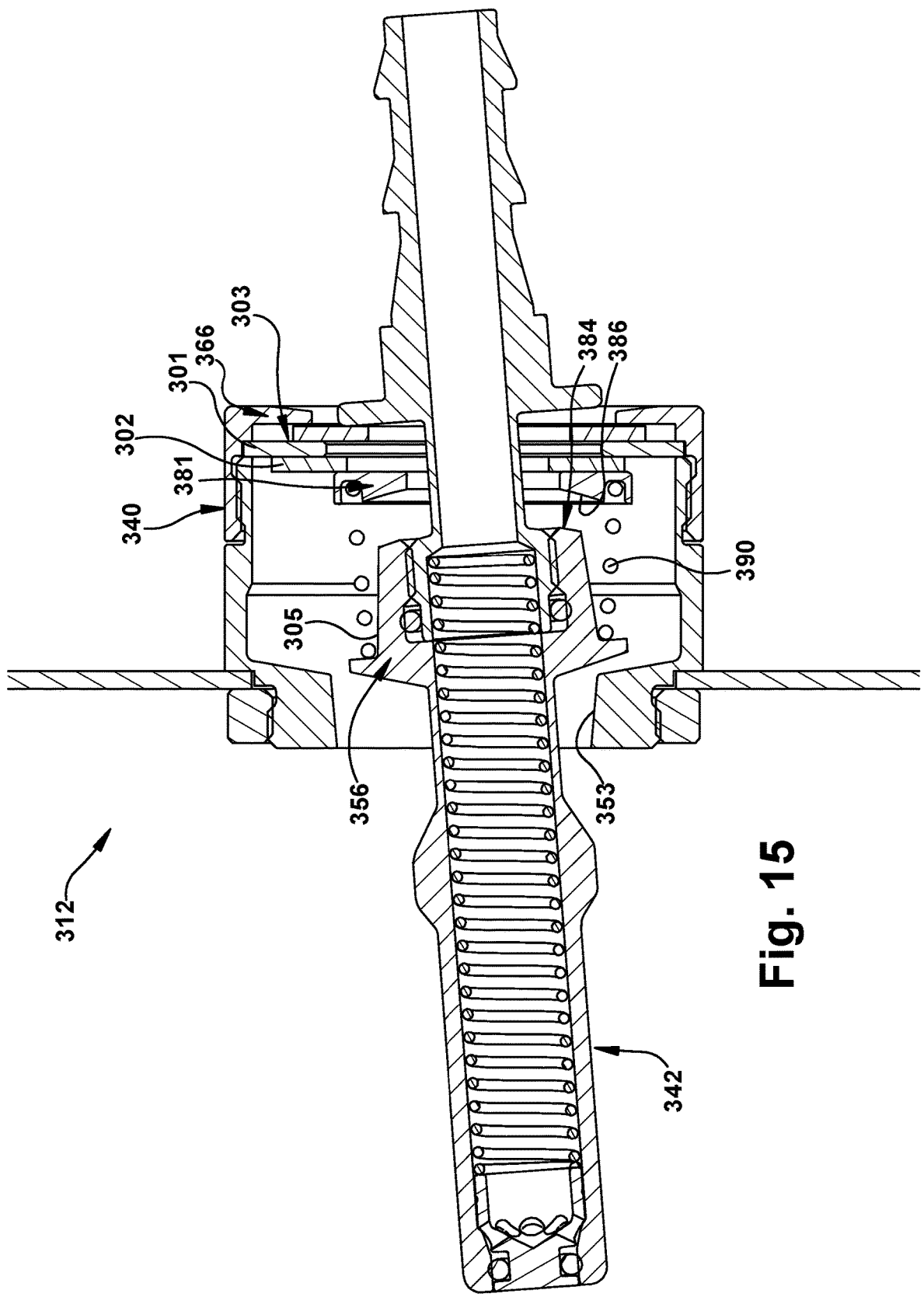
FIG. 15 illustrates centering of the male member in FIG. 9 in a disconnected state.

FIG. 9 shows the exemplary male coupling member 312 in a centered (aligned) and decoupled state. FIG. 10 shows the male coupling member 312 in coupled state (with the female member, unshown in the illustration) at full offset angle. FIG. 11 shows the male coupling member 312 during a disconnecting state at an angle. FIG. 12 shows the male coupling member 312 in a connected state at full radial offset. FIG. 13 shows disconnection at full radial offset. FIG. 14 is an enlarged view of a rear portion of the male member 312 illustrating centering functionality. FIG. 15 illustrates centering of the male member 312 in a disconnected state. FIGS. 16A-16D illustrate a disconnecting sequence of the male member 312. FIGS. 17A and 17B illustrate additional centering functionality of the male member 312.

Similarly to the foregoing male coupling members 12, 112, 212 the male coupling member 312 generally includes a housing 340, a valve body 342 at least partially extending through the housing 340, and a valve member 344 within an internal fluid passage 345 of the valve body 342 for opening and closing the fluid passage 345.

In exemplary embodiments, the alignment mechanism of coupling 312 includes a forward engagement part that cooperates with the valve body 342 to facilitate alignment and/or centering of the valve body. In the illustrated embodiment, the forward engagement part is a fixed stop in the form of a radially extending abutment 364 of the housing 340 that is configured to interface against a radially extending shoulder portion 356 (or abutment) of the valve body 342. As shown, the valve body shoulder portion 356 has a tapered or rounded forward surface 372 that is configured to engage a tapered or rounded rearward surface 370 of the housing abutment 364 to facilitate centering and/or alignment.

In exemplary embodiments, the alignment mechanism of coupling 312 also includes a rearward engagement part that cooperates with the valve body 342 to facilitate alignment and/or centering of the valve body. In the illustrated embodiment, the rearward engagement part is a fixed stop in the form of a radially protruding second shoulder portion 366 (or abutment) of the housing 340. The second abutment 366 is axially spaced apart from the first abutment 364 and is configured to interface against a radially protruding second shoulder portion 358 (or abutment) of the valve body 342 which is axially spaced apart from the first shoulder portion 356. In the embodiment of FIG. 9, the second housing abutment 366 is located at an axially rearward end of the housing 340. As shown, a second engagement surface 371 of the second abutment 366 of the housing is a tapered surface, but also could be rounded or the like. The second shoulder portion 358 of the valve body may be a corresponding rounded or tapered surface. In the illustrated embodiment, the second shoulder portion 358 of the valve body is a rounded surface that provides point contact when engaging the second engagement surface 371.

In exemplary embodiments, the alignment mechanism of coupling 312 further includes an intermediate part that is radially movable relative to the housing 340 and which cooperates with the valve body 342 to facilitate alignment and/or centering. In the illustrated embodiment, for example, the intermediate part is disposed within the housing 340 and includes a movable engagement member 381 that is adapted to engage a shoulder surface (of the valve body (e.g., shoulder portion 356) to facilitate alignment and/or centering. Similarly to the engagement member(s) described above, the engagement member 381 may be any suitable structure in any suitable form, such as a disc, block, plate, or other bearing member that is discrete with respect to the valve body 342 and the housing 340. In the illustrated embodiment, the engagement member 381 is formed as a ring, such as a washer, through which the valve body 342 extends.

As shown, the intermediate part of the alignment mechanism is an assembly that further includes a biasing member 390 configured to operatively urge the valve body 342 toward an aligned and/or centered position. In the illustrated embodiment, the engagement member 381 and biasing member 390 form parts of a compensator 380 that is configured to compensate for misalignment of the valve body 342 relative to the housing 340 and/or to provide self-centering functionality. As described above, the compensator 380 generally may be configured to avoid the angular misalignment of the two coupling halves from creating an axial displacement of the nose portion that would otherwise add to the amount of axial misalignment tolerance that is needed. The configuration of the compensator 380 also may enable the coupling to have a more even force distribution that may contribute to the smoothness of its alignment functionality.

In exemplary embodiments, the compensator 380 serves as a mover, such as a pusher or puller, that compensates for misalignment. In the illustrated embodiment, the biasing member 390 is between the engagement member 381 and the shoulder portion 356 of the valve body, thereby urging the valve body 342 forwardly and the engagement member 381 rearwardly. The biasing member 390 may be any suitable device that biases the engagement member 381 against the valve body 342. In the illustrated embodiment, the biasing member 390 is a coil spring that encompasses the longitudinal axis.

Similarly to the other radially movable engagement members described in the foregoing embodiments, the engagement member 381 shown in FIG. 9 is configured to cooperate with the valve body 342 via a concave interface 384 to facilitate centering and/or alignment. For example, as shown in the illustrated embodiment, the engagement member 381 is configured to engage with a rearward surface 382 of the shoulder portion 356 via concave interface 384. In the illustrated embodiment, the engagement member 381 has a concave surface 386 (e.g., spherical surface), which may serve as a socket for receiving and guiding the valve body shoulder portion 356. The rearward engagement surface 382 of the shoulder portion 356 has a complementary convex surface 382 that interfaces with the concave surface 386 of the engagement member 381. As discussed above, the concave interface 384 between the valve body shoulder portion 356 and the engagement member 381 provides the ability to compensate for misalignment of the valve body 342 relative to the housing 340. As noted above, it is understood that the convex and concave surfaces of the shoulder portion 356 and engagement member 381 could be reversed and still provide a concave interface 384, though the cupped form of the engagement member 381 may be preferred.

The engagement member 381 (e.g., socket) is radially movable in a floating manner relative to the housing 340 to enhance the radial and/or angular misalignment capability of the coupling member 312. In the embodiment of FIG. 9, the engagement member 381 is pushed against a rearward surface to serve as an axial stop and which improves centering of the engagement member 381. In the illustrated embodiment, the biasing member 390 is axially forward of the engagement member 381 between the engagement member 381 and shoulder portion 356. As shown, one end of the biasing member 381 is supported by engagement member 381, such as within a groove 307 of the engagement member 381, such that the engagement member serves as a radially movable spring seat. The biasing member 390 may directly engage against the shoulder portion 356 on its opposite end. As shown, the shoulder portion 356 may have a radial extension 304, groove, or the like for capturing the end of the biasing member 390.

In exemplary embodiments, the intermediate part of the alignment mechanism also may include a stop 301 fixed relative to the housing 340, such as between the first and second abutments 364, 366 of the housing. The intermediate part of the alignment mechanism also may include one or more floating supports 302, 303 that cooperate with the radially movable engagement member 381 and fixed stop 301. As shown, first floating support 302 (e.g., plate or washer) is located between the stop 301 and the engagement member 381, and second floating support 303 (e.g., plate or washer) may be located between the stop 301 and the second abutment 366 of the housing. These floating supports 302, 303 are radially movable relative to the housing 340 and the valve body 342, and cooperate with the engagement member 381 to facilitate alignment capabilities of the valve body 342 and/or help to reduce the size of the coupling 312. For example, the floating supports 302, 303 help to cover a gap in travel distance of the valve body 342. Thus, it is understood that the coupling 312 could be devoid of one or more of the supports 302, 303, but this may result in a coupling 312 that would be larger in diameter.

Although not shown in the illustrated embodiment, it is understood that the coupling member 312 may have additional components such as those described above. For example, the coupling member 312 may include push plates, etc., as would be understood by those having ordinary skill in the art. Although the exemplary operation of the coupling member 312 is apparent from the foregoing descriptions of other embodiments, such operation is described in further detail below.

Referring to FIG. 10, the coupling member 312 is shown in coupled state (with the female member, unshown in the illustration) at full offset angle. The biasing member 390 is compressed and the rearward surface 382 of the shoulder portion 356 interfaces with the concave surface 386 of the engagement member 381. As shown, a radially outer surface 305 of the shoulder portion 356 may be inclined relative to the longitudinal axis of the valve body to facilitate movement of the biasing member 390. At the full angle, the floating supports 302, 303 and the engagement member 381 are moved radially (e.g., upward in the illustration). The forward opening 353 has an inclined surface to engage the radially outer surface of the valve body 342 at the inclined angle.

FIG. 11 shows the male coupling member 312 during a disconnecting state at an angle. The second shoulder portion 358 of the valve body 342 engages the second abutment 366 (e.g., rearward surface) of the housing 340. In the illustrated state, the first shoulder portion 356 of the valve body 342 does not engage the engagement surface 371 of the first abutment 364 of the housing 340. The biasing member 390 has relaxed and the rearward surface 382 of the shoulder portion 356 is disengaged from the concave surface 386 of the engagement member 381.

FIG. 12 shows the male coupling member 312 in a connected state at full radial offset. The biasing member 390 is compressed such that the rearward surface 382 of the shoulder portion 356 interfaces with the concave surface 386 of the engagement member 381. The floating supports 302, 303 and the engagement member 381 are moved radially (e.g., upward in the illustration).

FIG. 13 shows disconnection at full radial offset. The second shoulder portion 358 of the valve body 342 engages the second abutment 366 (e.g., rearward surface) of the housing 340. In the illustrated state, the first shoulder portion 356 of the valve body 342 does not engage the surface 370 of the first abutment 364 of the housing 340. The biasing member 390 has relaxed and the rearward surface 382 of the shoulder portion 356 is disengaged from the concave surface 386 of the engagement member 381.

FIG. 14 is an enlarged view of a rear portion of the male member 312 illustrating centering functionality. As shown, the angled (tapered) surface of the second abutment 366 of the housing (rear surface) is just steep enough to urge the floating valve body 342 back to center when fully disconnected. The angle also is just steep enough to keep the floating valve body 342 from shifting to center as the nose of the male Is exiting from the female bore, thereby reducing a binding condition that would otherwise make the parts more difficult to disconnect.

FIG. 15 illustrates centering of the male member 312 in a disconnected state. As shown, axial force from the biasing member 390 and moment from shoulder 358 (e.g., flange) act to rotate the floating valve body 342 to a position perpendicular to the face of the housing 340.

Figure 16A:
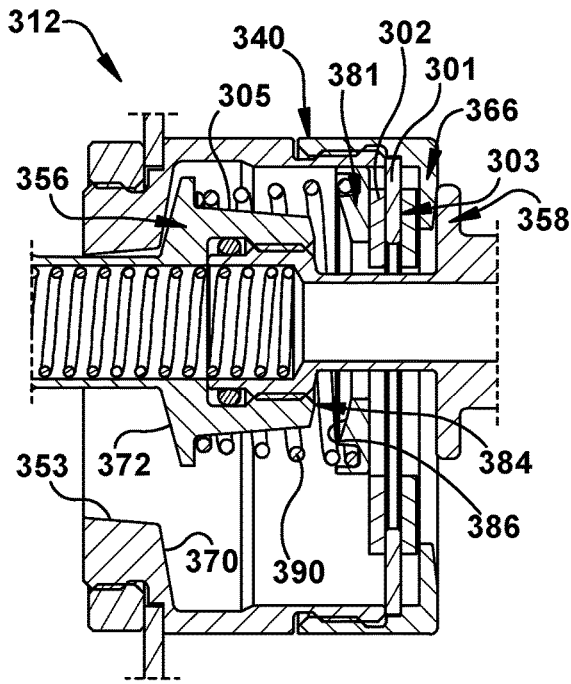
FIGS. 16A-16D illustrate a disconnecting sequence of the male member in FIG. 9.
Figure 16B:
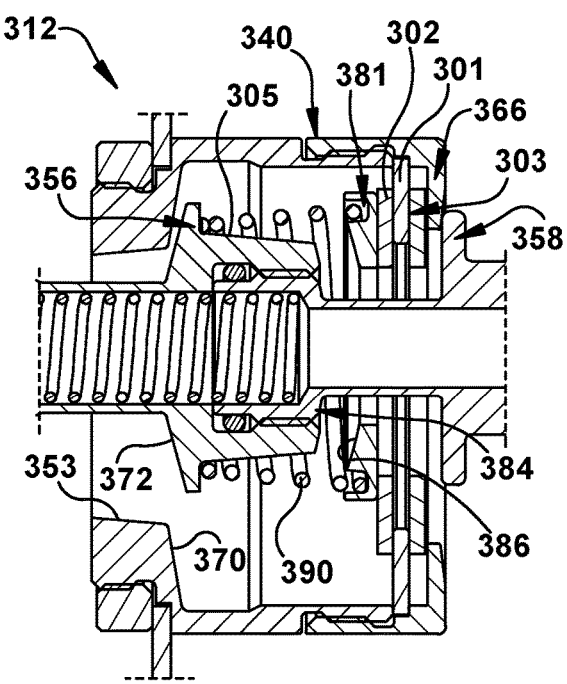
Figure 16C:
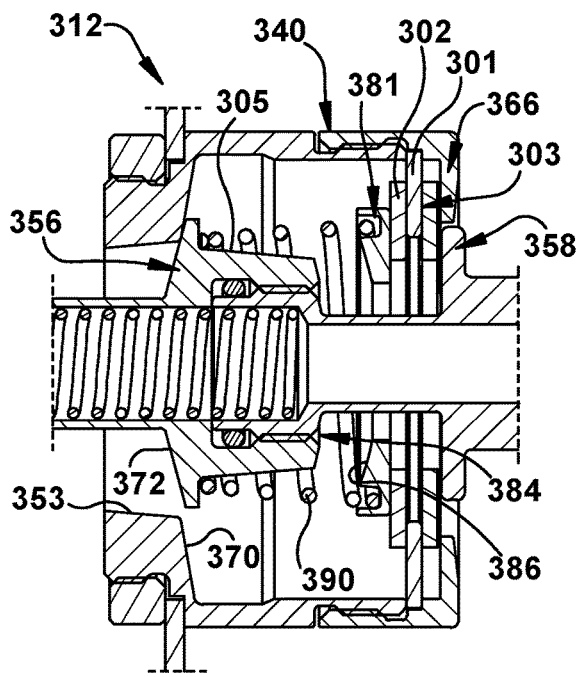
Figure 16D:
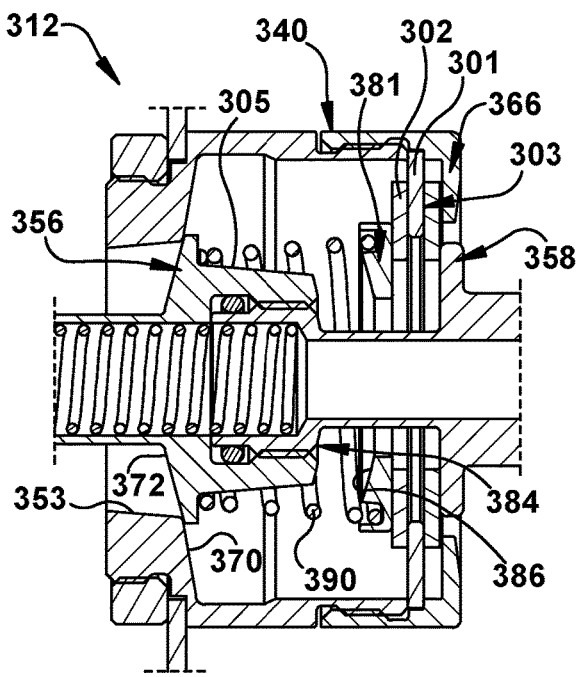
Figure 17A:
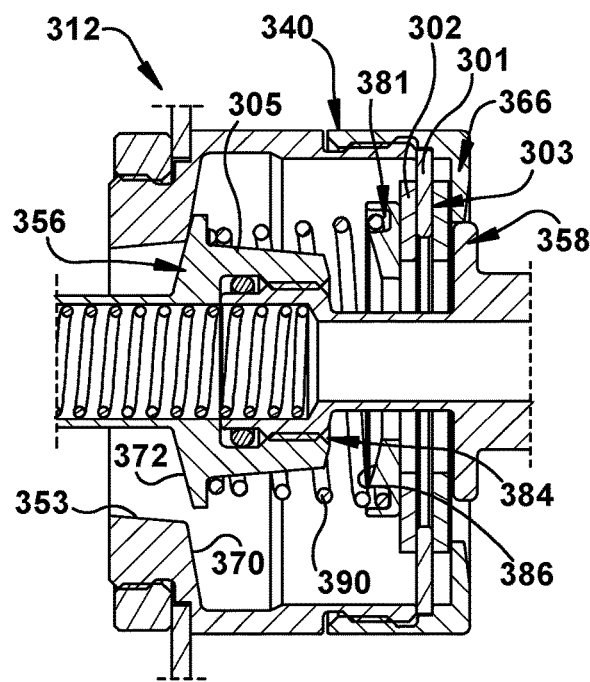
FIGS. 17A and 17B illustrate additional centering functionality of the male member in FIG. 9.
Figure 17B:
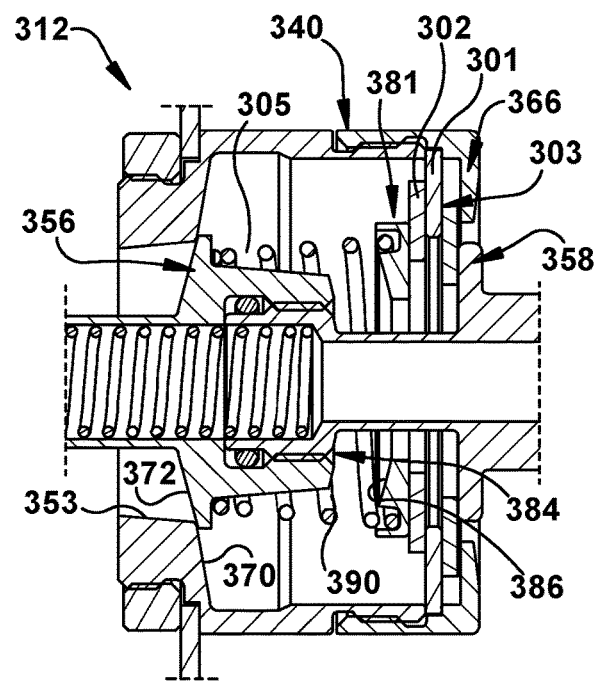

FIGS. 16A-16D illustrate a disconnecting sequence of the male member 312. Generally, when disconnecting, the interaction of the second housing abutment 366 (e.g., rear surface of housing) and valve body second shoulder 358 (e.g., flange) keeps the inner nose piece from driving back to center and binding in the female half. FIG. 16A shows full radial offset, in which the valve body second (rear) shoulder 358 engages the housing second (rear) abutment 366, but no contact is made between the valve body (forward) shoulder 356 and the first (forward) housing abutment 364. FIG. 16C shows contact between the valve body (forward) shoulder 356 and the first (forward) housing abutment, but the valve body second (rear) shoulder 358 does not engage the tapered surface of the housing second (rear) abutment 366; rather the valve body second (rear) shoulder 358 is within the opening formed by the second (rear) abutment 366. FIG. 16D shows a centered condition, in which the combination of the valve body second (rear) shoulder 358 and the axial force of biasing member 390 make the assembly resistant to having the floating parts rest at an angled position.

FIGS. 17A and 17B illustrate additional centering functionality of the male member 312. As shown, the inner angle of the housing first (forward) abutment 364 and the angle on the first (forward) shoulder portion of the valve body 342 (e.g., floating nose piece) act to limit the amount the floating valve body 342 can stray from the centerline of the housing. Here again, the coupling member 312 has the right balance of an angle that is of the appropriate steepness to urge to center but not bind the coupler if it is being disconnected with only the amount of radial offset shown. As shown in the illustration, the valve body 342 comes forward to rest with the second (rear) shoulder portion 358 in the opening of the housing 340 and with primary contact on the second floating support 303 (e.g., washer or plate). The opening formed in the rear of the housing 340 by the second (rear) abutment 366 along with the engagement with the first (forward) abutment 364 limits how much the floating valve body 342 can move radially in the disconnected state.

FIG. 18 shows another exemplary embodiment of a blind mate coupling 410, and specifically an exemplary male member 412 with the female member not shown. The blind mate coupling 410 is substantially similar to the above-referenced blind mate couplings 10 through 310, and consequently the same reference numerals but in the 400-series are used to denote structures corresponding to the same or similar structures in the couplings 10 through 310. In addition, the foregoing description of the blind mate couplings 10 through 310, in particular the male member 12, 112, 212, 312 is equally applicable to the coupling 410 and male member 412, except that the second (rear) abutment 466 is formed as a discrete plate held within the housing 340 via a retaining ring. The angle of the first (forward) abutment 464 also is greater in the embodiment shown in FIG. 18. It is of course understood that aspects of the coupling members 12 through 412 may be substituted for one another or used in conjunction with one another where applicable.

Figure 19:
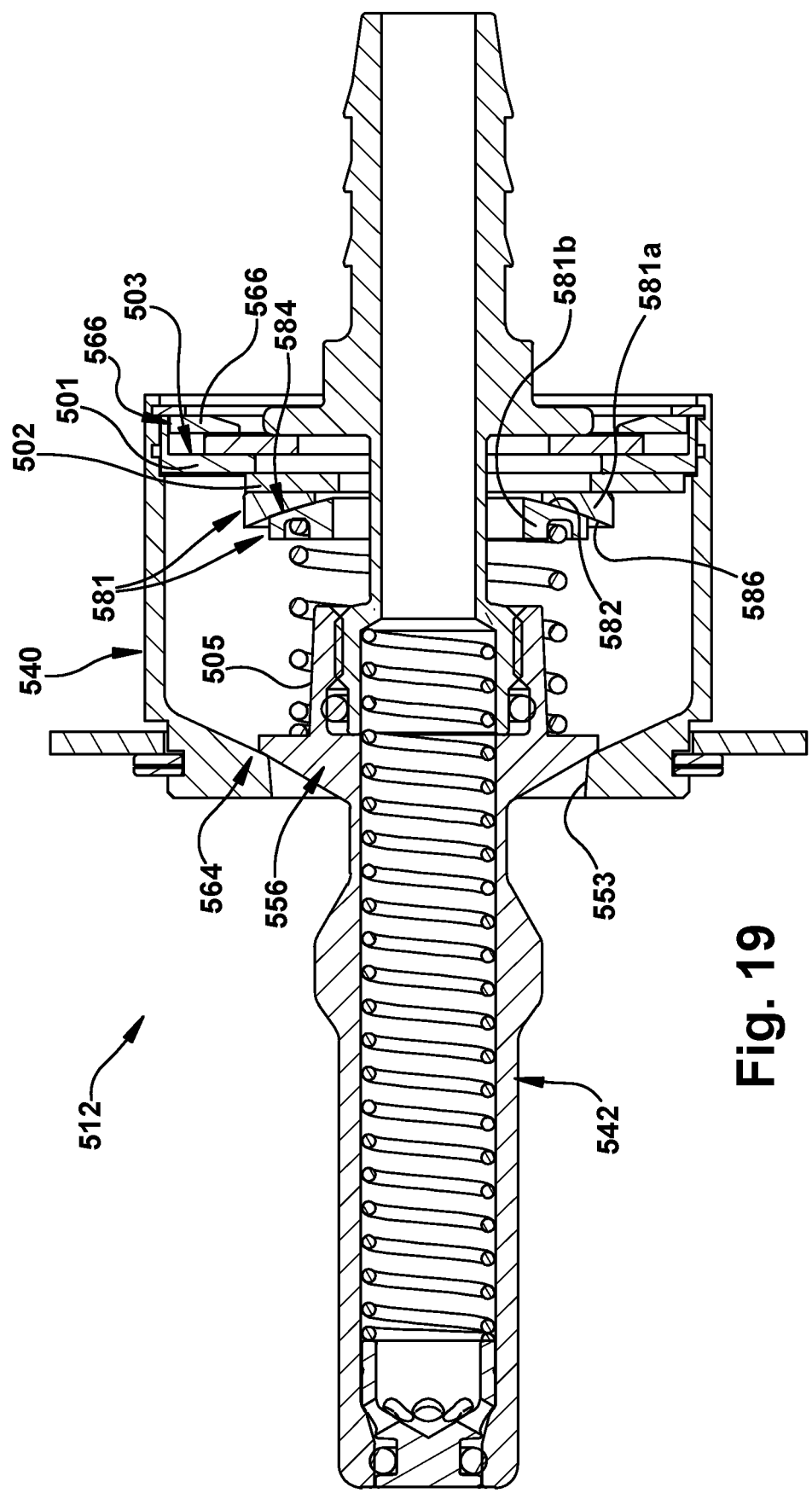
FIG. 19 shows another exemplary male coupling member according to an embodiment.

FIG. 19 shows another exemplary embodiment of a blind mate coupling 510, and specifically an exemplary male member 512 with the female member not shown. The blind mate coupling 510 is substantially similar to the above-referenced blind mate couplings 10 through 410, and consequently the same reference numerals but in the 500-series are used to denote structures corresponding to the same or similar structures in the couplings 10 through 410. In addition, the foregoing description of the blind mate couplings 10 through 410, in particular the male member 12, 112, 212, 312, 412 is equally applicable to the coupling 510 and male member 512, except that the engagement member 581 includes a first part 581*a* that is movable relative to a second part 581*b*, and in which the concave interface 584 is formed between first and second movable engagement parts 581*a*, 581*b*. The spring 590 in this embodiment is a compression spring instead of a conical spring. It is of course understood that aspects of the coupling members 12 through 512 may be substituted for one another or used in conjunction with one another where applicable.

Figure 20:
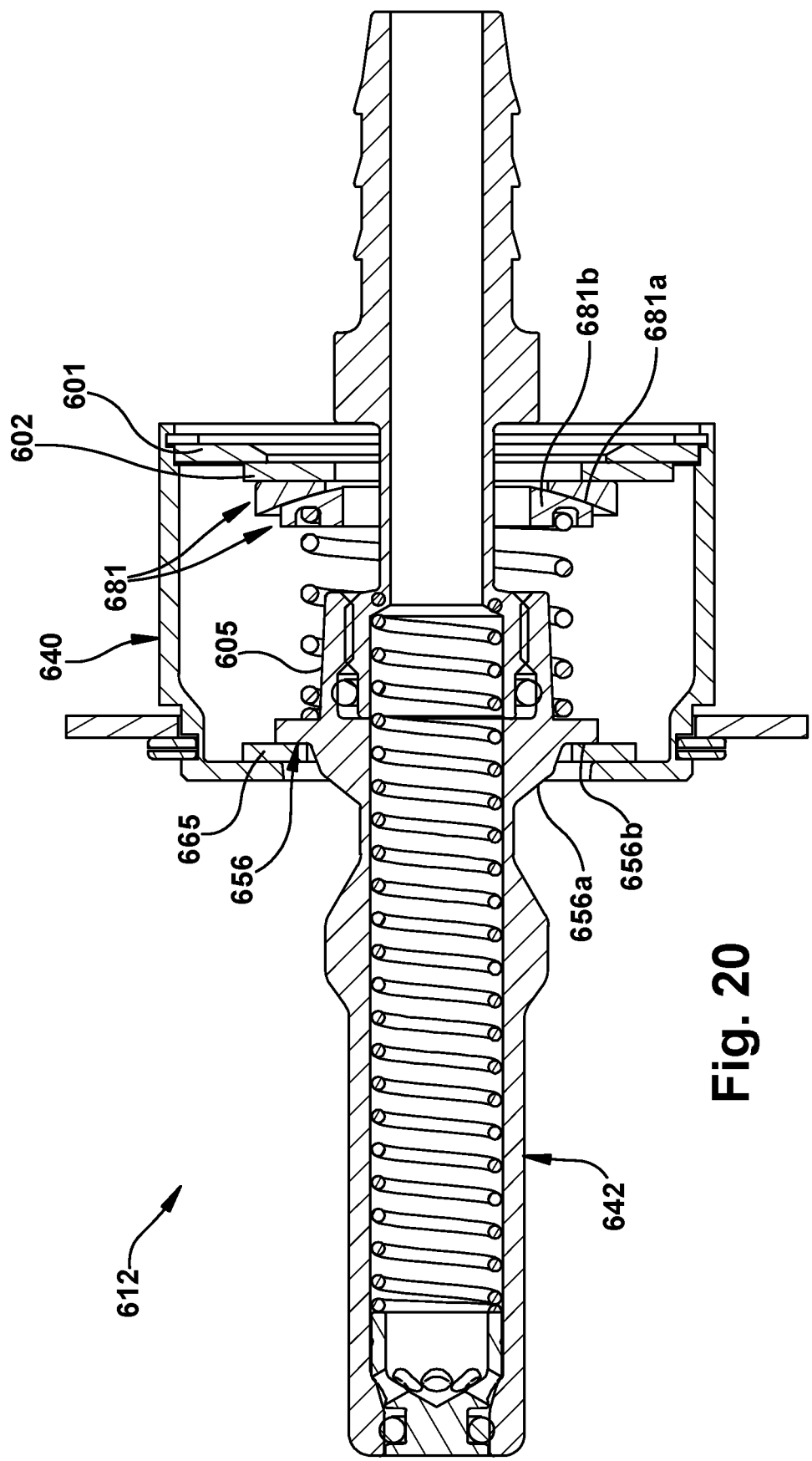
FIGS. 20-22 show another exemplary male coupling member according to an embodiment.
Figure 21:
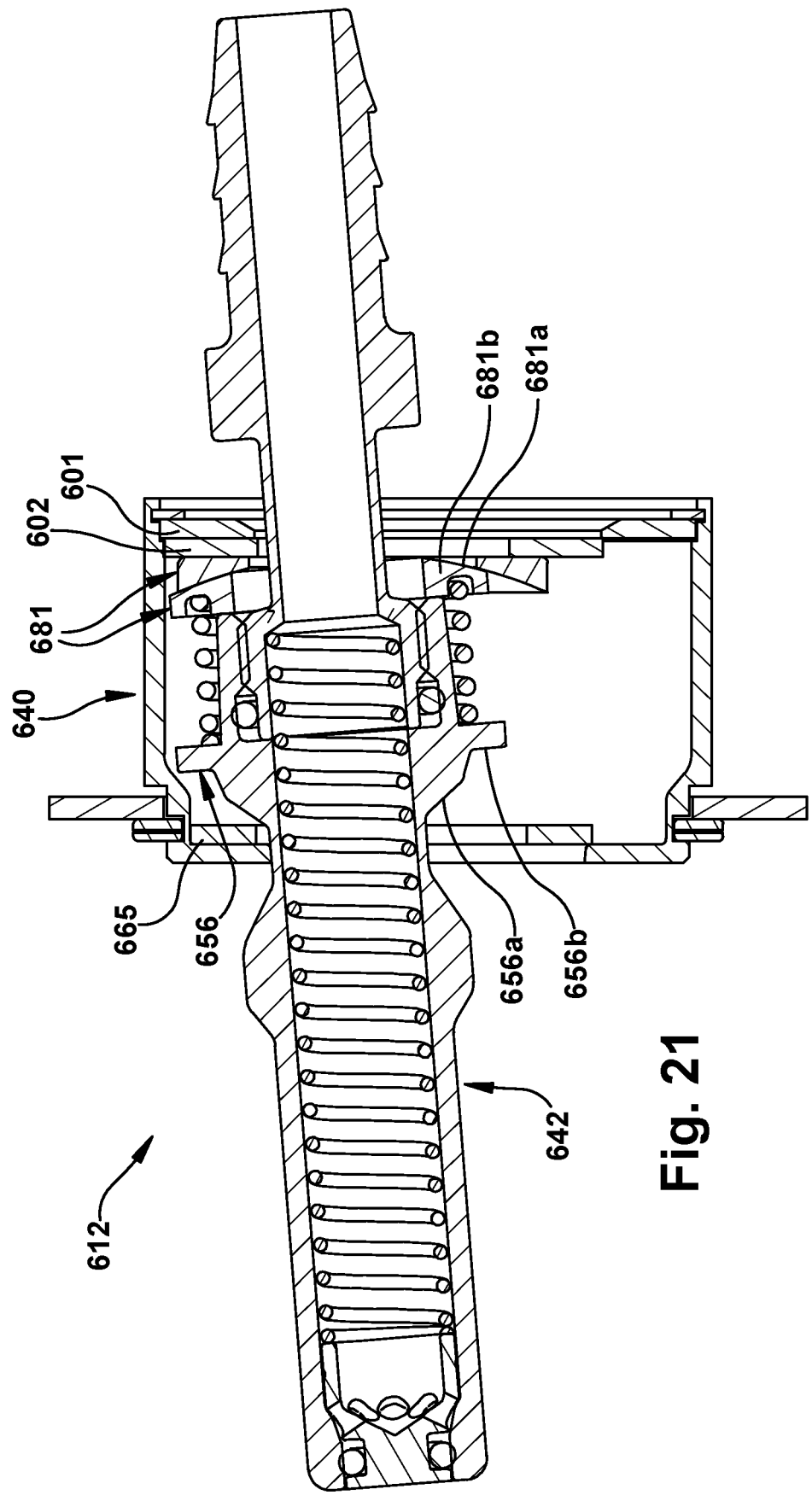
Figure 22:
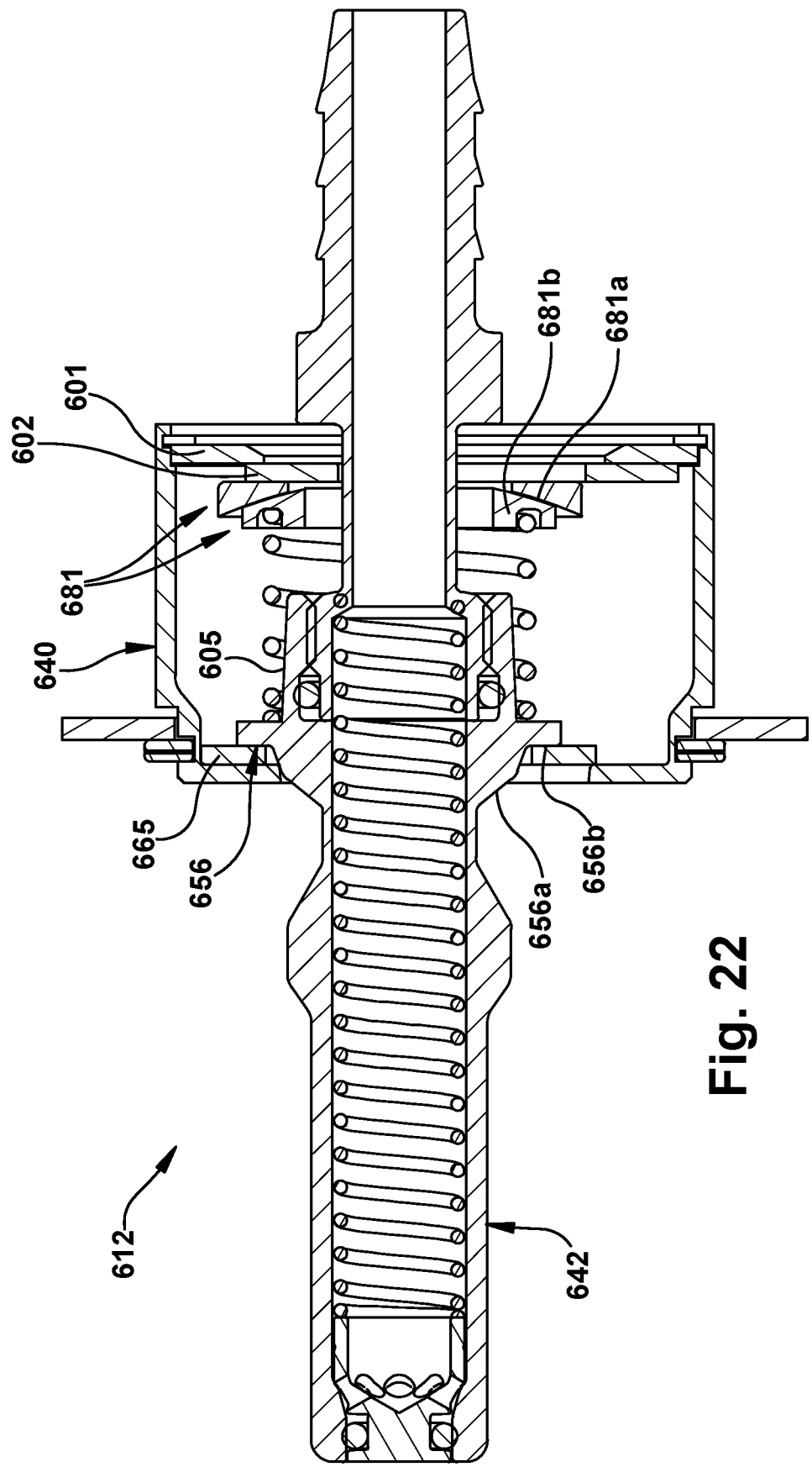
Figure 23:
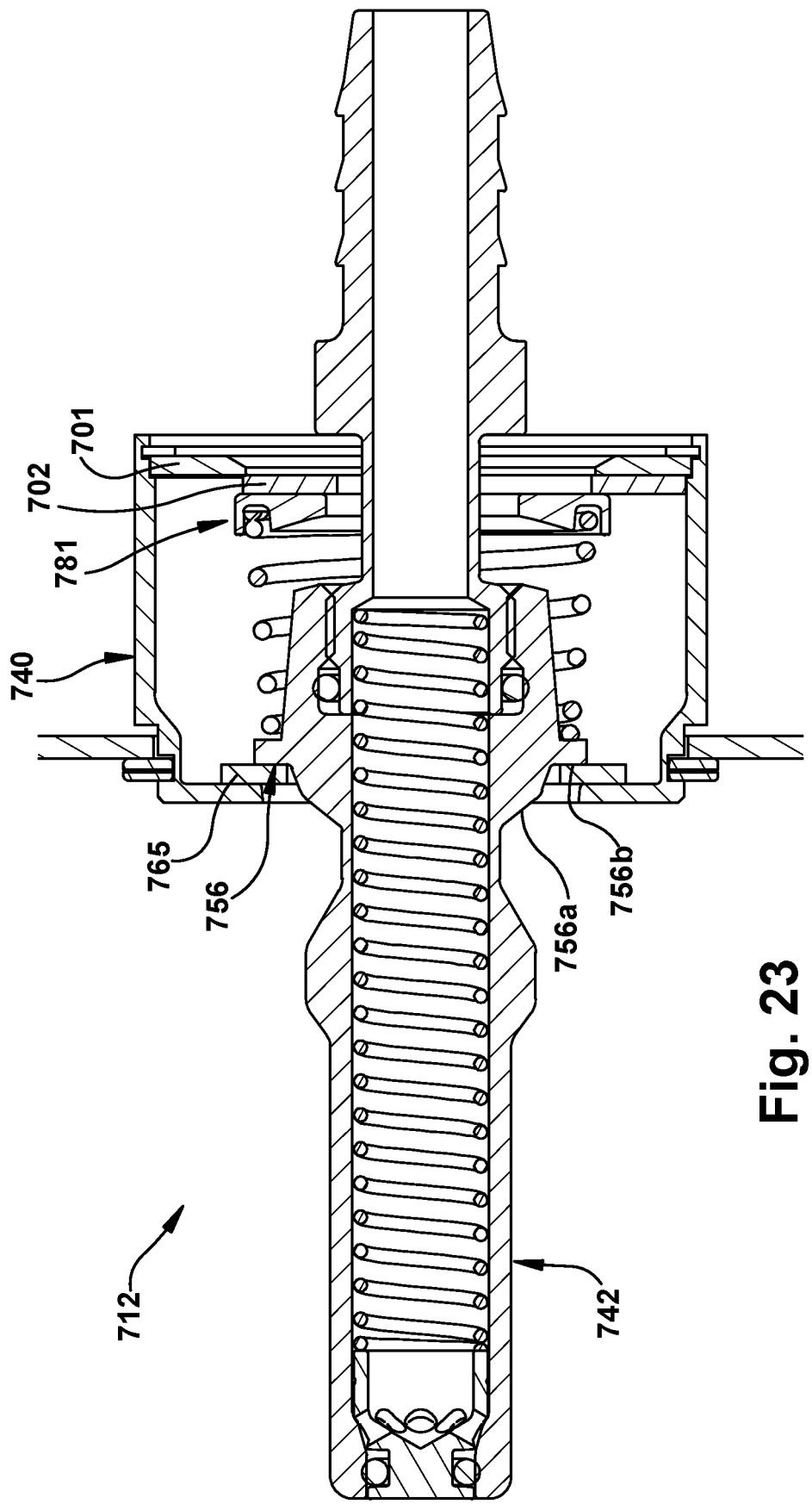
FIG. 23 shows another exemplary male coupling member according to an embodiment.

FIGS. 20-22 show another exemplary embodiment of a blind mate coupling 610, and specifically an exemplary male member 612 with the female member not shown. The blind mate coupling 610 is substantially similar to the above-referenced blind mate couplings 10 through 510, and consequently the same reference numerals but in the 600-series are used to denote structures corresponding to the same or similar structures in the couplings 10 through 510. In addition, the foregoing description of the blind mate couplings 10 through 510, in particular the male member 12, 112, 212, 312, 412, 512 is equally applicable to the coupling 610 and male member 612, except generally the configuration of the forward engagement surfaces is different. More particularly, the valve body 642 includes a forward radially extending shoulder portion 656 (or abutment) that includes an angled shoulder portion 656*a* (e.g., tapered or rounded) and a vertical shoulder portion 656*b* that is radially outward of the angled shoulder portion 656*a*. In the illustrated embodiment, the forward shoulder portion 656 of the valve body is configured to interact with a forward movable engagement member 665 (e.g., plate or washer) that is axially rearward of a radially extending abutment 664 portion of the housing 640 (e.g., within the space of the housing 640). The forward movable engagement member 665 can move radially and facilitates alignment and/or centering of the valve body relative to the housing. For example, as shown in FIG. 22, at a full offset angle, the forward movable engagement member 665 keeps the engagement member 681 (including first and second parts 681*a*, 681*b*) from misaligning, and acts as perpendicular surface for the shoulder 656 to push against and to straighten out. The biasing member 690 in this embodiment is a conical spring. As shown in FIG. 23, at a full radial offset this is still in the acceptable centered zone to allow for reconnection with the female half. It is of course understood that aspects of the coupling members 12 through 612 may be substituted for one another or used in conjunction with one another where applicable.

FIG. 23 shows another exemplary embodiment of a blind mate coupling 710, and specifically an exemplary male member 712 with the female member not shown. The blind mate coupling 710 is substantially similar to the above-referenced blind mate couplings 10 through 610, and consequently the same reference numerals but in the 700-series are used to denote structures corresponding to the same or similar structures in the couplings 10 through 610. In addition, the foregoing description of the blind mate couplings 10 through 610, in particular the male member 12, 112, 212, 312, 412, 512, 612 is equally applicable to the coupling 710 and male member 712; more particularly the male member 712 is essentially a combination of the forward portion of male member 612 and rearward portion of male member 412. It is of course understood that aspects of the coupling members 12 through 712 may be substituted for one another or used in conjunction with one another where applicable.

Turning to FIGS. 24-36, another exemplary embodiment of a blind mate coupling 810, including an exemplary male member 812 and female member 814 is shown. The blind mate coupling 810 is substantially similar to the above-referenced blind mate couplings 10 through 710, and consequently the same reference numerals but in the 800-series are used to denote structures corresponding to the same or similar structures in the couplings 10 through 710. In addition, the foregoing description of the blind mate couplings 10 through 710, in particular the male member 12 through 712, is equally applicable to the coupling 810 and male member 812, except as noted below. It is also understood that aspects of the coupling members 12 through 712 and 812 may be substituted for one another or used in conjunction with one another where applicable.

FIG. 24 is a front perspective view of the blind mate coupling 810 including female member 814 and male member 812. FIG. 25 is a rear perspective view thereof. In this embodiment, the self-centering and misalignment compensating features are embodied in the male member 812. It is understood, however, that the features described herein could also be applied to the female member 814, as will become apparent in view of the following description.

Figure 26:
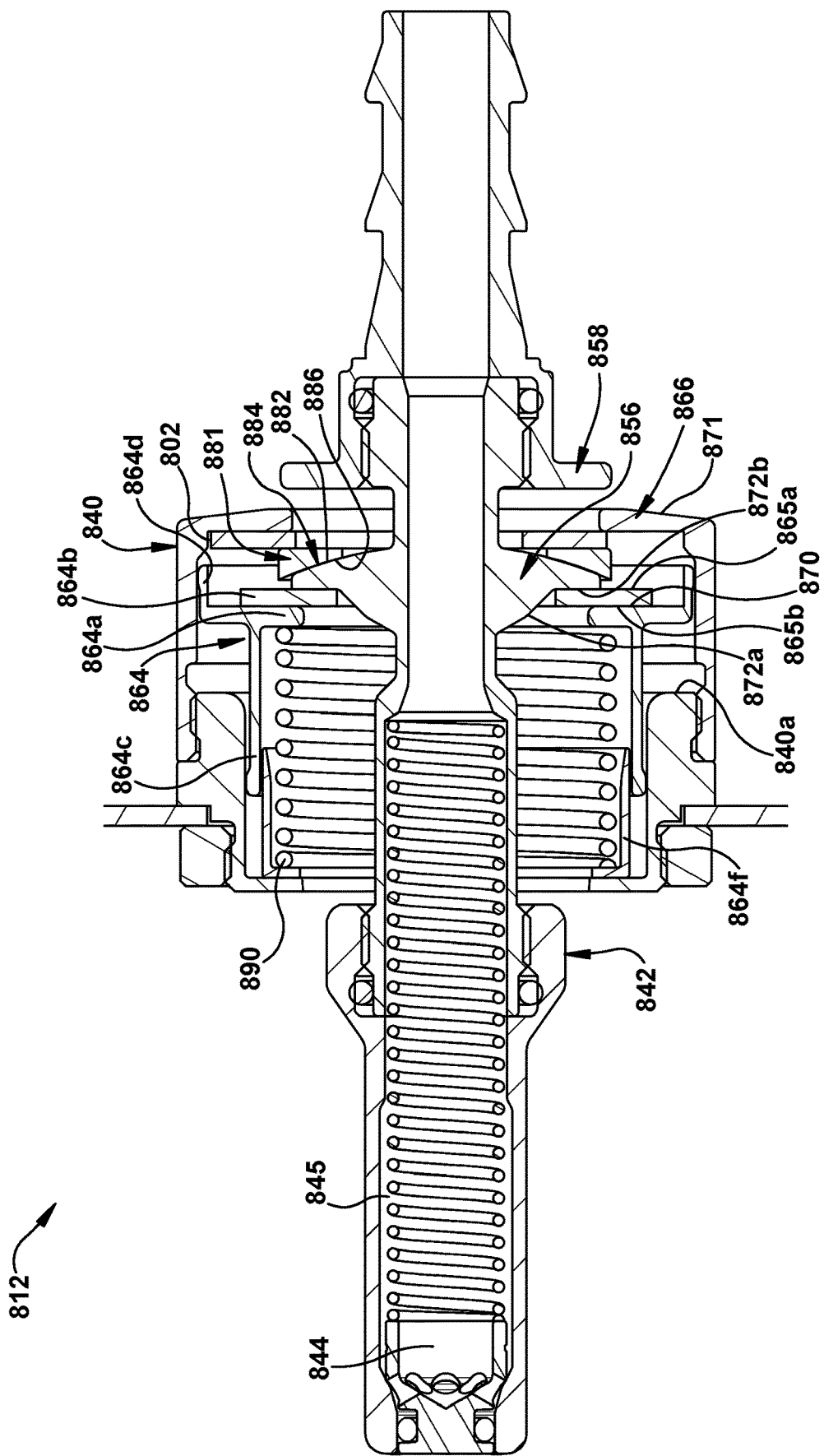

Referring generally to the cross-sectional view of FIG. 26, and similarly to the foregoing male coupling members 12 through 712, the male coupling member 812 generally includes a housing 840, a valve body 842 at least partially extending through the housing 840, and a valve member 844 within an internal fluid passage 845 of the valve body 842 for opening and closing the fluid passage 845. The embodiment in FIGS. 24-36 also includes an alignment mechanism which includes a forward alignment part, an intermediate alignment part, and a rearward alignment part that cooperate with the valve body 842 to facilitate alignment and/or centering of the valve body.

In exemplary embodiments, the forward alignment part of the alignment mechanism includes an axially movable alignment part 864 that is axially movable relative to the housing 840 to operatively interact with the valve body 842. As shown, a biasing member 890, such as a compression spring, is disposed between a forward end of the housing 840 and a radially inwardly protruding shoulder portion (or abutment) 864a of the forward alignment part 864 to operatively urge the abutment 864a rearwardly toward a radially extending shoulder portion 856 (or abutment) of the valve body 842. Such rearward bias of the valve body 842 may assist in overcoming binding forces between the male and female members 812, 814, as described in further detail below. In exemplary embodiments, the forward alignment part 864 also includes a radially and axially movable engagement part 864b that is disposed between the abutment 864a and the shoulder portion 856 of the valve body 842. As is apparent, the forward alignment part 864 (also referred to a forward alignment assembly) serves as an axially movable stop that restricts forward axial movement of the valve body 842. In addition, the movable engagement part 864b is configured to cooperate with the abutment 864a, and also engages the shoulder portion 856 of the valve body, to at least partially facilitate alignment and/or centering, and which may enable reduction in the size of the coupling 812. For example, as described above, such an engagement part 864b (e.g., in the form of a floating support) may be used to cover a gap in the travel distance of the valve body 842. Thus, it is understood that the coupling 812 could be devoid of such engagement part 864b, but this may result in a coupling 812 with a larger diameter.

In exemplary embodiments, the valve body shoulder portion 856 has a tapered or rounded forward surface 872a and a flat vertical forward surface 872b that is radially outward of the tapered or rounded surface 872a. In exemplary embodiments, the radially movable engagement part 864 b has a rearward flat vertical surface 865a that interfaces against the surfaces 872a, 872b based on the location of the valve body 842 and radial location of the engagement part 864b. As shown, an opposite surface of the radially moving engagement part 864b also may be a flat vertical surface 865b that interfaces against a corresponding flat vertical surface 870 of the abutment 864a. The radially movable engagement part 864b may be any suitable structure in any suitable form, such as a disc, block, plate, or other bearing member, which in the illustrated embodiment is formed as a flat ring, or washer, through which the valve body 842 extends.

As shown in the illustrated embodiment, the axially movable forward alignment part 864 may be slidable within a chamber formed by radially inner surfaces of the housing 840. In exemplary embodiments, the forward alignment part 864 includes an axially rearwardly extending sleeve portion 864c that forms at least a portion of a chamber for containing the biasing member 890 and which slides against an internal surface of the housing 840 which is radially narrowed in the illustrated embodiment. As shown, a further retaining member 864f may be provided as part of the forward alignment assembly 864 to surround a forward end of the biasing member 890. In exemplary embodiments, the axially movable forward alignment part 864 also includes an axially rearward extension 864d that engages and slides against an internal surface of the housing 840 which is radially enlarged in the illustrated embodiment. The extension 864d also helps to contain the radially movable engagement part 864b and sets the radial movement limits thereof. As shown, between the radially enlarged and radially narrowed portions of the housing 840 is a step (or shoulder) 840a that may serve as an axial stop to movement of the axially moving part 864 via a corresponding stop surface.

Similarly to other embodiments described herein, the intermediate alignment part of coupling 812 is disposed within the housing 840 and includes a radially movable engagement member 881 that is adapted to engage a shoulder surface of the valve body (e.g., of shoulder portion 856) to facilitate alignment and/or centering. Similarly to the engagement member(s) described above, the engagement member 881 may be any suitable structure in any suitable form, such as a disc, block, plate, or other bearing member that is discrete with respect to the valve body 842 and the housing 840. In the illustrated embodiment, the engagement member 881 is formed as a ring, such as a washer, through which the valve body 842 extends.

The intermediate part of the alignment mechanism cooperates with the biasing member 890 of the forward alignment part to operatively urge the valve body 842 toward an aligned and/or centered position. As such, the forward alignment part and intermediate alignment part together form parts of a compensator (not referenced) that is configured to compensate for misalignment of the valve body 842 relative to the housing 840 and/or to provide self-centering functionality. As described above, the compensator generally may be configured to avoid angular misalignment of the two coupling halves from creating an axial displacement of the nose portion that would otherwise add to the amount of axial misalignment tolerance that is needed. The configuration of the compensator also may enable the coupling to have a more even force distribution that may contribute to the smoothness of its alignment functionality. In exemplary embodiments, the compensator serves as a mover, such as a pusher or puller, that compensates for misalignment. As discussed above, in the illustrated embodiment, the biasing member 890 urges the valve body 842 rearwardly against the engagement member 881.

Similarly to the other radially movable engagement members described in the foregoing embodiments, the engagement member 881 shown in FIG. 26 is configured to cooperate with the valve body 842 via a concave interface 884 to facilitate centering and/or alignment. For example, as shown in the illustrated embodiment, the engagement member 881 is configured to engage with a rearward surface 882 of the shoulder portion 856 via concave interface 884. In the illustrated embodiment, the engagement member 881 has a concave surface 886 (e.g., spherical surface), which may serve as a socket for receiving and guiding the valve body shoulder portion 856. The rearward engagement surface 882 of the shoulder portion 856 has a complementary convex surface 882 that interfaces with the concave surface 886 of the engagement member 881. As discussed above, the concave interface 884 between the valve body shoulder portion 856 and the engagement member 881 provides the ability to compensate for misalignment of the valve body 842 relative to the housing 840. As noted above, it is understood that the convex and concave surfaces of the shoulder portion 856 and engagement member 881 could be reversed and still provide a concave interface 884, though the cupped form of the engagement member 881 may be preferred.

In exemplary embodiments, the radially movable engagement member 881 is pushed against a rearward surface to serve as an axial stop to movement of the valve body 842. In the illustrated embodiment, this rearward surface is an end of the housing 840, although could be a stop coupled to the housing 840. As shown, the intermediate part of the alignment mechanism also may include at least one floating support 802 that cooperates with the radially movable engagement member 881 and stop formed by the rearward end of the housing 840. The floating support 802 is radially movable relative to the housing 840 and the valve body 842, and cooperates with the engagement member 881 to facilitate alignment capabilities of the valve body 842. Similarly to the radially movable engagement part 864b, the floating support 802 may be a bearing plate, such as a ring, washer or the like.

Also similarly to other embodiments described above, the rearward engagement part of coupling 812 is a fixed stop in the form of a radially protruding second shoulder portion 866 (or abutment) of the housing 840. The second abutment 866 is configured to interface against a radially protruding second shoulder portion 858 (or abutment) of the valve body 842 which is axially spaced apart from the first shoulder portion 856. As shown, a second engagement surface 871 of the second abutment 866 of the housing is an inclined surface, but also could be rounded or the like. Unlike the embodiment shown in FIG. 9, however, the engagement surface 871 is inclined to extend radially inwardly and axially rearwardly which facilitates centering and alleviates binding during connecting or disconnecting with the female member 814 by providing a lever-like action that pulls the valve body 842 away from the female half 814, as described in further detail below. As shown, the second shoulder portion 858 of the valve body includes a flat portion and rounded portion that interact with the engagement surface 871. As depicted with further reference to FIG. 25, the inclined engagement surface 871 encircles the longitudinal axis to provide a domed-like surface that provides such alignment functionality around 360-degrees of the axis.

Although not shown in the illustrated embodiment, it is understood that the coupling member 812 may have additional components such as those described above. For example, the coupling member 812 may include push plates, etc., as would be understood by those having ordinary skill in the art.

Although the exemplary operation of the coupling member 812 is apparent from the foregoing description, such operation will now be described in further detail.

Figure 27:
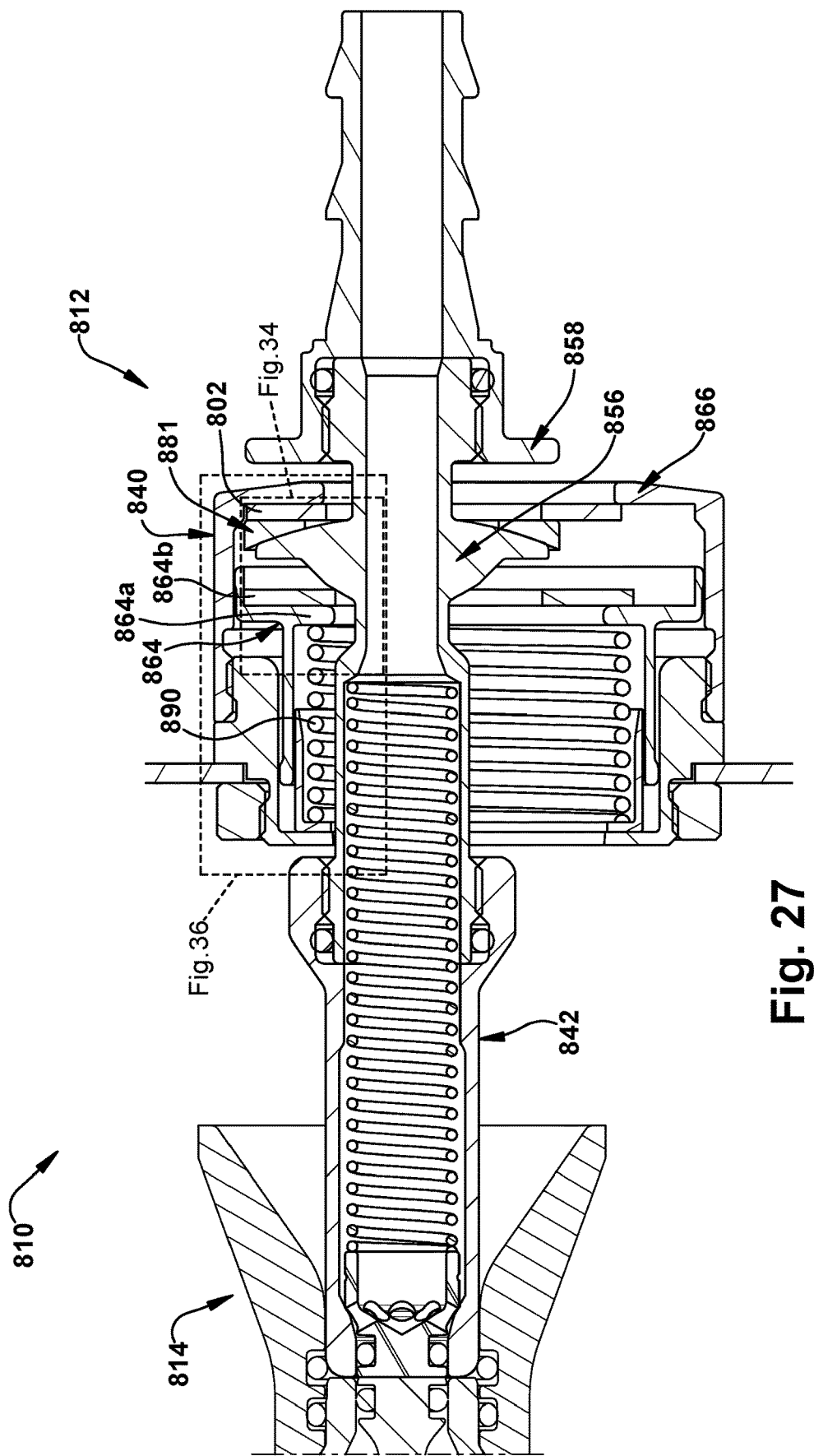

Generally, the alignment mechanism is configured to bring the radially floating engagement member 881 back to center (or at least an allowable centering zone) to center the valve body 842. In exemplary embodiments, the biasing member 890 is configured with a relatively light biasing force (spring force) such that the centering feature has limited influence on the force to move the valve body 842 relative to the engagement member 881 into an "offset" or "angled and offset" condition when connecting the male member 812 to the female member 814. When disconnecting, the contact of the rear shoulder 858 against the rear inclined surface 871 of abutment 866 helps to keep the valve body 842 from binding in the female member 814 by providing a lever-like action that pulls the valve body 842 away from the female coupling 814. In addition, the centering feature may be engaged in a limited way due to a low force provided by the biasing member 890. For example, the force of the biasing member 890 (e.g., spring force) may be set low enough to push the valve body 842 away from the female coupling 814 to overcome mechanical binding forces between the male 812 and female 814 coupling members when disconnecting, which such binding may be caused by friction forces between the nose and socket, seals, etc. When fully disconnected, the biasing force is just high enough to move the alignment parts (e.g., engagement member 881) into the allowable centered zone. In the illustrated embodiment, for example, the force of the biasing member 890 is in a range from about 0.5 lbs. to about 2.0 lbs, such as about 1.0 lbs. It is noted that this embodiment is different than the embodiment in FIG. 9, in that the valve body 842 does not get pushed back as far because it already is fully back, but can get pulled forward (e.g., by about 1.5 mm) when disconnecting (as described below). Such a configuration of the embodiment in FIG. 26 may thus has a better ability to get back to the centered condition (preferably without binding) than embodiment in FIG. 9. Referring to FIG. 27, the coupling member 812 is shown in a connecting state at full radial offset. In this state, the biasing member 890 is extended to push the abutment 864a and engagement part 864b rearwardly toward the shoulder portion 856 (or abutment) of the valve body 842, such that the rearwardly facing surface 882 of the shoulder portion 856 interfaces with the concave surface 886 of the engagement member 881. The floating support 802 and the engagement member 881 are moved radially (e.g., upward in the illustration). The rearward shoulder portion 858 of the valve body is spaced rearwardly from the abutment 866 of the housing 840.

Figure 28:
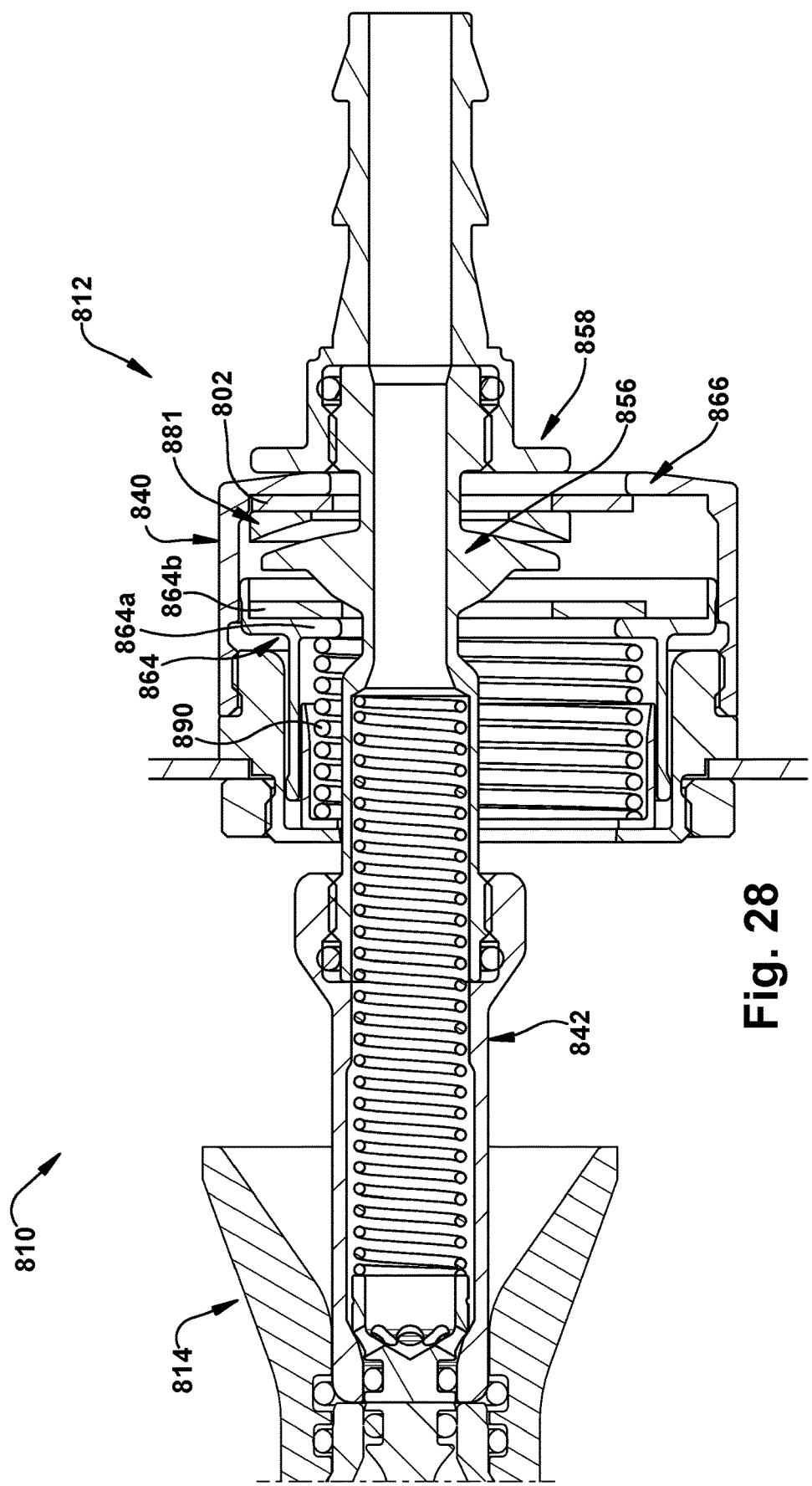

FIG. 28 shows the coupling 812 in a disconnecting state at full radial offset. As shown, during the disconnecting with the female member 814, the coupling force with the female member 814 is greater than the biasing (spring) force of the biasing member 890 such that valve body 842 (via shoulder portion 856) pulls the engagement member 864b and the abutment 864a of the forward alignment part 864 forwardly (e.g., to the left in the illustration). This causes the rearwardly facing surface 882 of the shoulder portion 856 to disengage from the concave surface 886 of the engagement member 881. In the illustration, the parts are shown at their positions immediately upon disconnection, but it is understood that the engagement member 881 and floating support 802 could drop from their original position temporarily (due to gravity). They will move back into position when the biasing member 890 pushes the parts of the alignment mechanism back into position.

Figure 29:
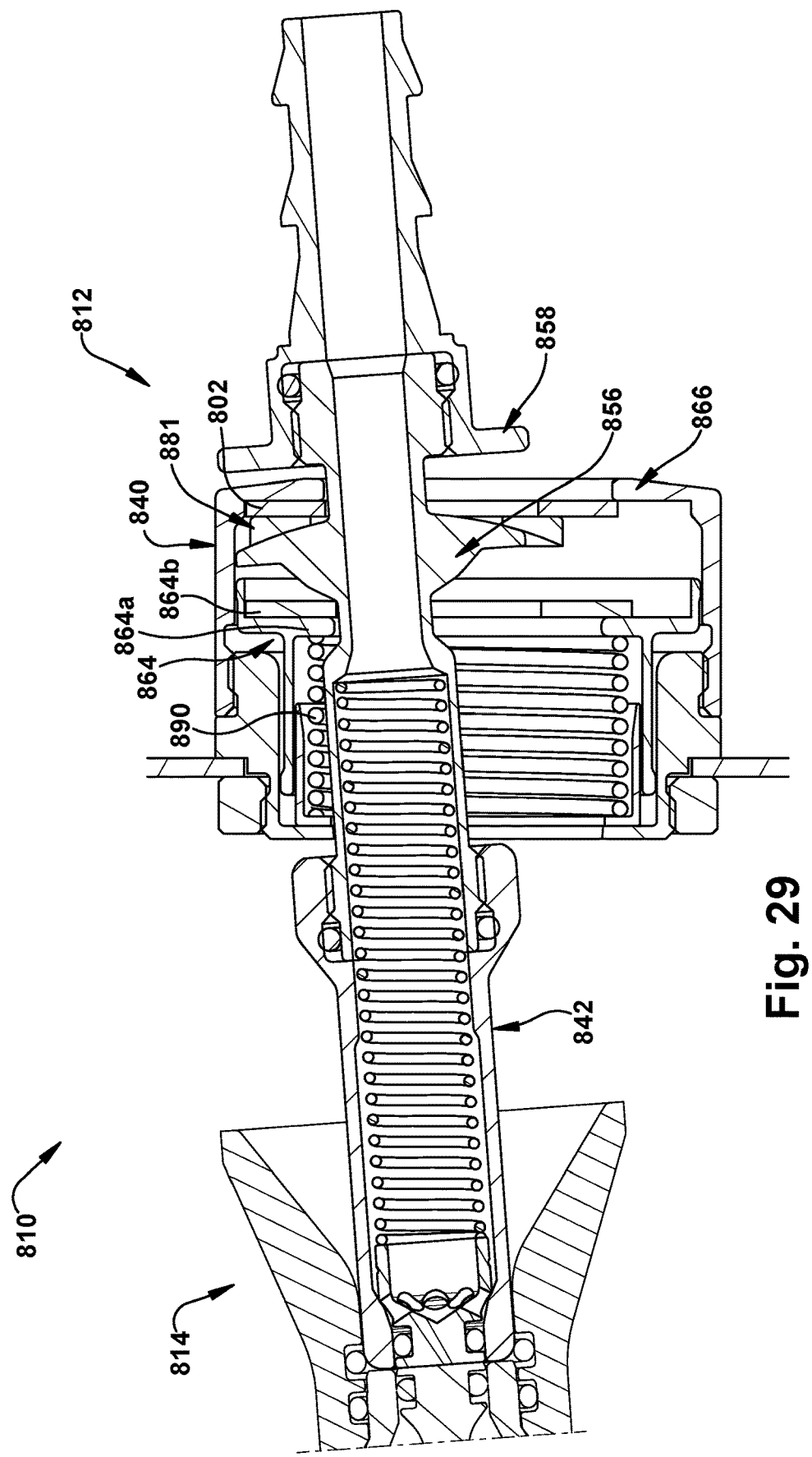

Referring to FIG. 29, the coupling member 812 is shown in a connecting state at full radial offset and at a full offset angle. As shown, the biasing member 890 is extended and the rearward surface 882 of the shoulder portion 856 interfaces with the concave surface 886 of the engagement member 881. At the full angle, the floating support 802 and the engagement member 881 are moved radially (e.g., upward in the illustration).

Figure 30:
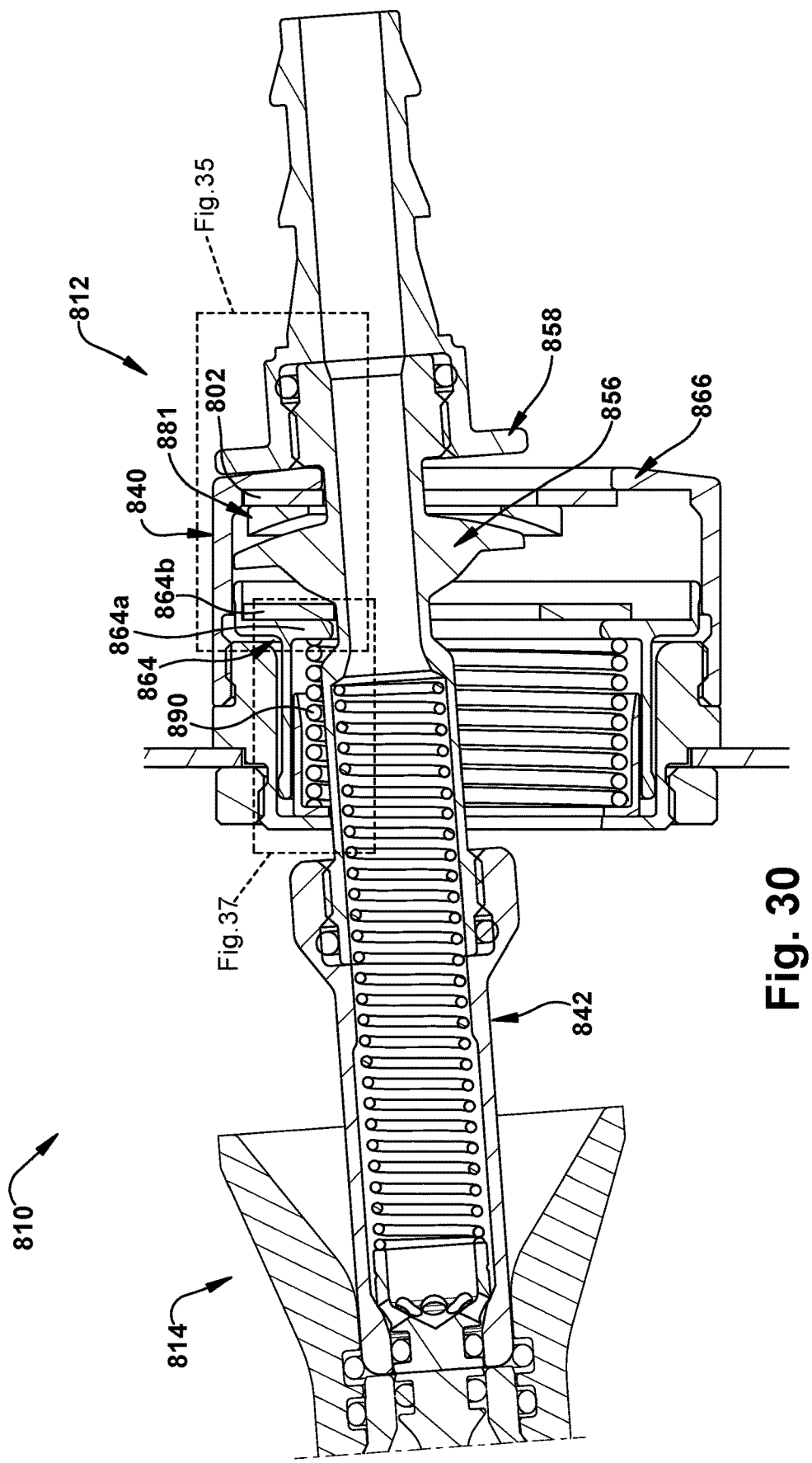

FIG. 30 shows the coupling member 812 in a disconnecting state at full radial offset and at a full offset angle. The second shoulder portion 858 of the valve body 842 engages the second abutment 866 (e.g., rearward inclined surface 871) of the housing 840. Because the rearward inclined surface 871 angles away from the female coupling 814 toward center (e.g., is a domed or dome-like surface and not cupped), the inclined angle allows for the force to finish the disengagement of the coupling halves 812, 814 to be in the axial direction. In other embodiments that do not use such a rearward inclined surface 871, there may be axial motion that can cause a force to be induced on sliding surfaces of the two coupling halves. It is of course understood that the inclined surface 871 could be used with other embodiments described herein. Also shown in the illustrated state of FIG. 30, the coupling force with the female member 814 is greater than the biasing (spring) force of the biasing member 890 such that valve body 842 (via shoulder portion 856) pulls the engagement member 864b and the abutment 864a of the forward alignment part 864 forwardly (e.g., to the left in the illustration). This causes the rearwardly facing surface 882 of the shoulder portion 856 to disengage from the concave surface 886 of the engagement member 881 and compress the biasing member 890 which further urges the valve body 842 away from the female member 814.

Figure 31:
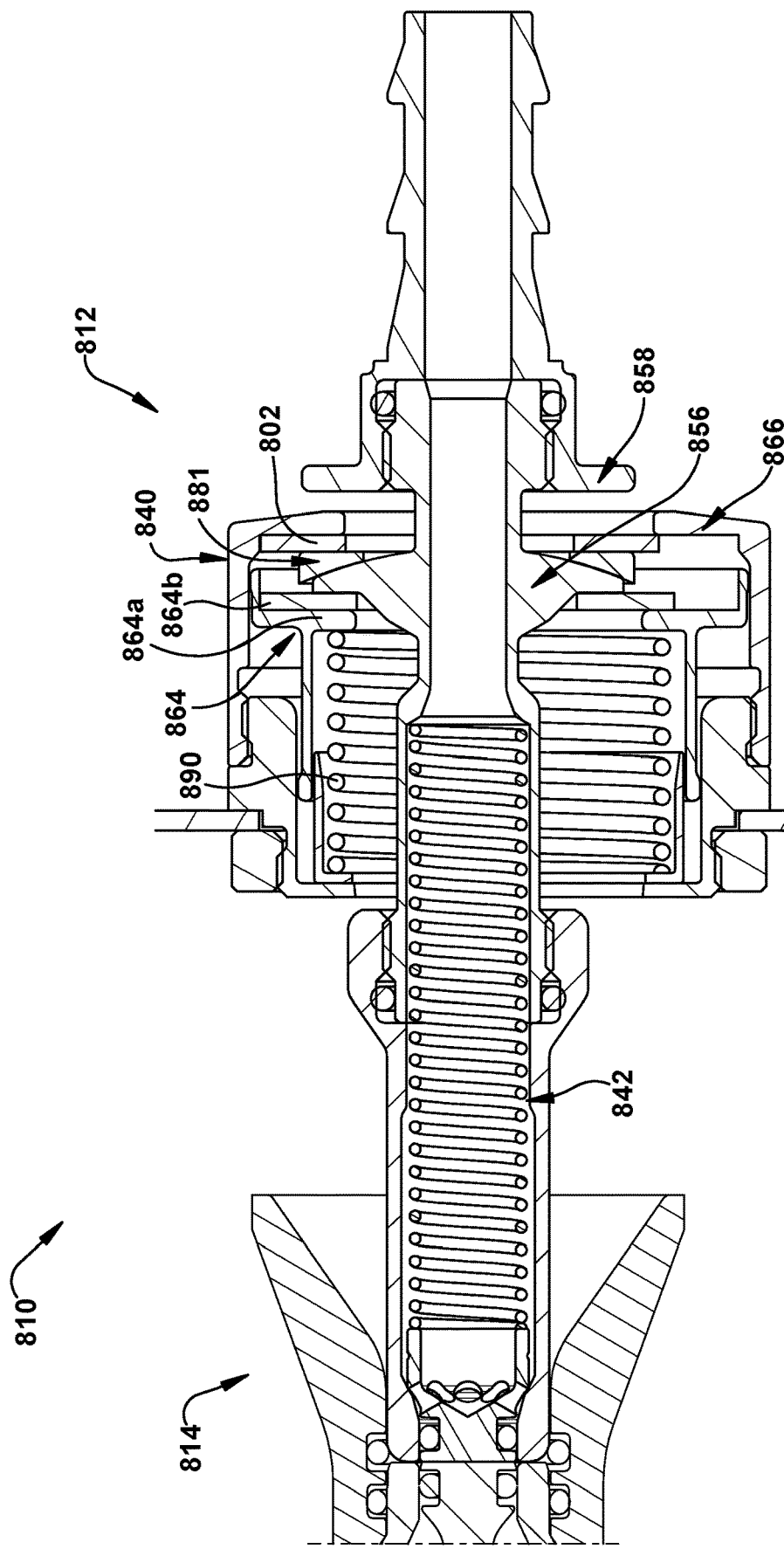

FIG. 31 illustrates the allowable centering zone of the male coupling member 812 for reconnection with the female member 814. The flat vertical interface between the forwardly facing flat vertical forward surface 872b of the shoulder portion 856 and the rearwardly facing flat vertical surface 865a of the engagement part 864b keep the valve body 842 from sitting at an angle when disconnected and returns it to this allowable centering zone if it should get bumped off center or at an angle.

Figure 32:
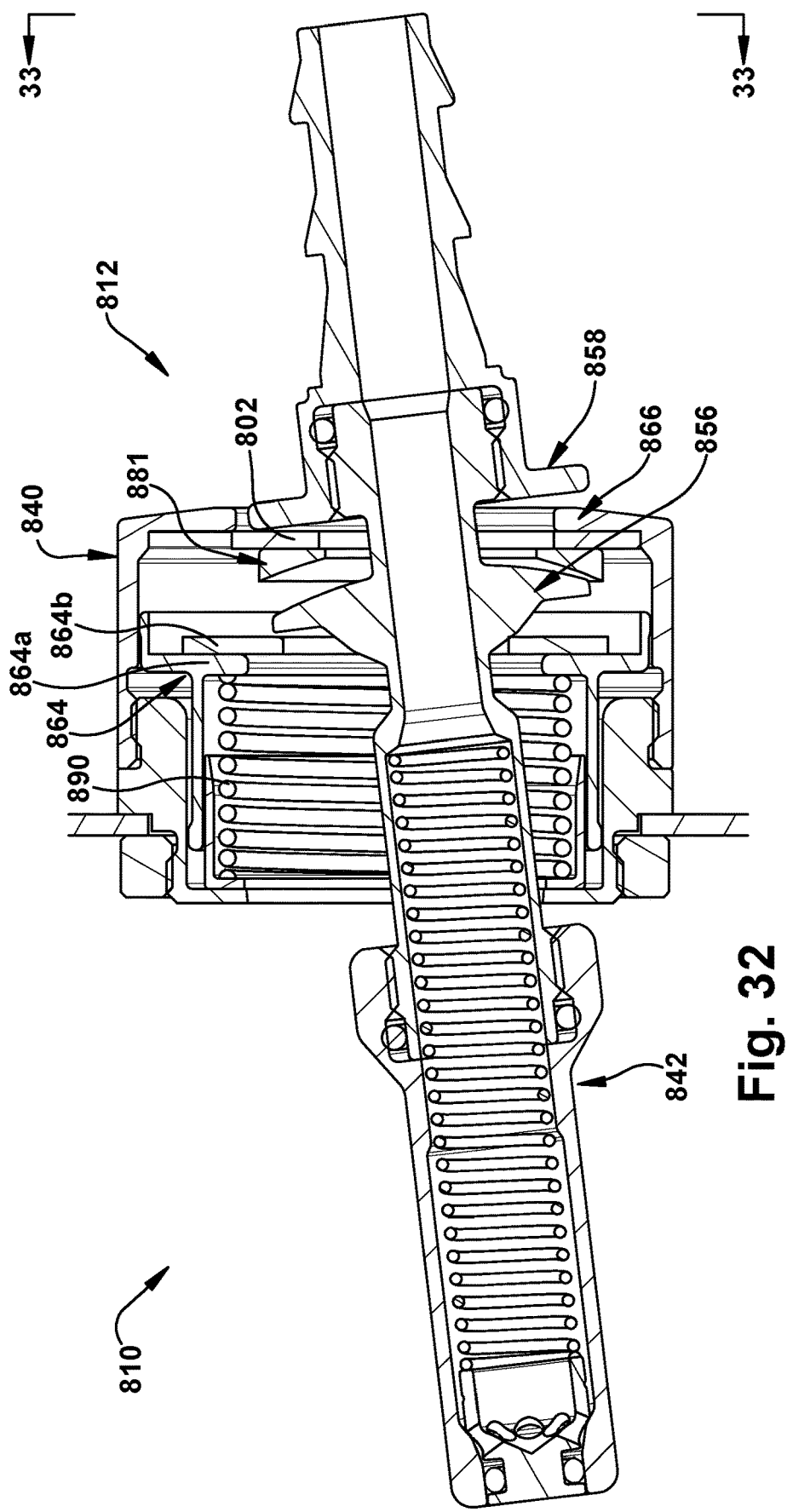
Figure 33:
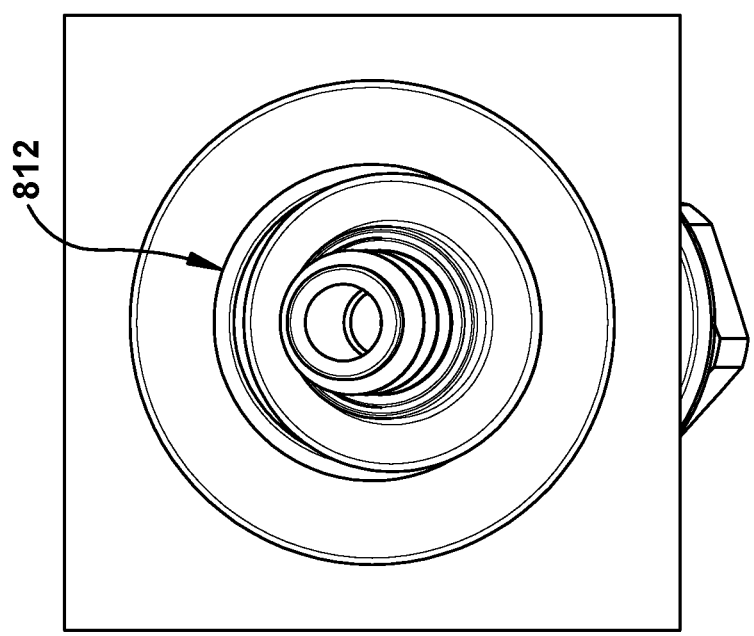

FIG. 32 is a cross-sectional side view of the male coupling member illustrating a maximum amount the valve body 842 can be pulled off-center. As shown, the engagement part 864b and vertical portion of shoulder 856 are proportioned in a way that will not allow the top portion of the shoulder 856 to end up inside the inside diameter of the engagement part 864b, which otherwise could keep the device from returning to center automatically when an outside force is removed. FIG. 33 is a rear view illustrating the state in FIG. 32. As shown, the second (rearward) shoulder portion 858 of the valve body 842 engages the edges of the radially inwardly and axially rearwardly inclined surface 871 of the abutment 866, and keeps the floating parts of the alignment mechanism from pulling any further into the cavity inside the housing area.

FIG. 34 is an enlarged view illustrating additional details of the shoulder portion 856 of the valve body 842. As shown, the curved or inclined surface 872a of the shoulder portion 856 is shown as a compound angle, with a radially outer portion being less steep and the radially inner portion of surface 872a being steeper. This steeper angle on the radially inner portion of surface 872a provides less radial centering force for the radially offset and angled condition as it is more difficult to get to this condition from a connection force standpoint partially because of the connected hose's resistance to movement to the radially offset and angled position. The steeper angle in this condition also will reduce binding effect with the female coupling 814 on the disconnect. More axial force from the less steep (radially outer) portion of surface 872a is used to get from the offset condition back to the allowable centered zone. It is understood, however, that this surface 872a could be one continuous angle or even an arc form.

FIG. 35 is an enlarged view showing additional detail of the rearwardly facing inclined surface 871 of the second (rearward) abutment 866. As noted above, the inclined surface 871 (e.g., domed or dome-like surface) is oriented oppositely to the embodiment shown in FIG. 9, such that inclined surface 871 extends radially inwardly and axially rearwardly. This angle (e.g., about 7-degrees in this embodiment) helps to keep parts of the alignment mechanism from getting tipped back to center and driving back to centering position when disconnecting at an angle. This is helpful to reduce binding effect of the male valve body 842 with the female coupling 814 as described above. As shown, a radially inner portion of rearward surface 871 may be vertical (or have less of an incline) (as shown to the right of arrow 866) which may enable the valve body shoulder 858 to engage and lay flatter against surface 871 so as to bring the coupling to a better centered position.

FIG. 36 is an enlarged view showing additional detail of the biasing member 890 within the chamber formed by the sleeve portion 864c of forward alignment part 864. As shown, the guiding of sleeve portion 864c allows it to move axially and not get pulled to an angle. This helps in keeping the push going axially when recentering the radially floating engagement member 881. As shown in FIG. 37, the retaining member 864f keeps the coils of the biasing member 890 from getting between the sleeve portion 864c and the housing 840 when the biasing member (spring) is compressed.

FIGS. 38-41 show another exemplary embodiment of a blind mate coupling 910, and specifically an exemplary male member 912 with the female member not shown. The blind mate coupling 910 is substantially similar to the above-referenced blind mate couplings 10 through 810, and consequently the same reference numerals but in the 900-series are used to denote structures corresponding to the same or similar structures in the couplings 10 through 810. In addition, the foregoing description of the blind mate couplings 10 through 810, in particular the male member 12, 112, 212, 312, 412, 512, 612, 712, 812 is equally applicable to the coupling 910 and male member 912. It is of course understood that aspects of the coupling members 12 through 912 may be substituted for one another or used in conjunction with one another where applicable.

Figure 38:
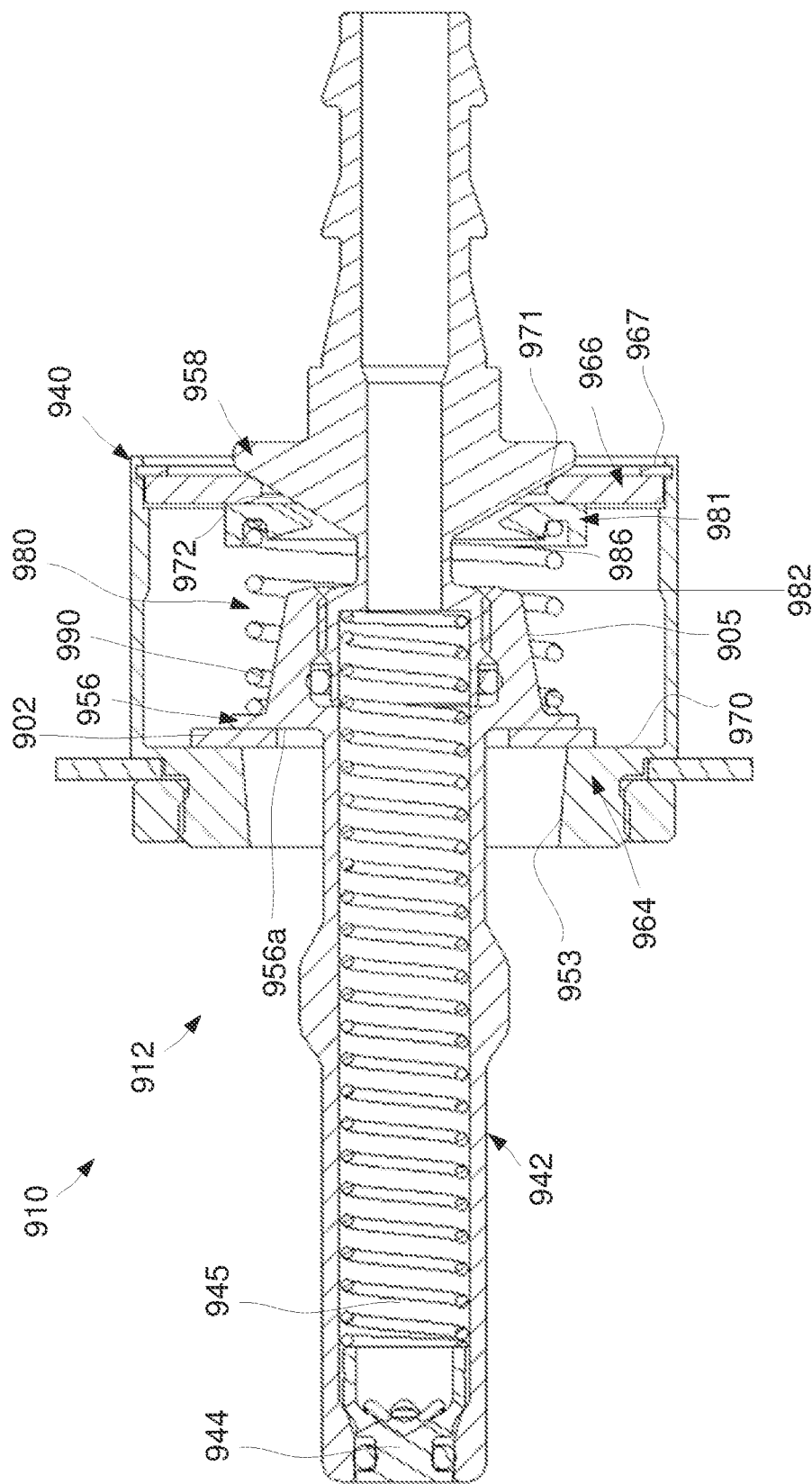
FIG. 38 shows another exemplary male coupling member according to an embodiment, which is shown in an exemplary decoupled state.
Figure 39:
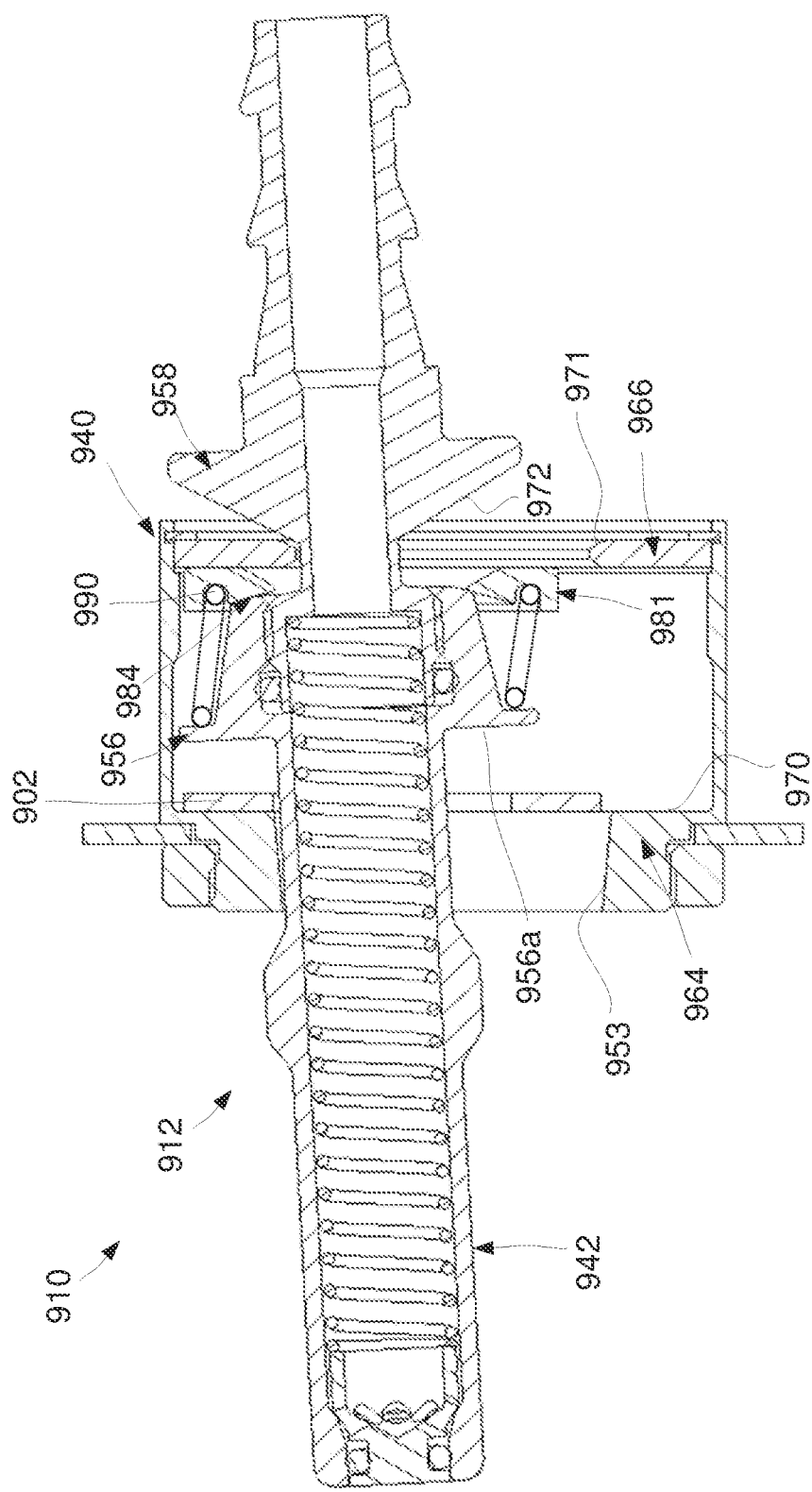
FIG. 39 is a cross-sectional side view of the male coupling member in a connecting state at full radial offset and at a full offset angle.
Figure 40:
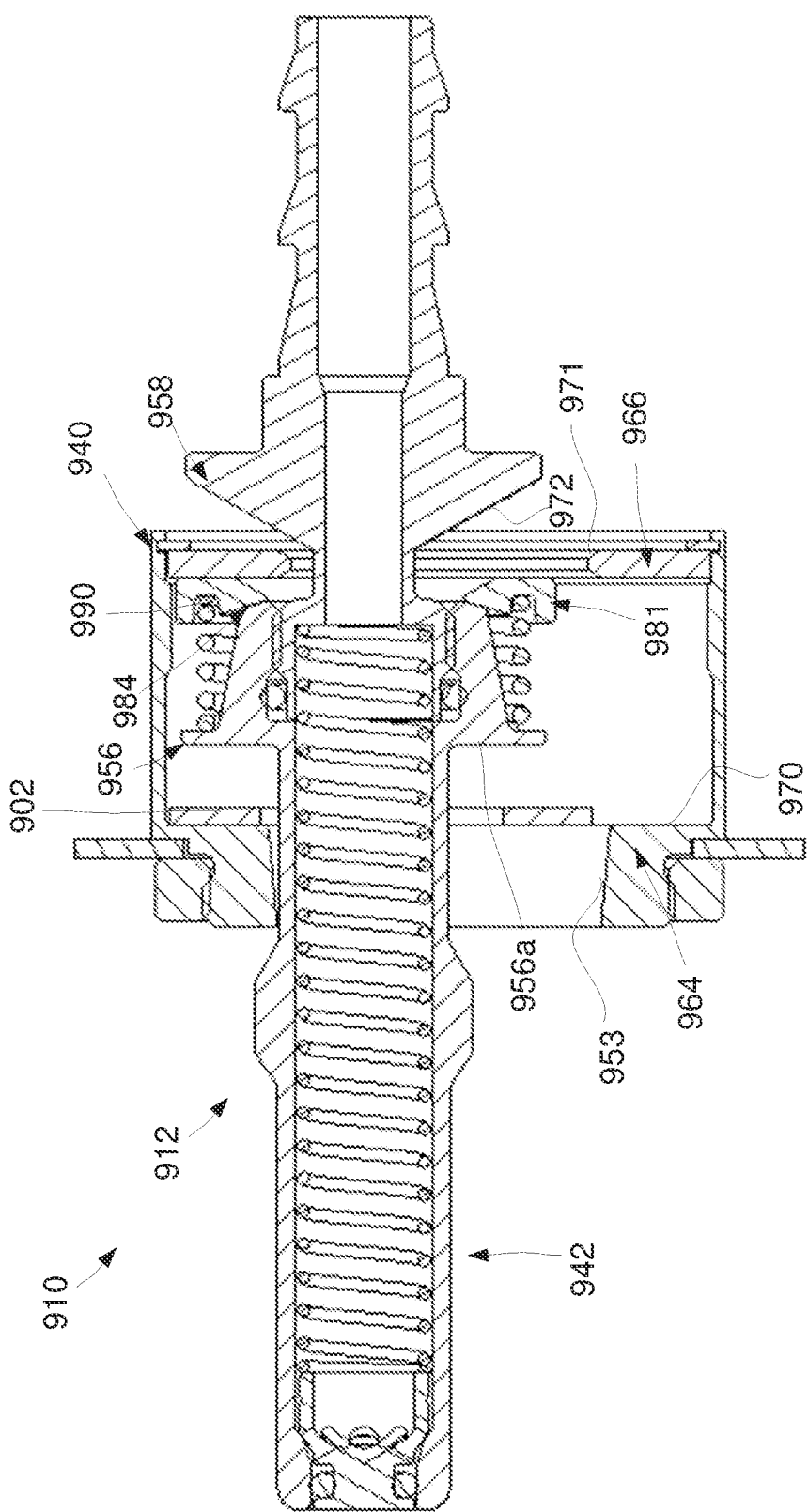
FIG. 40 shows the male coupling member in FIG. 38 in coupled state at full radial offset.
Figure 41:
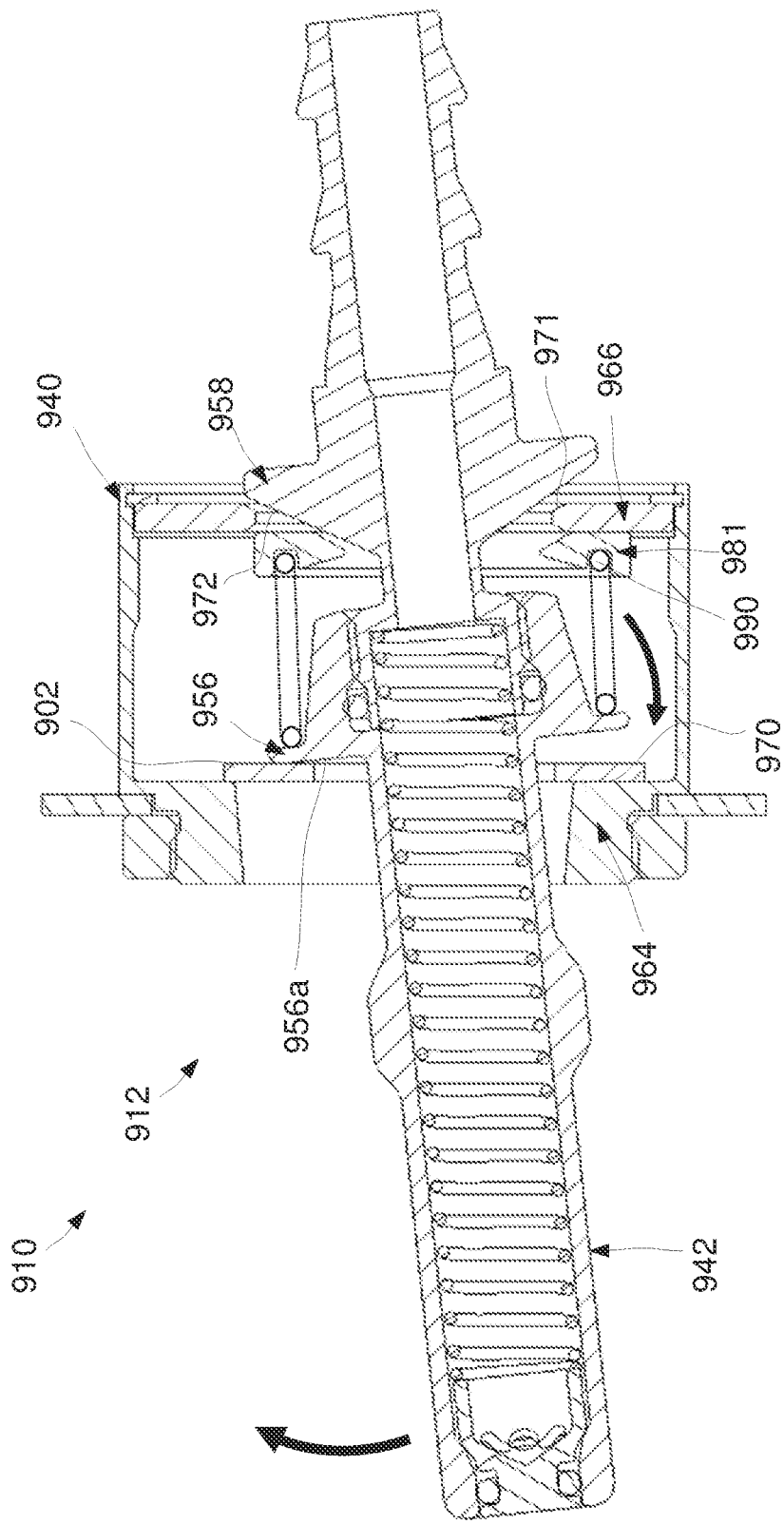
FIG. 41 illustrates centering of the male member in FIG. 38 in a disconnecting state.

FIG. 38 illustrates the coupling member 912 in an exemplary disconnected and aligned state. FIG. 39 is a cross-sectional side view of the coupling member 912 in a connecting state at full radial offset and at a full offset angle. FIG. 40 shows the male coupling member in FIG. 38 in coupled state at full radial offset. FIG. 41 illustrates centering of the male member in FIG. 38 in a disconnected state. The features are shown with respect to the male coupling member 912, however it is understood that the features described herein could also be applied to the female member (not shown), as will become apparent in view of the following description.

Referring generally to the cross-sectional view of FIG. 38, and similarly to the foregoing male coupling members 12 through 812, the male coupling member 912 generally includes a housing 940, a valve body 942 at least partially extending through the housing 940, and a valve member 944 within an internal fluid passage 945 of the valve body 942 for opening and closing the fluid passage 945. The valve body 942 includes a radially extending first (e.g. forward) abutment 956 (also referred to as shoulder portion 956) and a radially extending second (e.g., rearward) abutment 958 (also referred to as shoulder portion 958) that is axially spaced rearwardly from the first abutment 956. The housing 940 includes a radially extending first (e.g., forward) engagement surface 970 formed by a housing abutment 964, and a radially extending second (e.g., rearward) engagement surface 971 that is axially spaced apart rearwardly from the first engagement surface 970, and which is formed by a second housing abutment 966. As with the previous embodiments 12 through 812, the valve body 942 and/or the housing 940 may be unitary or segmented, and thus the respective abutments 956, 958, 964, 966, or the like, may be formed unitarily or as discrete parts. For example, in the illustrated embodiment the rearward housing abutment 966 is formed as a discrete plate having an opening therein that is secured with a retaining ring 967. The valve body 942 in the illustrated embodiment also is formed as a segmented body in which a forward portion of the valve body 942 having the forward abutment 956 is threadedly attached to a rearward portion of the valve body 942 having the rearward abutment 958.

Similarly to other embodiments, the coupling member 912 is configured such that the forward abutment 956 of the valve body operatively interacts with the forward engagement surface 970 of the housing and/or the rearward abutment 958 of the valve body operatively interacts with the rearward engagement surface 971 of the housing during a connection or disconnection sequence with the female member (not shown) to thereby enhance the alignment and/or centering of the valve body relative to the housing. As shown in FIG. 38, for example, at least in a decoupled state, the forward abutment 956 of the valve body 942 operatively interacts (e.g., indirectly) with the forward engagement surface 970 of the housing 940, and rearward abutment 958 of the valve body operatively interacts (e.g., directly) with the rearward engagement surface 971 of the housing, which enhances the alignment and/or centering of the valve body relative to the housing at least in the decoupled state.

As shown in the illustrated embodiment, the rearward abutment 958 of the valve body may include a radially outwardly and axially rearwardly extending contact surface 972 that facilitates alignment and/or centering compensation. In exemplary embodiments, the contact surface 972 is formed as a convex contact surface 972, which may be an oblique or tapered surface 972 that encircles the longitudinal axis of the valve body 942 to form an outer conical surface of a frustoconical body portion of the valve body 942. Alternatively or additionally, the convex contact surface 972 may have curvature to form a spherical engagement surface that generally extends in the radially outwardly and axially rearwardly direction. Such a spherical surface may have convexity or concavity.

The rearward engagement surface 971 of the housing 940 also may have a corresponding radially outward and axially rearward orientation for engagement with the convex contact surface 972 of the valve body 942. Accordingly, in exemplary embodiments, the engagement surface 971 is formed as a concave engagement surface 971, which may be an oblique or tapered surface 972 that encircles the longitudinal axis of the valve body 942 to form an inner conical surface. Alternatively or additionally, the rearward concave engagement surface 971 may have curvature to form a spherical engagement surface that is complementary to the rearward contact surface 972 of the valve body. As shown in the illustrated embodiment, the rearward engagement surface 971 of the housing 940 is formed at an opening at the rear of the housing, and the housing engagement surface 971 engages against a radially outward portion of the valve body abutment 956, such that a radially inward portion of the abutment 956 and corresponding portion of convex contact surface 972 extend through the opening into the housing 940.

The forward abutment 956 of the valve body may include a radially outwardly protruding contact surface 956*a* that is perpendicular to the longitudinal axis of the valve body 942. As shown, a floating support 902, which constitutes a radially movable forward part of the alignment mechanism, may be interposed between the forward contact surface 956*a* of the valve body and the forward abutment surface 970 of the housing. In this manner, the forward abutment 956 of the valve body indirectly interacts with the forward engagement surface 970 of the housing 940 to provide alignment and/or centering functionality. The floating support 902 may be radially movable relative to the housing 940 and the valve body 942, and cooperates with both the valve contact surface 956*a* and the housing engagement surface 970 to provide an interaction that facilitates alignment and/or centering of the valve body relative to the housing. The floating support 902 also may serve as a spacer that may help to cover a gap in travel distance of the valve body 942. The floating support 902 may have any suitable shape or form, and in the illustrated embodiment is formed a flat plate, disc or ring, in which one flat side engages the perpendicular valve body contact surface 956*a*, and the opposite flat side engages the housing engagement surface 970 which also is perpendicular to the longitudinal axis of the valve body 942.

In exemplary embodiments, the alignment mechanism of coupling 912 further includes an intermediate part that is radially movable relative to the housing 940 and which cooperates with the valve body 942 to facilitate alignment and/or centering. In the illustrated embodiment, for example, the intermediate part is disposed within the housing 940 and includes a movable engagement member 981 that is adapted to engage a portion of the valve body 942, such as a shoulder surface (e.g., abutment 956) of the valve body, to facilitate alignment and/or centering. Similarly to the engagement member(s) described above, the engagement member 981 may be any suitable structure in any suitable form, such as a disc, block, plate, or other bearing member that is discrete with respect to the valve body 942 and the housing 940. In the illustrated embodiment, the engagement member 981 is formed as a disc or ring, such as a washer, through which the valve body 942 extends.

As shown, the intermediate part of the alignment mechanism is an assembly that further includes a biasing member 990 configured to operatively urge the valve body 942 toward an aligned and/or centered position. In the illustrated embodiment, the engagement member 981 and biasing member 990 form parts of a compensator 980 that is configured to compensate for misalignment of the valve body 942 relative to the housing 940 and/or to provide self-centering functionality. As described above, the compensator 980 generally may be configured to avoid the angular misalignment of the two coupling halves from creating an axial displacement of the nose portion that would otherwise add to the amount of axial misalignment tolerance that is needed. The configuration of the compensator 980 also may enable the coupling to have a more even force distribution that may contribute to the smoothness of its alignment functionality.

In exemplary embodiments, the compensator 980 serves as a mover, such as a pusher, that compensates for misalignment. In the illustrated embodiment, the biasing member 990 is between the engagement member 981 and the forward abutment 956 of the valve body, thereby urging the valve body 942 forwardly and the engagement member 981 rearwardly. The biasing member 990 may be any suitable device that biases the engagement member 981 against the valve body 942. In the illustrated embodiment, the biasing member 990 is a spring, such as a coil spring, that encompasses the longitudinal axis.

Similarly to the other radially movable engagement members described in the foregoing embodiments, the engagement member 981 is configured to cooperate with the valve body 942 via a concave interface 984 to facilitate centering and/or alignment. For example, as shown in the illustrated embodiment, the engagement member 981 is configured to engage with a rearward surface 982 of the abutment 956 via concave interface 984 (FIG. 39). In the illustrated embodiment, the engagement member 981 has a concave surface 986 (e.g., tapered or spherical surface), which may serve as a socket for receiving and guiding the valve body abutment 956. The rearward engagement surface 982 of a shoulder portion of the valve body has a complementary convex surface 982 that interfaces with the concave surface 986 of the engagement member 981. As discussed above, the concave interface 984 between the valve body shoulder portion 956 and the engagement member 981 provides the ability to compensate for misalignment of the valve body 942 relative to the housing 940. As noted above, it is understood that the convex and concave surfaces of the shoulder portion 956 and engagement member 981 could be reversed and still provide a concave interface 984, though the cupped form of the engagement member 981 may be preferred.

The engagement member 981 (e.g., socket) is radially movable in a floating manner relative to the housing 940 to enhance the radial and/or angular misalignment capability of the coupling member 912. In the embodiment of FIG. 38, the engagement member 981 is pushed against the rearward abutment 966 of the housing 940, which serves as an axial stop and which improves centering of the engagement member 981. In the illustrated embodiment, one end of the biasing member 981 is supported by the engagement member 981, such as within a groove of the engagement member 981, such that the engagement member 981 also serves as a radially movable spring seat. The biasing member 990 may directly engage against the shoulder portion 956 on its opposite end. The shoulder portion 956 may have a radial extension, groove, or the like for capturing the end of the biasing member 990. As shown, the outer diameter 905 of intermediate portion of the valve body 942 contained within the spring 990 may have a taper that reduces in diameter axially rearwardly, which can help to limit interference with the biasing member 990.

As is apparent by its construction, the coupling member 912 is essentially the reverse of the coupling member 412 shown in FIG. 18. More particularly, the coupling member 912 has the tapered/convex contact surface 972 on the rearward abutment 958 of the valve body 942 and the perpendicular/flat contact surface 956a on the forward abutment 956 of the valve body. This provides for better manufacturability of the product compared to the coupling member 412 in FIG. 18. The convex/conical contact surface 972 keeps the floating engagement member 981 in the center of the housing 940. The perpendicular face of forward contact surface 956a of the forward abutment 956 of the valve body keeps the floating support 902 perpendicular to the perpendicular face of the engagement surface 970 of the housing 940.

Referring to FIG. 39, the coupling member 912 is shown in coupled state (with the female member, unshown in the illustration) at full radial offset and full offset angle. The biasing member 990 is compressed and the rearward surface 982 of the shoulder portion 956 interfaces with the concave surface 986 of the engagement member 981. As shown, the tapered/reducing diameter portion 356b of the valve body facilitate movement of the biasing member 990. At the full angle, the floating support 902 and the engagement member 981 are moved radially (e.g., upward in the illustration). The forward opening in the housing has an inclined surface 953 to engage the radially outer surface of the valve body 942 at the inclined angle. Referring to FIG. 40, the coupling member 912 is shown in coupled state (with the female member, unshown in the illustration) at full radial offset. The biasing member 990 is compressed such that the rearward surface 982 of the shoulder portion 956 interfaces with the concave surface 986 of the engagement member 981. The floating support 902 and the engagement member 981 are moved radially (e.g., upward in the illustration).

FIG. 41 illustrates centering of the male member 912 in a disconnected state. As shown, axial force from the biasing member 990 and moment from shoulder 958 (e.g., flange) act to rotate the floating valve body 942 to a position perpendicular to the face of the housing 940.

It is understood that the descriptions of any of the embodiments may be equally applicable to each other, and features and aspects of these various embodiments may be substituted for one another or used in conjunction with one another where applicable.

Exemplary blind mate fluid coupling(s) 10, 110, 210, 310, etc. and exemplary coupling member(s) 12, 112, 212, 312, etc. have been described herein. The exemplary coupling member includes a housing and a valve body that is self-centering and misalignable relative to the housing. The valve body may include at least two radial shoulder portions that are configured to engage at least two corresponding radial abutments of the housing to improve self-centering when in a decoupled state. An engagement member, such as a socket, may be provided in the housing to engage a radial shoulder of the valve body with a concave interface to enhance the misalignment compensating and/or self-centering functionality. The engagement member may be free to float radially relative to the housing to further enhance such effects. A compensator that urges an engagement member against a shoulder of the valve body may be provided to compensate for misalignment and/or provide self-centering in both a decoupled and mated state.

While exemplary form(s) of the blind mate coupling 10, 110, 210, 310, etc. and coupling member 12, 112, 212, 312, etc. have been described above, it should be apparent to those having ordinary skill in the art that alternative configurations of the blind mate coupling 10, 110, 210, 310, etc. and coupling member 12, 112, 212, 312, etc. also could be employed.

For example, although the self-centering and/or misalignment compensating features were described above in connection with the male member 12, 112, 212, 312, etc. it is understood that these features also could be employed with the female member (e.g., 14, etc.) by providing the housing (e.g., 40, etc.) around the female valve body (e.g., 22, etc.) and by applying the features described above for the male member (e.g., 12, etc.) to the female member (e.g., shoulders 56, 58, etc.), as would be understood by those having ordinary skill in the art.

In addition, although the engagement member (e.g. 81, etc.) is described above as being the socket having the concave surface of the concave interface (e.g., 84, etc.), it is understood that the shoulder portion (e.g., 56, etc.) could instead have the concave surface and the engagement member (e.g., 81, etc.) the convex interface to provide the ball-and-socket like joint. Because the engagement member (e.g., 81, etc.) is radially movable in exemplary embodiments, however, it may be more advantageous in some embodiments to have the engagement member with the concave surface. This applies to all embodiments.

Furthermore, although the engagement member is described as being contained within the internal chamber (e.g., 48, etc.) of the housing, it is possible that the engagement member and concave interface could be at a front or rear of the housing to engage a corresponding shoulder of the valve body forwardly or rearwardly of the housing, for example. This applies to all embodiments.

In addition, although the cross-sectional views show the inclined or vertical surfaces in two-dimensions, it is understood that these surfaces may completely encircle the longitudinal axis of the coupling. As such, it is understood that an inclined, curved, or other such surface that deviates from vertical in the two-dimensional views may be a concave, convex, coned, domed, dome-like, cupped, or cup-like surface, etc. when viewed in three-dimensions.

Also, although described above in connection with fluid couplings, the exemplary blind mate coupling and coupling member could be used for other applications, such as electrical or optical applications for example. In this context, instead of a valve body with valve member in a fluid passage, the valve body could instead be formed as a main body with a communications passage through which electrical or optical communications lines pass. The forward end of the main body could have a pin connector for engaging a corresponding socket on the female side, for example. The remaining features of the housing and outer portions of the valve body could be the same as those described above to provide the self-centering and misalignment compensating functionality.

According to an aspect, a coupling member for a blind mate fluid coupling, includes: a housing; a valve body at least partially extending through the housing, the valve body having an axially extending internal fluid passage; a valve member at least partially disposed in the internal fluid passage, the valve member being movable relative to the valve body to open and close the internal fluid passage; and an alignment mechanism including a movable engagement part that is radially movable relative to the housing and cooperates with the valve body to facilitate alignment and/or centering of the valve body.

Embodiments may include one or more of the following additional features, alone or in any combination.

In some embodiments, the engagement part cooperates with the valve body via a concave interface to facilitate alignment and/or centering.

In some embodiments, the engagement part is adapted to engage a rearwardly facing surface of the valve body via the concave interface at least when the coupling member is in a connecting state with a corresponding other coupling member of the blind mate coupling.

In some embodiments, the engagement part has a concave bearing surface that is configured to engage a complementary convex mating surface of a portion of the valve body.

In some embodiments, the bearing surface of the engagement part and the mating surface of the valve body are each configured as spherical surfaces.

In some embodiments, the engagement part is a ring having an opening through which the valve body extends, the ring having a cupped surface that is adapted to engage a corresponding cupped shoulder surface of the valve body.

In some embodiments, the alignment mechanism further including a second radially floating ring, wherein the engagement part and floating ring are each radially movable and configured to cooperate with the housing and each other to serve as a radially movable stop.

In some embodiments, the alignment mechanism includes a compensator having a biasing member that urges the valve body and the engagement part together to compensate for misalignment of the valve body.

In some embodiments, the biasing member has a biasing force that is configured such that the engagement part disengages from a shoulder of the valve body when the coupling member is being disconnected from a corresponding other coupling member of the blind mate coupling.

In some embodiments, the engagement part is an intermediate engagement part of an intermediate alignment assembly of the alignment mechanism, the alignment mechanism further including a forward alignment assembly including a forward part that is axially movable relative to the housing and cooperates with the valve body to facilitate alignment and/or centering of the valve body.

In some embodiments, the forward alignment assembly includes a biasing spring that biases the forward part in a rearward direction toward a forwardly facing shoulder surface of the valve body.

In some embodiments, the forward alignment assembly further includes a forward engagement part that is radially movable relative to the housing and is configured to engage the forwardly facing shoulder surface of the valve body.

In some embodiments, the axially movable forward part includes a sleeve portion that is slidably movable in the housing and forms a spring chamber that at least partially contains the biasing spring.

In some embodiments, the alignment mechanism is configured such that the forward engagement part always engages the forwardly facing shoulder surface of the valve body.

In some embodiments, the forward engagement part engages a forwardly facing shoulder surface of the valve body, the forwardly facing shoulder surface including an inclined portion that is extends radially outwardly and axially rearwardly relative to a longitudinal axis of the valve body.

In some embodiments, the forwardly facing shoulder surface further includes a vertical portion that is radially outward of the inclined portion.

In some embodiments, the alignment mechanism further includes a rearward engagement part that forms a fixed stop having a radially inwardly and axially rearwardly extending surface that cooperates with the valve body to facilitate alignment and/or centering.

In some embodiments, the valve body includes a radially protruding first abutment and a radially protruding second abutment axially spaced apart from the first abutment; wherein the first abutment is configured to engage the forward engagement part and the intermediate engagement part, and wherein the second abutment is configured to engage the rearward engagement part.

According to another aspect, a coupling member for a blind mate fluid coupling, includes: a housing; a valve body at least partially extending through the housing, the valve body having an axially extending internal fluid passage; a valve member at least partially disposed in the internal fluid passage, the valve member being movable relative to the valve body to open and close the internal fluid passage; and an alignment mechanism including a movable engagement part that is axially movable relative to the housing and cooperates with the valve body to facilitate alignment and/or centering of the valve body.

Embodiments may include one or more of the foregoing or following additional features, alone or in any combination.

In some embodiments, the engagement part is a forward engagement part configured to engage a forwardly facing shoulder surface of the valve body.

In some embodiments, the alignment mechanism further includes: a biasing member that biases the forward engagement part in a rearward direction to thereby bias the valve body rearwardly, an intermediate part that is radially movable relative to the housing and cooperates with the valve body via a concave interface to facilitate alignment and/or centering, and/or a rearward part having a radially inwardly and axially rearwardly extending surface that cooperates with the valve body to facilitate alignment and/or centering of the valve body.

According to an aspect, a coupling member for a blind mate fluid coupling, includes: a housing; a valve body at least partially extending through the housing, the valve body having an axially extending internal fluid passage; a valve member at least partially disposed in the internal fluid passage, the valve member being movable relative to the valve body to open and close the internal fluid passage; and an alignment mechanism including a rearward engagement part that forms a fixed stop having a radially inwardly and axially rearwardly extending surface that cooperates with the valve body to facilitate alignment and/or centering of the valve body.

Embodiments may include one or more of the foregoing or following additional features, alone or in any combination.

In some embodiments, the alignment mechanism further includes: a forward part that is axially movable relative to the housing and cooperates with the valve body to facilitate alignment and/or centering of the valve body, a biasing member that biases the forward part in a rearward direction to thereby bias the valve body rearwardly, and/or an intermediate part that is radially movable relative to the housing and cooperates with the valve body via a concave interface to facilitate alignment and/or centering.

In some embodiments, the rearward surface of the rearward engagement part creates an axial pull force away from a corresponding other coupling member to reduce binding between the coupling members.

In some embodiments, the radially inwardly and axially rearwardly extending surface forms a dome or conical surface, and wherein the rearward engagement part further includes a vertical surface radially inwardly of the inclined surface which enables the valve body to lay flatter against the rearward surface.

According to an aspect, a coupling member for a blind mate fluid coupling, includes: a housing; a valve body at least partially extending through the housing, the valve body having an axially extending internal fluid passage; a valve member at least partially disposed in the internal fluid passage, the valve member being movable relative to the valve body to open and close the internal fluid passage; and an alignment mechanism including an engagement part that cooperates with a forwardly facing shoulder surface of the valve body to facilitate alignment and/or centering of the valve body; wherein the forwardly facing shoulder surface includes an inclined portion that extends radially outwardly and axially rearwardly relative to a longitudinal axis of the valve body.

Embodiments may include one or more of the foregoing or following additional features, alone or in any combination.

In some embodiments, the forwardly facing shoulder surface further includes a vertical portion that is perpendicular to the longitudinal axis of the valve body, the vertical portion being radially outward of the inclined portion.

In some embodiments, the alignment mechanism further includes: a forward part that is axially movable relative to the housing and cooperates with the valve body to facilitate alignment and/or centering of the valve body, a biasing member that biases the forward part in a rearward direction to thereby bias the valve body rearwardly, an intermediate part that is radially movable relative to the housing and cooperates with the valve body via a concave interface to facilitate alignment and/or centering, and/or a rearward part having a radially inwardly and axially rearwardly extending surface that cooperates with the valve body to facilitate alignment and/or centering of the valve body.

According to another aspect, a coupling member for a blind mate fluid coupling, includes: a housing; a valve body at least partially extending through the housing, the valve body having an axially extending internal fluid passage; a valve member at least partially disposed in the internal fluid passage, the valve member being movable relative to the valve body to open and close the internal fluid passage; and an alignment mechanism including a biasing member that is configured to urge the valve body rearwardly.

Embodiments may include one or more of the foregoing or following additional features, alone or in any combination.

In some embodiments, the biasing member is part of a forward alignment assembly that biases a forward movable part in a rearward direction to engage a forwardly facing shoulder surface of the valve body.

In some embodiments, the alignment mechanism further includes: a forward part that is axially movable relative to the housing and cooperates with the valve body to facilitate alignment and/or centering of the valve body, wherein the biasing member biases the forward part in a rearward direction to thereby bias the valve body rearwardly, an intermediate part that is radially movable relative to the housing and cooperates with the valve body via a concave interface to facilitate alignment and/or centering, and/or a rearward part having a radially inwardly and axially rearwardly extending surface that cooperates with the valve body to facilitate alignment and/or centering of the valve body.

According to an aspect, a coupling member for a blind mate fluid coupling includes: a housing; a valve body at least partially extending through the housing, the valve body having a radially extending shoulder portion and an axially extending internal fluid passage; a valve member at least partially disposed in the internal fluid passage, the valve member being movable relative to the valve body to open and close the internal fluid passage; and an engagement member movable relative to the housing and the valve body; wherein the engagement member is adapted to engage the shoulder portion of the valve body to facilitate alignment and/or centering of the valve body.

According to another aspect, a coupling member for a blind mate fluid coupling includes: a housing; a valve body at least partially extending through the housing, the valve body having a radially protruding shoulder portion and an axially extending internal fluid passage; a valve member at least partially disposed in the internal fluid passage, the valve member being movable relative to the valve body to open and close the internal fluid passage; an engagement member axially rearward of the shoulder portion of the valve body; and a biasing member configured to operatively move the valve body; wherein the engagement member is radially movable relative to the housing and the valve body; and wherein the engagement member is adapted to engage the shoulder portion of the valve body via a concave interface to facilitate alignment and/or centering of the valve body.

According to an aspect, a coupling member for a blind mate fluid coupling, includes: a valve body having an axially extending internal fluid passage, a radially protruding first abutment, and a radially protruding second abutment axially spaced apart from the first abutment; a valve member at least partially disposed in the internal fluid passage, the valve member being movable relative to the valve body to open and close the internal fluid passage; and a housing surrounding at least a portion of the valve body including the first and second abutments, the housing including a radially extending first engagement surface and a radially extending second engagement surface; wherein, the coupling member is configured such that, when in a decoupled state, the first abutment of the valve body engages the first engagement surface of the housing, and the second abutment of the valve body engages the second engagement surface of the housing, thereby enhancing the alignment and/or centering of the valve body relative to the housing in the decoupled state.

Embodiments may include one or more of the following additional features, separately or in any combination.

In some embodiments, the coupling member further includes a biasing member.

In some embodiments, the biasing member being configured to urge and lock the first and second abutments of the valve body against the respective first and second engagement surfaces of the housing to self-center the valve body relative to the housing when the coupling member is in the decoupled state.

In some embodiments, the biasing member being configured to release the first and second abutments of the valve body from the respective first and second engagement surfaces of the housing to enable misalignment compensation of the valve body relative to the housing when the biasing member is compressed in a mating state with a corresponding other coupling member.

In some embodiments, the first engagement surface of the housing is a radially inwardly tapered surface that is configured to interface against a complementary radially inward tapered surface of the first abutment of the valve body when in the decoupled state.

In some embodiments, the second engagement surface of the housing is a radially inwardly tapered surface, and the second abutment of the valve body has a radially outer curved surface is that provides point contact with the second engagement surface of the housing when in the decoupled state.

In some embodiments, the coupling member further including an engagement member axially rearward of the first abutment of the valve body.

In some embodiments, the engagement member is adapted to engage a rearward portion of the first abutment of the valve body via a concave interface at least when the coupling member is in a mating state with a corresponding other coupling member of the blind mate coupling.

In some embodiments, the engagement member is formed as a socket having a concave bearing surface that is configured to engage a complementary convex mating surface of the first abutment of the valve body.

In some embodiments, the bearing surface of the socket and the mating surface of the first abutment are each configured as spherical surfaces.

In some embodiments, the engagement member is free to float radially relative to the housing.

In some embodiments, the engagement member is located between the first engagement surface and the second engagement surface of the housing.

In some embodiments, the coupling member further includes a support member between the engagement member and the second engagement surface of the housing, the engagement member being movable relative to the support member.

In some embodiments, the engagement member is a part of a compensator configured to compensate for misalignment of the valve body relative to the housing, the compensator further comprising a biasing member, the biasing member being configured to operatively push the engagement member against the rearward portion of the shoulder portion of the valve body irrespective of the mating state of the coupling member.

In some embodiments, valve body is radially misalignable relative to the housing in a range from greater than 1 mm to 15 mm.

In some embodiments, the valve body is angularly misalignable relative to the housing in a range from 1-degree to 15-degrees.

In some embodiments, the coupling member is a male member having a forward nose portion.

In some embodiments, the coupling member is a female member having a forward receptacle.

According to another aspect, a coupling member for a blind mate fluid coupling, includes: a housing; a valve body at least partially extending through the housing, the valve body having a radially protruding shoulder portion and an axially extending internal fluid passage; a valve member at least partially disposed in the internal fluid passage, the valve member being movable relative to the valve body to open and close the internal fluid passage; and an engagement member axially rearward of the shoulder portion of the valve body; wherein the engagement member is adapted to engage a rearward portion of the shoulder portion of the valve body via a concave interface at least when the coupling member is in a mating state with a corresponding other coupling member of the blind mate coupling.

Embodiments may include one or more of the following additional features, separately or in any combination.

In some embodiments, the engagement member is formed as a socket having a concave bearing surface that is configured to engage a complementary convex mating surface of the shoulder portion of the valve body.

In some embodiments, the bearing surface of the socket and the mating surface of the shoulder portion are each configured as spherical surfaces.

In some embodiments, the engagement member is free to float radially relative to the housing.

In some embodiments, the shoulder portion has radially inward tapered surface that is configured to interface against a complementary radially inward tapered surface of a first radial abutment of the housing when the coupling member is in a decoupled state.

In some embodiments, the housing includes a second radial abutment, and the valve body includes a second radially protruding shoulder portion that is configured to engage the second radial abutment of the housing when the coupling member is in a decoupled state.

In some embodiments, the second shoulder portion of the valve body has a radially outer curved surface that provides point contact with the second radial abutment of the housing.

In some embodiments, the engagement member is located between the first radial abutment and the second radial abutment of the housing.

In some embodiments, further comprising a support member between the engagement member and the second radial abutment, the engagement member being movable relative to the support member.

In some embodiments, the shoulder portion of the valve body is a first shoulder portion, the valve body having a second shoulder portion axially spaced from the first shoulder portion.

In some embodiments, the housing includes a first radial abutment and a second radial abutment axially spaced from the first radial abutment.

In some embodiments, the coupling member further comprising a biasing member.

In some embodiments, the biasing member being configured to urge and lock the first and second shoulder portions of the valve body against the respective first and second radial abutments of the housing to self-center the valve body relative to the housing when the coupling member is in a decoupled state.

In some embodiments, the biasing member being configured to release the first and second shoulder portions of the valve body from the respective first and second radial abutments of the housing to enable misalignment compensation of the valve body relative to the housing when the biasing member is compressed in the mating state with the corresponding other coupling member.

In some embodiments, the engagement member is a part of a compensator configured to compensate for misalignment of the valve body relative to the housing, the compensator further comprising a biasing member, the biasing member being configured to operatively push the engagement member against the rearward portion of the shoulder portion of the valve body irrespective of the mating state of the coupling member.

In some embodiments, valve body is radially misalignable relative to the housing in a range from greater than 1 mm to 15 mm.

In some embodiments, the valve body is angularly misalignable relative to the housing in a range from 1-degree to 15-degrees.

In some embodiments, the coupling member is a male member having a forward nose portion.

In some embodiments, the coupling member is a female member having a forward receptacle.

According to another aspect, a coupling member for a blind mate fluid coupling, includes: a housing; a valve body at least partially extending through the housing, the valve body having a radially protruding shoulder portion and an axially extending internal fluid passage; a valve member at least partially disposed in the internal fluid passage, the valve member being movable relative to the valve body to open and close the internal fluid passage; and a compensator configured to compensate for misalignment of the valve body relative to the housing, the compensator comprising a biasing member and an engagement member, the biasing member being configured to operatively urge the engagement member against a rearward portion of the shoulder portion of the valve body to thereby compensate for misalignments.

Embodiments may include one or more of the following additional features, separately or in any combination.

In some embodiments, the engagement member is adapted to engage the rearward portion of the shoulder portion of the valve body via a concave interface.

In some embodiments, the compensator further includes a push plate between the biasing member and the engagement member, the engagement member being radially movable relative to the push plate.

In some embodiments, the biasing member operatively pushes the engagement member against a rearward portion of the shoulder portion of the valve body when the coupling member is in both a mated state and a decoupled state.

In some embodiments, the compensator compensates for radial misalignment and/or angular misalignment, and/or provides self-centering of the misalignment.

According to another aspect, a coupling member for a blind mate coupling, includes: a main body having an axially extending internal passage, a radially protruding first abutment, and a radially protruding second abutment axially spaced apart from the first abutment; and a housing surrounding at least a portion of the main body including the first and second abutments, the housing including a radially extending first engagement surface and a radially extending second engagement surface; wherein, the coupling member is configured such that, when in a decoupled state, the first abutment of the main body engages the first engagement surface of the housing, and the second abutment of the main body engages the second engagement surface of the housing, thereby enhancing the alignment and/or centering of the main body relative to the housing in the decoupled state.

According to another aspect, a coupling member for a blind mate coupling, includes: a housing; a main body at least partially extending through the housing, the main body having a radially protruding shoulder portion and an axially extending internal passage; and an engagement member axially rearward of the shoulder portion of the main body; wherein the engagement member is adapted to engage a rearward portion of the shoulder portion of the main body via a concave interface at least when the coupling member is in a mating state with a corresponding other coupling member of the blind mate coupling.

According to another aspect, a coupling member for a blind mate fluid coupling, includes: a housing; a main body at least partially extending through the housing, the main body having a radially protruding shoulder portion and an axially extending internal fluid passage; and a compensator configured to compensate for misalignment of the main body relative to the housing, the compensator comprising a biasing member and an engagement member, the biasing member being configured to operatively urge the engagement member against a rearward portion of the shoulder portion of the main body to thereby compensate for misalignments.

Embodiments may include one or more features of the foregoing aspects in combination with one or more of any of the foregoing features, separately or in any combination. For example, in some embodiments, the coupling member is an optical or electrical coupling member instead of a fluid coupling member.

As used herein, an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An operative connection or coupling may include the entities being integral and unitary with each other.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A coupling member for a blind mate fluid coupling, comprising:
   a valve body having an axially extending internal fluid passage, a radially outwardly protruding forward abutment, and a radially outwardly protruding rearward abutment that is axially spaced apart rearwardly from the forward abutment;
   a valve member at least partially disposed in the internal fluid passage, the valve member being movable relative to the valve body to open and close the internal fluid passage; and
   a housing surrounding at least a portion of the valve body, the housing including a radially inwardly extending forward engagement surface and a radially inwardly extending rearward engagement surface that is axially spaced apart rearwardly from the first engagement surface;
   wherein the rearward abutment of the valve body includes a radially outwardly and axially rearwardly extending convex contact surface;
   wherein, the coupling member is configured such that the forward abutment of the valve body operatively interacts with the forward engagement surface of the housing, and the convex engagement surface of the rearward abutment of the valve body operatively interacts with the rearward engagement surface of the housing to facilitate alignment and/or centering of the valve body relative to the housing; and
   wherein a floating support is interposed between a forwardly facing contact surface of the forward abutment of the valve body and the rearward engagement surface of the housing, the floating support being radially moveable relative to the housing and the valve body, and cooperates with both the forwardly facing contact surface of the forward abutment and the forward engagement surface of the housing to provide interaction that facilitates alignment and/or centering of the valve body relative to the housing.

2. The coupling member according to claim 1, wherein at least in the decoupled state, the convex contact surface of the rearward abutment of the valve body direct engages against the rearward engagement surface of the housing.

3. The coupling member according to claim 1, wherein the convex surface of the rearward abutment of the valve body is formed as an outer conical surface of a frustoconical body portion of the valve body.

4. The coupling member according to claim 1, wherein the rearward engagement surface of the housing has a corresponding radially outwardly extending and axially rearwardly extending orientation that forms a concave surface.

5. The coupling member according to claim 1, wherein the rearward engagement surface of the housing is formed at an opening in a rear of the housing.

6. The coupling member according to claim 1, wherein the floating support is a flat ring, the forwardly facing contact surface of the forward abutment of the valve body is a flat surface that extends perpendicular to a longitudinal axis of the valve body, and the forward engagement surface of the housing is a flat surface that extends perpendicular to the a longitudinal axis of the housing.

7. The coupling member according to claim 1, further comprising an alignment mechanism including a movable engagement part that is radially movable in a radial direction relative to the housing and the longitudinal axis, wherein the alignment mechanism is configured to cooperate with the valve body to facilitate at least radial alignment and/or centering of the valve body.

8. The coupling member according to claim 7, wherein the engagement part cooperates with the valve body via a concave interface to facilitate angular alignment and/or centering.

9. The coupling member according to claim 8, wherein the engagement part is adapted to engage a rearwardly facing surface of the valve body via the concave interface at least when the coupling member is in a connecting state with a corresponding other coupling member of the blind mate coupling.

10. The coupling member according to claim 7, wherein the engagement part has a concave bearing surface that is configured to engage a complementary convex mating surface of a portion of the valve body.

11. The coupling member according to claim 10, wherein the bearing surface of the engagement part and the mating surface of the valve body are each configured as spherical surfaces.

12. The coupling member according to claim 7,
   wherein the engagement part is a ring having an opening through which the valve body extends, the ring having a cupped surface that is adapted to engage a corresponding cupped shoulder surface of the valve body,
   the alignment mechanism further including a second radially floating ring, wherein the engagement part and floating ring are each radially movable and configured to cooperate with respective parts the housing.

13. The coupling member according to claim 7, wherein the alignment mechanism includes a compensator having a biasing member that urges the valve body forwardly and the engagement part rearwardly to compensate for misalignment of the valve body.

14. The coupling member according to claim 13, wherein the biasing member has a biasing force that is configured such that the engagement part disengages from a shoulder of the valve body when the coupling member is disconnected from a corresponding other coupling member of the blind mate coupling.

15. The coupling member according to claim 13, wherein one end of the biasing member is supported by the engagement member, and an opposite end of the biasing member is engaged against a shoulder portion of the valve body.

16. The coupling member according to claim 13, wherein an outer diameter of an intermediate portion of the valve body contained within the biasing member is tapered to reduce in diameter axially rearwardly.

17. The coupling member according to claim 1, wherein a forward opening of the housing has an inclined surface.

18. The coupling member according to claim 1, wherein a rearward end portion of the valve body has a connector that is adapted to connect to a fluid conduit.

19. The coupling member according to claim 1, wherein the coupling member is a male coupling member.

20. A coupling member for a blind mate fluid coupling, comprising:
- a valve body having an axially extending internal fluid passage, a radially outwardly protruding forward abutment, and a radially outwardly protruding rearward abutment that is axially spaced apart rearwardly from the forward abutment;
- a valve member at least partially disposed in the internal fluid passage, the valve member being movable relative to the valve body to open and close the internal fluid passage; and
- a housing surrounding at least a portion of the valve body, the housing including a radially inwardly extending forward engagement surface and a radially inwardly extending rearward engagement surface that is axially spaced apart rearwardly from the first engagement surface;
- wherein the rearward abutment of the valve body includes a radially outwardly and axially rearwardly extending convex contact surface; and
- wherein, the coupling member is configured such that the forward abutment of the valve body operatively interacts with the forward engagement surface of the housing, and the convex engagement surface of the rearward abutment of the valve body operatively interacts with the rearward engagement surface of the housing to facilitate alignment and/or centering of the valve body relative to the housing;
- further comprising an alignment mechanism including a movable engagement part that is radially movable in a radial direction relative to the housing and the longitudinal axis, wherein the alignment mechanism is configured to cooperate with the valve body to facilitate at least radial alignment and/or centering of the valve body;
- wherein the engagement part cooperates with the valve body via a concave interface to facilitate angular alignment and/or centering; and
- wherein the engagement part is adapted to engage a rearwardly facing surface of the valve body via the concave interface at least when the coupling member is in a connecting state with a corresponding other coupling member of the blind mate coupling.

* * * * *